(12) United States Patent
Urig

(10) Patent No.: US 11,833,634 B2
(45) Date of Patent: *Dec. 5, 2023

(54) MULTI-FUNCTIONAL ROUTER BASE AND METHODS OF USE

(71) Applicant: Woodpeckers, LLC, Strongsville, OH (US)

(72) Inventor: Kody M. Urig, Avon, OH (US)

(73) Assignee: Woodpeckers, LLC, Strongsville, OH (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/344,357

(22) Filed: Jun. 10, 2021

(65) Prior Publication Data
US 2022/0395950 A1     Dec. 15, 2022

(51) Int. Cl.
*B27C 5/10*     (2006.01)
*B23Q 9/00*     (2006.01)

(52) U.S. Cl.
CPC .............. *B23Q 9/0028* (2013.01); *B27C 5/10* (2013.01)

(58) Field of Classification Search
CPC .... B27C 5/10; B27C 5/04; B27C 1/14; B23Q 9/0028; B27G 23/00
See application file for complete search history.

(56) References Cited

U.S. PATENT DOCUMENTS

| | | | |
|---|---|---|---|
| 2,943,655 A * | 7/1960 | Pedersen | .............. B27C 5/10 144/134.1 |
| 2,970,618 A * | 2/1961 | Mitchell | ............... B23C 3/126 144/136.95 |
| D237,824 S | 11/1975 | Pagander | |
| 4,215,731 A | 8/1980 | Maynard | |
| 4,281,694 A | 8/1981 | Gorman | |
| 4,290,464 A | 9/1981 | Marsan | |
| 4,718,468 A * | 1/1988 | Cowman | ............... B27C 5/10 144/136.95 |
| 5,052,454 A | 10/1991 | Meinhardt | |

(Continued)

OTHER PUBLICATIONS

WoodWorkers Guild of America, Cutting Perfect Dadoes and Grooves using a Router Edge Guide | Woodworkers Guild of America, Jul. 15, 2014, https://www.youtube.com/watch?v=f_LEoRYN3Sk (Year: 2014).*

*Primary Examiner* — Matthew Katcoff
(74) *Attorney, Agent, or Firm* — Sand, Sebolt & Wernow Co., LPA

(57) ABSTRACT

A multi-functional router base that includes associated components and various methods of use herein. The router base includes a base plate and an attachment assembly that is operably engaged with the base plate. The router base also includes a first attachment rod and a second attachment rod provided on the attachment assembly, where the first attachment rod and the second attachment rods are adapted to engage a router. The first attachment rod and the second attachment rod of the router base are linearly moveable relative to the base plate. As to the linear movement, the first attachment rod and the second attachment rod are transversely linearly moveable relative to one another and are vertically linearly moveable relative to the base plate based on the configuration of the router being operably engaged with the router base. An edge guiding fence may be operably engageable with the base plate.

20 Claims, 33 Drawing Sheets

(56) References Cited

U.S. PATENT DOCUMENTS

| | | | |
|---|---|---|---|
| 5,299,609 A * | 4/1994 | Wedler | B23Q 9/0028 |
| | | | 33/813 |
| D351,775 S | 10/1994 | Wedler | |
| 6,070,626 A * | 6/2000 | Tully | B23Q 9/0028 |
| | | | 144/48.6 |
| 6,138,372 A | 10/2000 | Newman | |
| 7,467,651 B2 * | 12/2008 | Karkosch | B27C 9/02 |
| | | | 144/136.95 |
| 9,259,851 B2 | 2/2016 | Cardew | |
| D933,441 S | 10/2021 | Metcalfe | |
| 2005/0115639 A1 * | 6/2005 | Bagnall | B27C 5/10 |
| | | | 144/218 |
| 2006/0032553 A1 | 2/2006 | Williams | |
| 2008/0000395 A1 | 1/2008 | Radermacher | |
| 2013/0327442 A1 | 12/2013 | Cardew | |
| 2022/0395950 A1 | 12/2022 | Urig | |

* cited by examiner

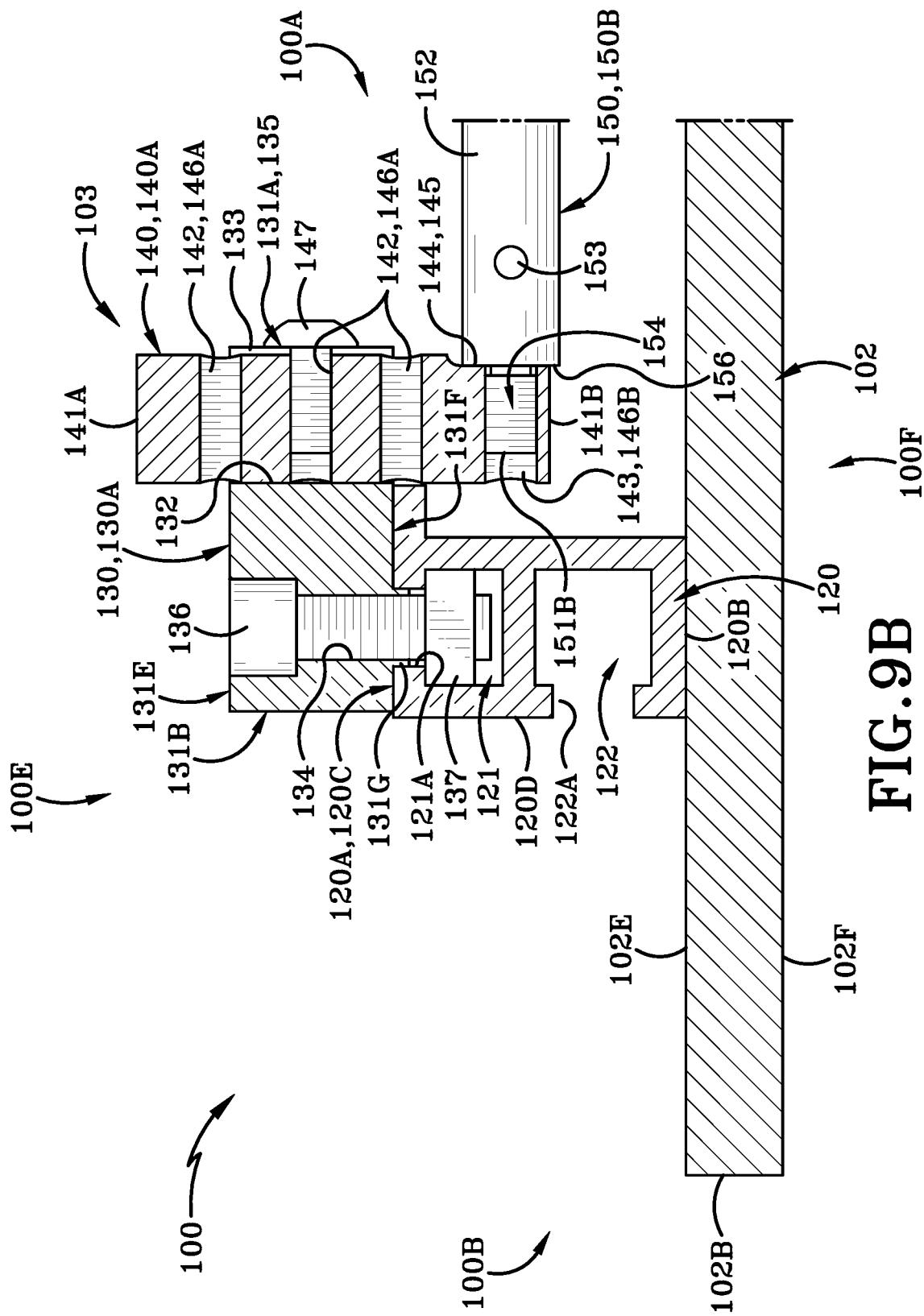

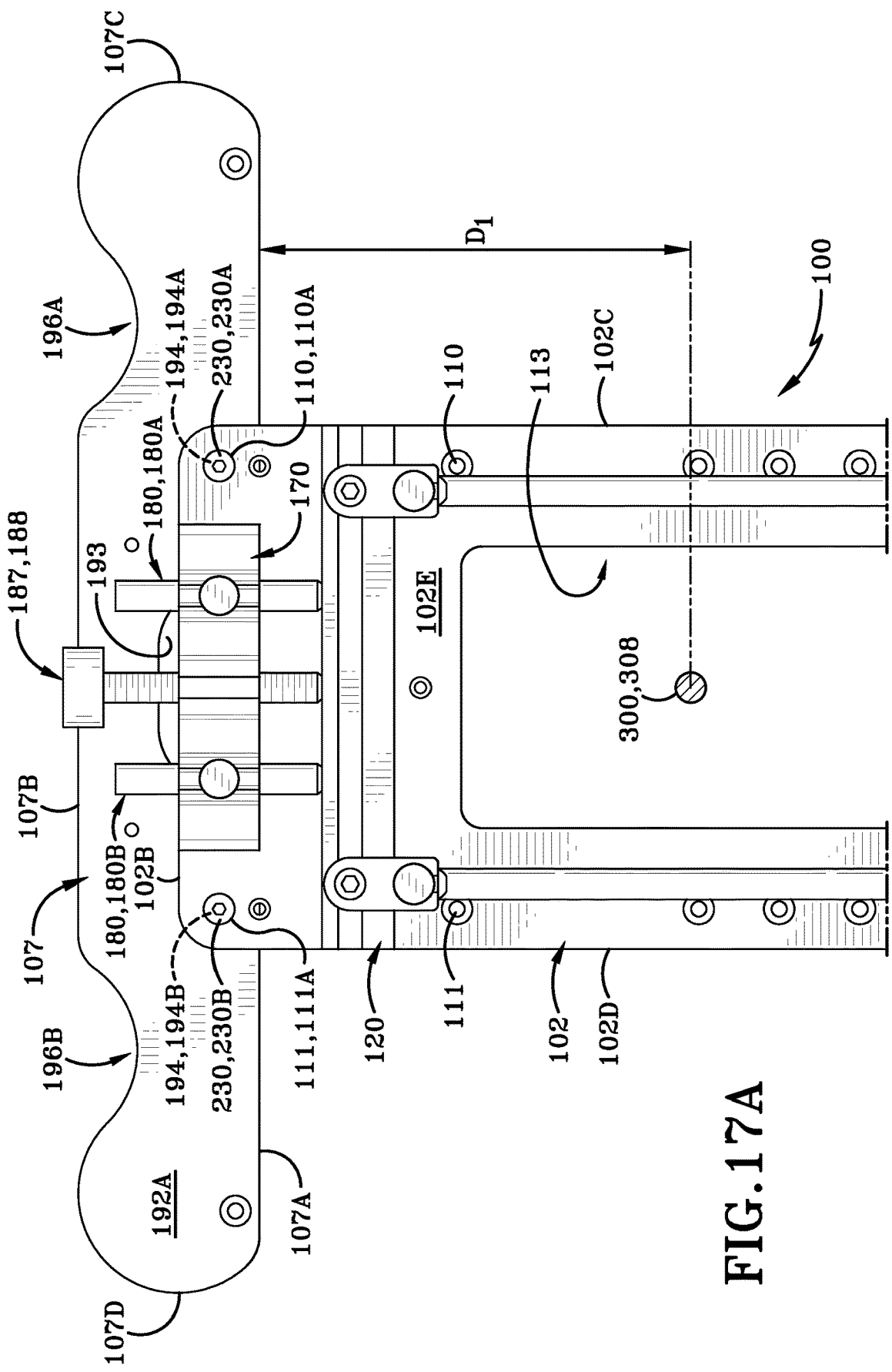

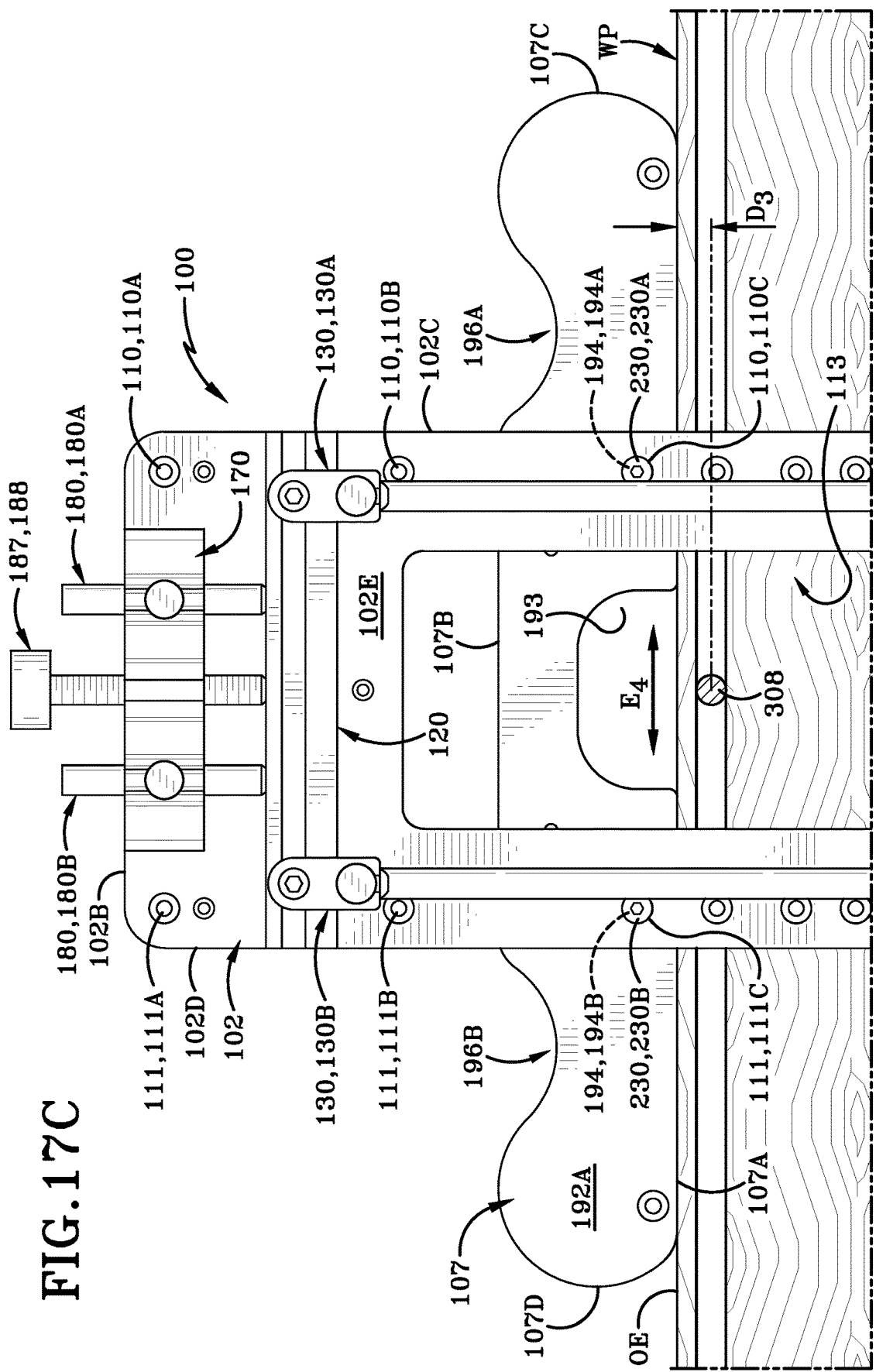

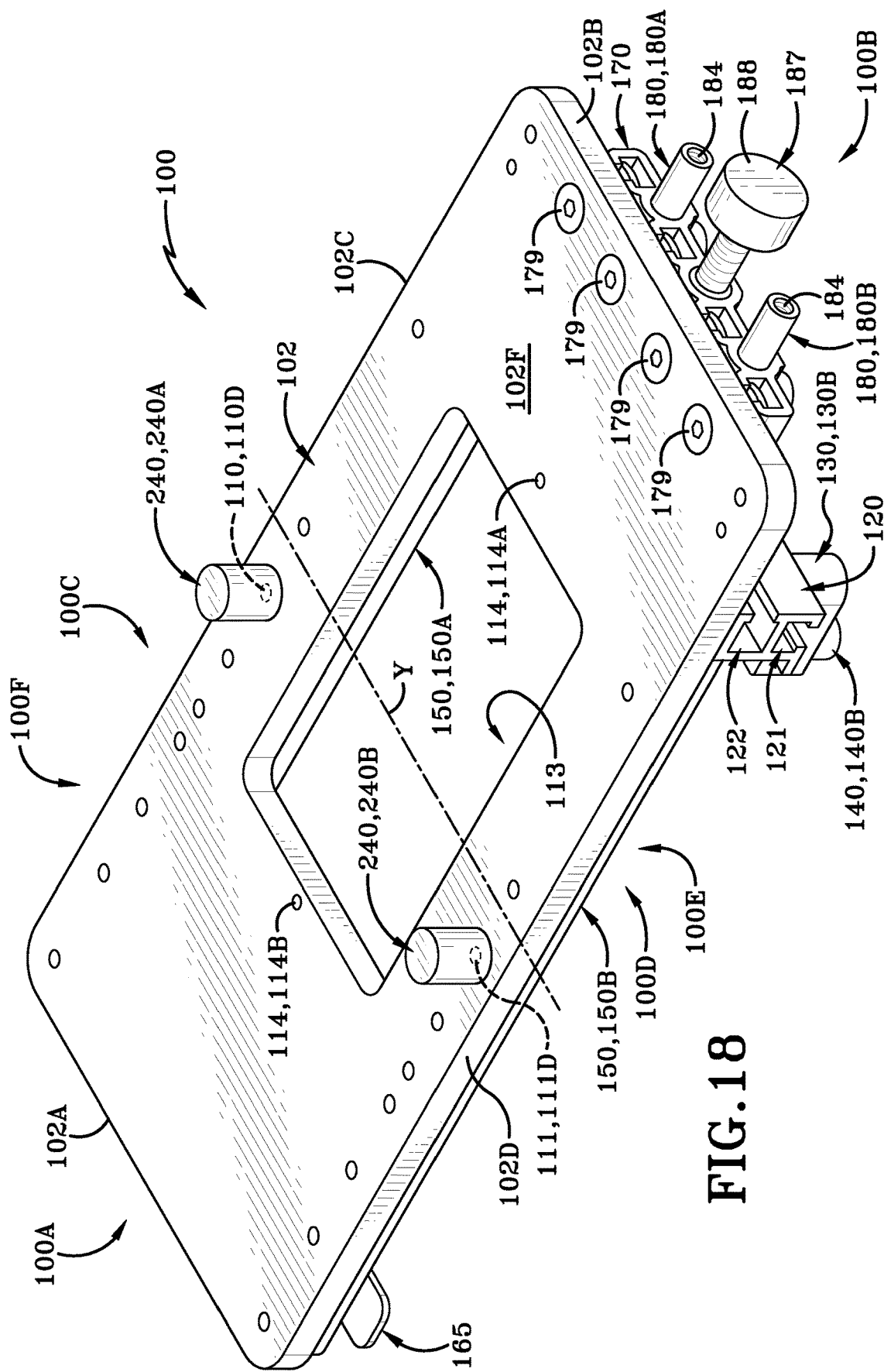

MULTI-FUNCTIONAL ROUTER BASE AND METHODS OF USE

TECHNICAL FIELD

The present disclosure generally relates to a multipurpose power tool. More particularly, the present disclosure relates to a router base. Specifically, the present disclosure relates to a router base that is usable with any router having through holes for guide rods and which enables a user to more accurately move a router engaged with the router base in a controlled straight line or in a perfect arc.

BACKGROUND

A router is a versatile power tool that may be used in multiple projects for cutting into different types of workpiece, such as a wood workpiece or a plastic workpiece. Generally, routers are used in woodworking projects for cutting grooves and/or slots into a workpiece, cutting mortises into a workpiece, or cutting curvilinear or rounded designs into a workpiece. While a woodworker may use a router to make these types of cuts, in some situations it is extremely difficult to make precise and accurate cuts into a workpiece with a router.

To address these difficulties and problems, a woodworker may select a device or multiple devices to help stabilize and/or guide his or her router during a cutting process. While such assisting devices are provided in the market, the woodworker may have to use a number of different devices to make different precise cuts into a workpiece. For example, the woodworker may have to use a first set of assisting devices with the router for cutting a mortise into a workpiece and a second set of assisting devices with the router for cutting a rounded edge into the same workpiece. Such use of multiple assisting devices requires the woodworker to have access to these various assisting devices and requires the expenditure of more time and effort when the woodworker is making multiple cuts into a workpiece.

SUMMARY

The presently disclosed router base provides a woodworker with multi-functional use for adjusting and aligning a router in order to make a wide range of different types of precise cuts in a workpiece. The disclosed router base may reduce the overall number of router assisting devices that a woodworker has to use to complete a project and may also reduce the project's completion time since the need to switch between multiple assisting devices is avoided. As such, the router base disclosed herein addresses some of the inadequacies of previously known router assisting devices.

In one aspect, an exemplary embodiment of the present disclosure may provide a router base. The router base includes a base plate and an attachment assembly that is operably engaged with the base plate. The router base also includes a first attachment rod and a second attachment rod that is provided on the attachment assembly in which the first attachment rod and the second attachment rod are adapted to engage a router. The first attachment rod and the second attachment rod are linearly moveable relative to the base plate.

This exemplary embodiment or another exemplary embodiment may further provide that the base plate has a first side and a second opposing side that defines a transverse axis therebetween, wherein the first attachment rod and the second attachment rod are transversely linearly moveable relative to one another and relative to the base plate. This exemplary embodiment or another exemplary embodiment may further provide that the base plate has a top surface and an opposing bottom surface that defines a vertical axis therebetween, and wherein the first attachment rod and the second attachment rod are vertically linearly moveable relative to the base plate. This exemplary embodiment or another exemplary embodiment may further provide that attachment assembly further has a track that is operably engages the base plate; a channel defined in the track; and a first attachment block and a second attachment block; wherein the first attachment block and the second attachment block are linearly moveable along the channel of the track; and wherein the first attachment rod is operably engaged with the first attachment block and the second attachment rod is operably engaged with the second attachment block. This exemplary embodiment or another exemplary embodiment may further provide that attachment assembly further has a locking mechanism provided on each of the first attachment block and the second attachment block; wherein the locking mechanism is movable between a locked position and an unlocked position, and when the locking mechanism is in the locked position, the associated first attachment block and second attachment block are retained at a fixed location relative to the track. This exemplary embodiment or another exemplary embodiment may further provide that attachment assembly further has a first attachment post that is operably engaged with the first attachment block, wherein the first attachment rod is operably engaged with the first attachment post; and a second attachment post that is operably engaged with the second attachment block, wherein the second attachment rod is operably engaged with the second attachment post. This exemplary embodiment or another exemplary embodiment may further provide that the base plate has a top surface and an opposing bottom surface defining a vertical axis therebetween, wherein the first attachment post and the second attachment post are each oriented generally parallel to the vertical axis; wherein the first attachment post is vertically linearly movable relative to the first attachment block, and wherein the second attachment post is vertically linearly movable relative to the second attachment block. This exemplary embodiment or another exemplary embodiment may further provide that attachment assembly further has a securement mechanism that is provided on each of the first attachment block and the second attachment block, wherein the securement mechanism is selectively movable between a secured position and an unsecured position, and when the securement mechanism in the secured position, the respective first attachment post and second attachment post are retained at a fixed position relative to the associated first attachment block and second attachment block. This exemplary embodiment or another exemplary embodiment may further provide that attachment assembly further has a second channel defined in the track in which the second channel is orthogonal to the channel; and a micro-adjuster assembly that is operably engaged with the second channel of the track. This exemplary embodiment or another exemplary embodiment may further provide an edge guiding fence; and at least one extension rod, wherein the at least one extension rod operably engages the edge guiding fence to the base plate. This exemplary embodiment or another exemplary embodiment may further provide a micro-adjuster assembly that is operably engaged with the base plate and the attachment assembly; wherein micro-adjuster assembly is operable to move the attachment assembly relative to the base plate. This exemplary embodiment or another exemplary embodiment may further provide that the base plate has a front end and a rear end that defines a longitudinal axis therebetween; and wherein the micro-adjuster assembly is operable to longitudinally linearly move the attachment assembly relative to the front end of the base plate. This exemplary embodiment or another exemplary embodiment may further provide an edge guiding fence operably engagable with the base plate, wherein a top surface of the edge guiding fence is disposed adjacent to a bottom surface of the base plate. This exemplary embodiment or another exemplary embodiment may further provide an edge guiding fence; and at least one extension rod, wherein the at least one extension rod operably engages the edge guiding fence to the base plate, and wherein the at least one extension rod maintains the edge guiding fence a distance away from the base plate. This exemplary embodiment or another exemplary embodiment may further provide a clamp assembly operably engaged with the base plate, the first attachment rod, and the second attachment rod. This exemplary embodiment or another exemplary embodiment may further provide that the clamp assembly includes a clamp having a first portion that operably engages the first attachment rod and a second portion that operably engages the second attachment rod.

In another aspect, an exemplary embodiment of the present disclosure may provide a method of using a router with a router base. The method comprises the step of providing an attachment assembly on a base plate of the router base; inserting a first attachment rod of the attachment assembly through a first through-hole defined in a bottom plate of the router; inserting a second attachment rod of the attachment assembly through a second through-hole defined in the bottom plate of the router, wherein the first through-hole and second through-hole are spaced a lateral distance away from one another; linearly adjusting one or both of the first attachment rod and the second attachment rod relative to the base plate; and operatively engaging each of the first attachment rod and the second attachment rod to the attachment assembly.

This exemplary embodiment or another exemplary embodiment may further provide that the step of linearly adjusting the one or both of the first attachment rod and the second attachment rod relative to the base plate includes linearly moving the first attachment rod and the second attachment rod generally parallel to a transverse axis of the base plate and relative to one another, wherein the transverse axis extends between a first side and an opposed second side of the base plate. This exemplary embodiment or another exemplary embodiment may further provide that the step of linearly adjusting the one or both of the first attachment rod and the second attachment rod relative to the base plate further comprises: engaging the first attachment rod with a first attachment block; engaging the second attachment rod with a second attachment block; and moving one or both of the first attachment block and the second attachment block along a track operably engaged with the base plate. This exemplary embodiment or another exemplary embodiment may further provide that the step of linearly adjusting further comprises: locking, with a locking mechanism, one or both of the first attachment block and the second attachment block in a desired fixed location on the track. This exemplary embodiment or another exemplary embodiment may further provide that the step of linearly adjusting the one or both of the first attachment rod and the second attachment rod relative to the base plate further comprises linearly moving the first attachment rod and the second attachment rod generally parallel to a vertical axis of the base plate, where the vertical axis extends between a top surface and an opposed bottom surface of the base plate. This exemplary embodiment or another exemplary embodiment may further provide that the step of linearly adjusting the one or both of the first attachment rod and the second attachment rod further comprises: engaging the first attachment rod with a first attachment post oriented generally parallel to the vertical axis; engaging the second attachment rod with a second attachment post oriented generally parallel to the vertical axis; and linearly moving one or both of the first attachment post and the second attachment post one of towards and away from the top surface of the base plate. This exemplary embodiment or another exemplary embodiment may further provide the step of securing, with a securement mechanism, the one or both of the first attachment post and the second attachment post at a fixed position relative to the top surface of the base plate. This exemplary embodiment or another exemplary embodiment may further provide the steps of operably engaging an edge guiding fence with the base plate; placing the edge guiding fence adjacent an edge of a workpiece; guiding the base plate along the edge of the workpiece with the edge guiding fence; and making a cut in the workpiece with the router. This exemplary embodiment or another exemplary embodiment may further provide the steps of adjusting, with a micro-adjuster assembly, a position of the attachment assembly relative to the base plate; adjusting, with the attachment assembly, a position of a cutting bit of the router relative to a workpiece; and making a cut in the workpiece with the cutting bit. This exemplary embodiment or another exemplary embodiment may further provide the steps of operatively engaging a trammel pin with the base plate; engaging the trammel pin in an aperture defined in an upper surface of a workpiece; guiding the base plate in an arc across the workpiece using the trammel pin as a point of rotation of the base plate; and cutting an arc in the workpiece with the router. This exemplary embodiment or another exemplary embodiment may further provide that the step of operatively engaging the trammel pin with the base plate includes: engaging an expansion assembly with the base plate; engaging the trammel pin with the expansion assembly; and positioning the base plate and thereby the router a distance away from the trammel pin.

In one aspect, an exemplary embodiment of the present disclosure may provide a router base. The router base may include a base plate that is adapted to rest upon a surface of a workpiece. The router base may include an attachment assembly operably engaged with the base plate and adapted to engage a router. The router base may include an edge guiding fence that is operably engageable with the base plate between a first position beneath the base plate and a second position away from the base plate, wherein the edge guiding fence is adapted to travel along an edge of the workpiece during operation of the router This exemplary embodiment or another exemplary embodiment may further provide that the base plate includes a front end and an opposed rear end, and a longitudinal axis extends between the front end and the rear end; and wherein the edge guiding fence is selectively operably engageable with the base plate at different positions relative to the longitudinal axis. This exemplary embodiment or another exemplary embodiment may further provide that the base plate further comprises a top surface and an opposed bottom surface which extend between a front end and an opposed rear end, and wherein an opening is defined in the base plate, said opening extending between the top surface and the bottom surface and adapted to receive a cutting bit of the router therethrough. This exemplary embodiment or another exemplary embodiment may further provide that the edge guiding fence further comprises a front end, an opposing rear end, and a top surface that extends between the front end and the rear end, wherein the edge guiding fence operably engages the base plate such that the top surface of edge guiding fence is adjacent the bottom surface of the base plate. This exemplary embodiment or another exemplary embodiment may further provide a notch defined in the front end of the edge guiding fence, wherein the notch extends inwardly from the front end of the edge guiding fence towards the rear end of the edge guiding fence. This exemplary embodiment or another exemplary embodiment may further provide that the notch is partially covered by the base plate. This exemplary embodiment or another exemplary embodiment may further provide that the notch is partially aligned with the opening defined in the base plate. This exemplary embodiment or another exemplary embodiment may further provide that the notch is aligned with the opening defined in the base plate. This exemplary embodiment or another exemplary embodiment may further provide a plurality of openings defined in the base plate; at least one aperture defined in the edge guiding fence; and at least one fastener selectively engageable in one opening of the plurality of openings and the at least one aperture; said at least one fastener selectively securing the edge guiding fence to the base plate. This exemplary embodiment or another exemplary embodiment may further provide that the base plate includes a first side and an opposed second side; wherein the plurality of openings comprises a first row of openings adjacent the first side and a second row of openings adjacent the second side; wherein the at least one aperture comprises a first aperture and a second aperture and the first aperture is selectively alignable with a first opening of the first row of openings, and the second aperture is selectively alignable with a second opening of the second row of openings, and wherein the at least one fastener comprises a first fastener received through the aligned first aperture and first opening, and a second fastener received through the aligned second aperture and second opening. This exemplary embodiment or another exemplary embodiment may further provide that the edge guiding fence includes a front end and a rear end, and wherein the front end of the edge guiding fence is selectively disposable at distance of from about three-quarters of an inch up to about eight inches from a cutting bit of the router. This exemplary embodiment or another exemplary embodiment may further provide an expansion assembly, wherein the expansion assembly includes: an expansion plate operably engaged with the edge guiding fence; and at least one extension rod that operably engages the expansion plate to the base plate. This exemplary embodiment or another exemplary embodiment may further provide that the expansion assembly maintains the edge guiding fence a distance away from the base plate.

In another aspect, an exemplary embodiment of the present disclosure may provide a method of guiding a router. The method of guiding a router comprises the step of engaging a router with a router base; choosing to engage an edge guiding fence with a base plate of the router base between a first position beneath the base plate and a second position away from the base plate; placing the base plate of the router base on a workpiece; placing a front end of the edge guiding fence on an outermost edge of the workpiece; actuating the router; and moving the edge guiding fence along the outermost edge of the workpiece while operating the router. This exemplary embodiment or another exemplary embodiment may further provide a step of moving the base plate and router in unison with the edge guiding fence. This exemplary embodiment or another exemplary embodiment may further provide the steps of defining a notch in a front end of the edge guiding fence; placing a top surface of the edge guiding fence in contact with a bottom surface of the base plate; and partially covering the notch with the base plate. This exemplary embodiment or another exemplary embodiment may further provide the steps of defining a notch in a front end of the edge guiding fence; defining an opening in the base plate; placing a top surface of the edge guiding fence in contact with a bottom surface of the base plate; and partially aligning the notch with the opening. This exemplary embodiment or another exemplary embodiment may further provide the steps of defining a notch in a front end of the edge guiding fence; defining an opening in the base plate; placing a top surface of the edge guiding fence in contact with a bottom surface of the base plate; and aligning the notch with the opening. This exemplary embodiment or another exemplary embodiment may further provide a step of selectively securing the edge guiding fence with the base plate, via at least one fastener. This exemplary embodiment or another exemplary embodiment may further provide the steps of operably engaging an expansion plate with the edge guiding fence; operably engaging at least one extension rod with the expansion plate to the base plate; and maintaining the base plate a distance away from the edge guiding fence with the at least one extension rod.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 9B is a longitudinal cross-section of a first portion of the attachment assembly of the router base taken along line 9B-9B of FIG. 4. The micro-adjuster assembly is removed.

FIG. 17A is a partial top plan view of the router base with the fence operably engaged with the base in a first position such that the cutting bit of the router disposed at a first distance from a front end of the fence.

FIG. 17C is a partial top plan view of the router base similar to FIG. 17B showing the fence operably engaged with the base in a third position such that the cutting bit of the router is disposed at a third distance from the front end of the fence.

FIG. 18 is a bottom, rear, right side isometric perspective view of the router base showing a pair of mortising pins engaged with the base plate of the router base.

Similar numbers refer to similar parts throughout the drawings.

DETAILED DESCRIPTION

Figure 1:
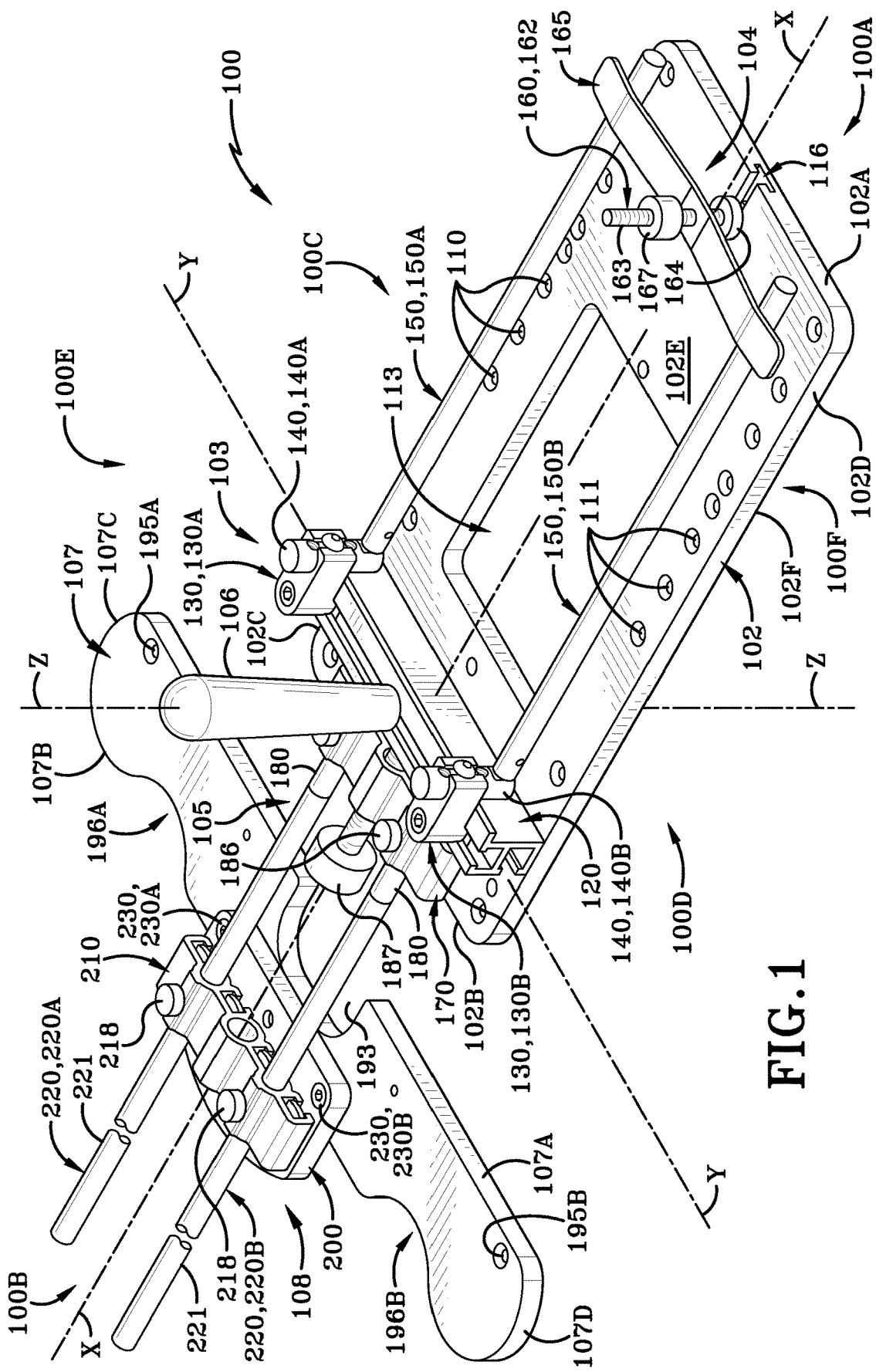
FIG. 1 is a top, front, left side isometric perspective view of a router base in accordance with an aspect of the present disclosure, wherein the router base is illustrated operatively engaged with an expansion assembly in accordance with an aspect of the present disclosure.
Figure 2:
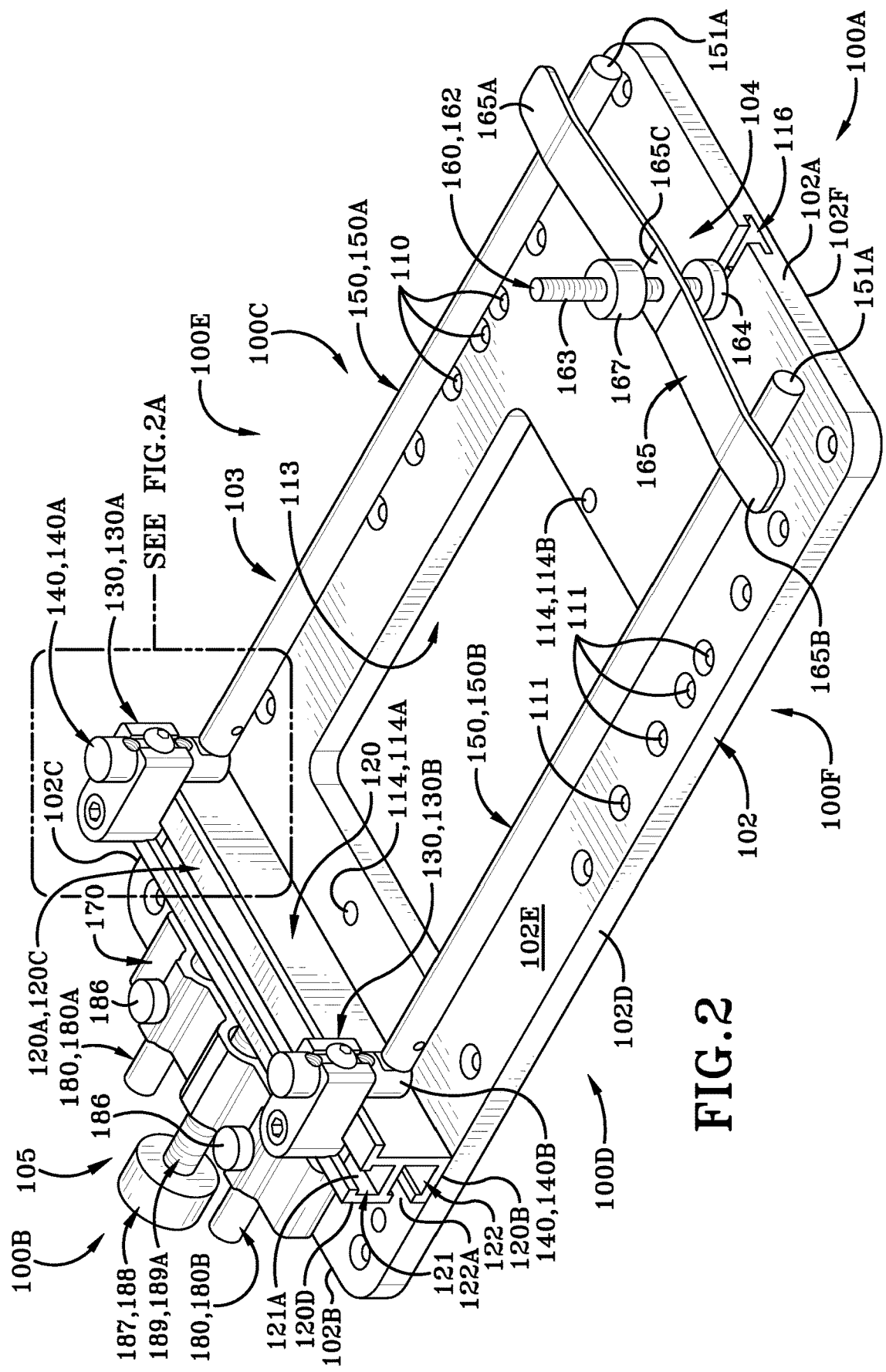
FIG. 2 is a top, front, left side isometric perspective view of the router base shown in isolation, wherein a handle of the router base is omitted for clarity of illustration, and wherein the figure shows a first guide rod and a second guide rod of a micro-adjuster assembly engaged with a first track of the router base.

FIGS. 1 and 2 illustrate a router base, shown generally at 100, for use with a router power tool, which is described in more detail below. Router base 100 generally includes a front end 100A, a rear end 100B that opposes the front end 100A, a right side 100C, a left side 100D that opposes the right side 100C, a top end 100E, and a bottom end 100F that opposes the top end 100E. In addition, the router base 100 includes a longitudinal axis "X" that extends between the front end 100A and the rear end 100B, a transverse axis "Y" that extends between the right side 100C and the left side 100D, and a vertical axis "Z" that extends between the top end 100E and the bottom end 100F. It should be understood that the terms "front", "rear", "top", "bottom", "right" and "left" are used to describe the orientation of the router base 100 illustrated in the attached figures and should in no way be considered to limit the orientation that the router base 100 may be utilized.

Referring now to FIG. 1, the router base 100 includes a base plate 102, an attachment assembly 103, a clamp assembly 104, a micro-adjuster assembly 105, and a handle 106. In addition, an edge guiding fence 107 and an expansion assembly 108 may operably engage the router base 100 and/or each other as desired by a woodworker using the router base 100. Such associated assemblies and/or components are described in more detail below.

Referring now to FIG. 2, the base plate 102 includes front end 102A, a rear end 102B that opposes the front end 102A and defining a longitudinal axis between the front end 102A and the rear end 102B. In addition, the base plate 102 also includes a right side 102C and a left side 102D that opposes the right side 102C. The base plate 102 also includes a top surface 102E that faces the top end 100E of the router base 100 and extends between the front and rear ends 100A, 100B of the router base 100. The base plate 102 also includes a bottom surface 102F (seen in FIG. 5) that faces the bottom end 100F of the router base 100 and extends between the front and rear ends 100A, 100B of the router base 100. The base plate 102 defines a row of first openings 110 and a row of second openings 111 that are defined proximate the perimeter of the base plate 102. In the illustrated embodiment, the row of first openings 110 is proximate the right side 100C of the router base 100 and is oriented generally parallel to right side 100C. Similarly, the row of second openings 111 is arranged proximate the left side 100D of the router base 100 and is oriented generally parallel to left side 100D. The row of first openings 110 and the row of second openings are oriented generally parallel to the longitudinal axis "X".

Each first opening 110 in the row of first openings 110 is arranged in lateral alignment with one of the second openings 111 in the row of second openings 111. Each opening of the first and second rows of openings 110, 111 extends entirely through the base plate 102 from the top surface 102E to the bottom surface 102F. Each opening of the first and second rows of openings 110, 111 is also countersunk as illustrated in FIGS. 1 and 2. In the illustrated embodiment, there are ten first openings 110 and ten second openings 111. The first openings 110 are defined at longitudinally spaced-apart intervals from one another and the second openings 110 are defined at similar longitudinally spaced-apart intervals from one another such that base plate 102 includes several aligned pairs of apertures, where each pair includes one first opening 110 and one second opening 111. All of the first openings 110 and second openings 111 are generally of a same size and are configured to receive fasteners therethrough. The purpose of first openings 110 and second openings 111 is described in more detail below.

Figure 4:
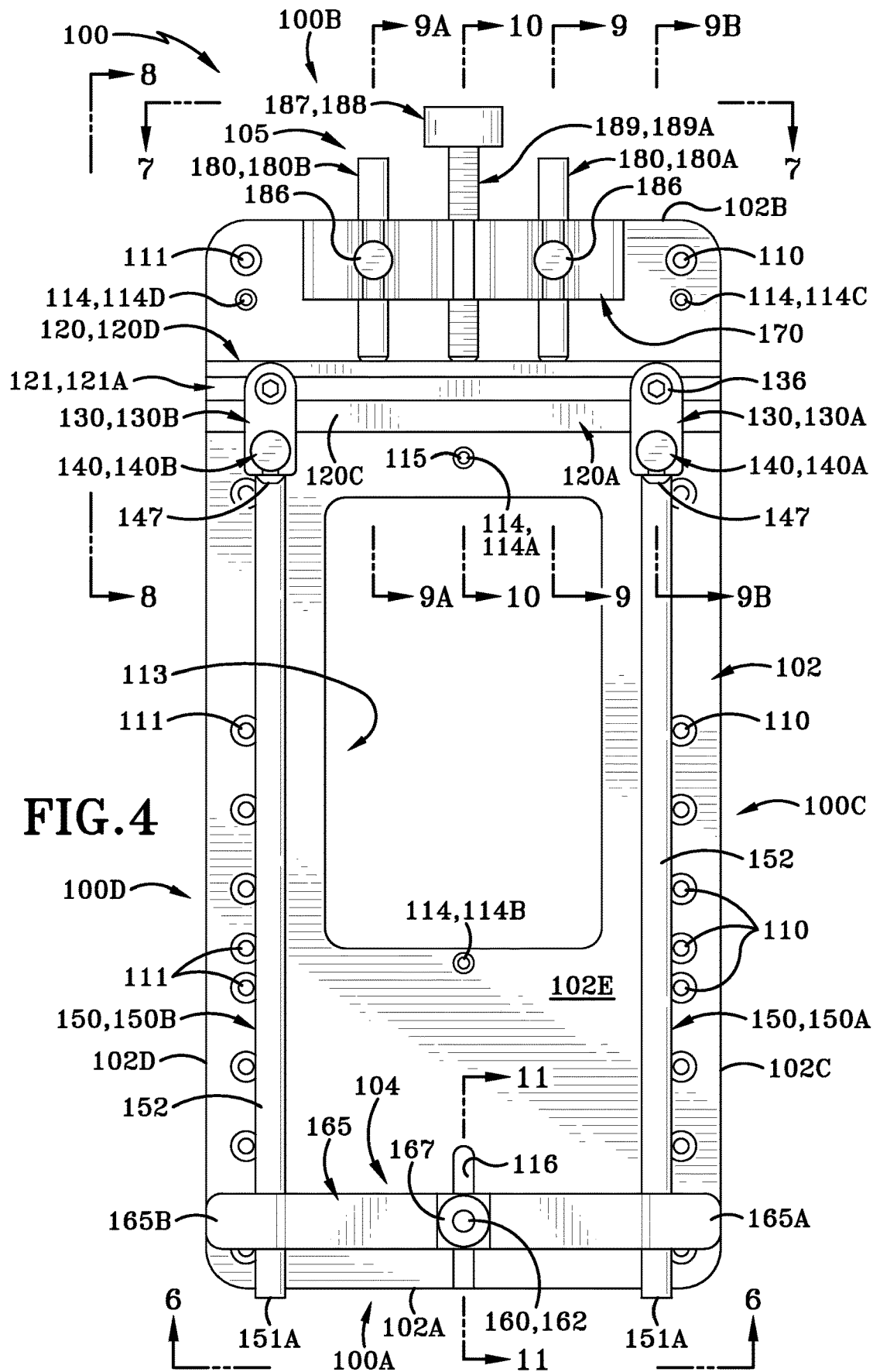
FIG. 4 is a top plan view of the router base of FIG. 2.

The base plate 102 also defines a central opening 113 that is disposed between the front and rear ends 100A, 1008 of the router base 100 and between the rows of the first and second openings 110, 111. Central opening 113 is substantially larger than any of the first openings 110 or second openings 111. As best seen in FIG. 4, central opening is generally rectangular in shape. As will be discussed later herein, central opening 113 is provided to enable a cutting bit of a router supported on router base 100 to extend therethrough. This will be discussed in greater detail later herein.

Still referring to FIG. 2, the base plate 102 further defines one or more trammel openings 114 that extend entirely through the base plate 102 from the top surface 102E to the bottom surface 102F. Each trammel opening 114 is also countersunk. In the illustrated embodiment, a first trammel opening 114A is disposed between the rear end 100B of the router base 100 on the base plate 102 and the central opening 113. The base plate 102 also includes a second trammel opening 114B that is disposed between the front end 100A of the router base 100 on the base plate 102 and the central opening 113. The base plate 102 also includes a third trammel opening 114C that is disposed proximate the perimeter of the base plate 102 and proximate the rear end 100B and the right side 100C of the router base 100 (see FIG. 4). The base plate 102 also includes a fourth trammel opening 114D that is disposed the perimeter of the base plate 102 and proximate the rear end 100B and the left side 100D of the router base 100. In the illustrated embodiment, the first and second trammel openings 114A, 114B are aligned parallel to one another and relative to the longitudinal axis "X", and the third and fourth openings 114C, 114D are aligned parallel to one another and relative to the transverse axis "Y".

Still referring to FIG. 2, the base plate 102 also defines a slot 116 that originates at the front end 100A of the router base 100. The slot 116 originates in an opening in the front end of the base plate 102 and extends rearwardly towards the central opening 113 of the base plate 102. The slot 116 terminates a distance forwardly of the central opening 113. As best seen in FIG. 2, the slot is an inverted T-shape in cross-section when the base plate 102 is viewed from the front end 100A of the router base 100. The purpose of slot 116 will be described later herein.

Figure 5:
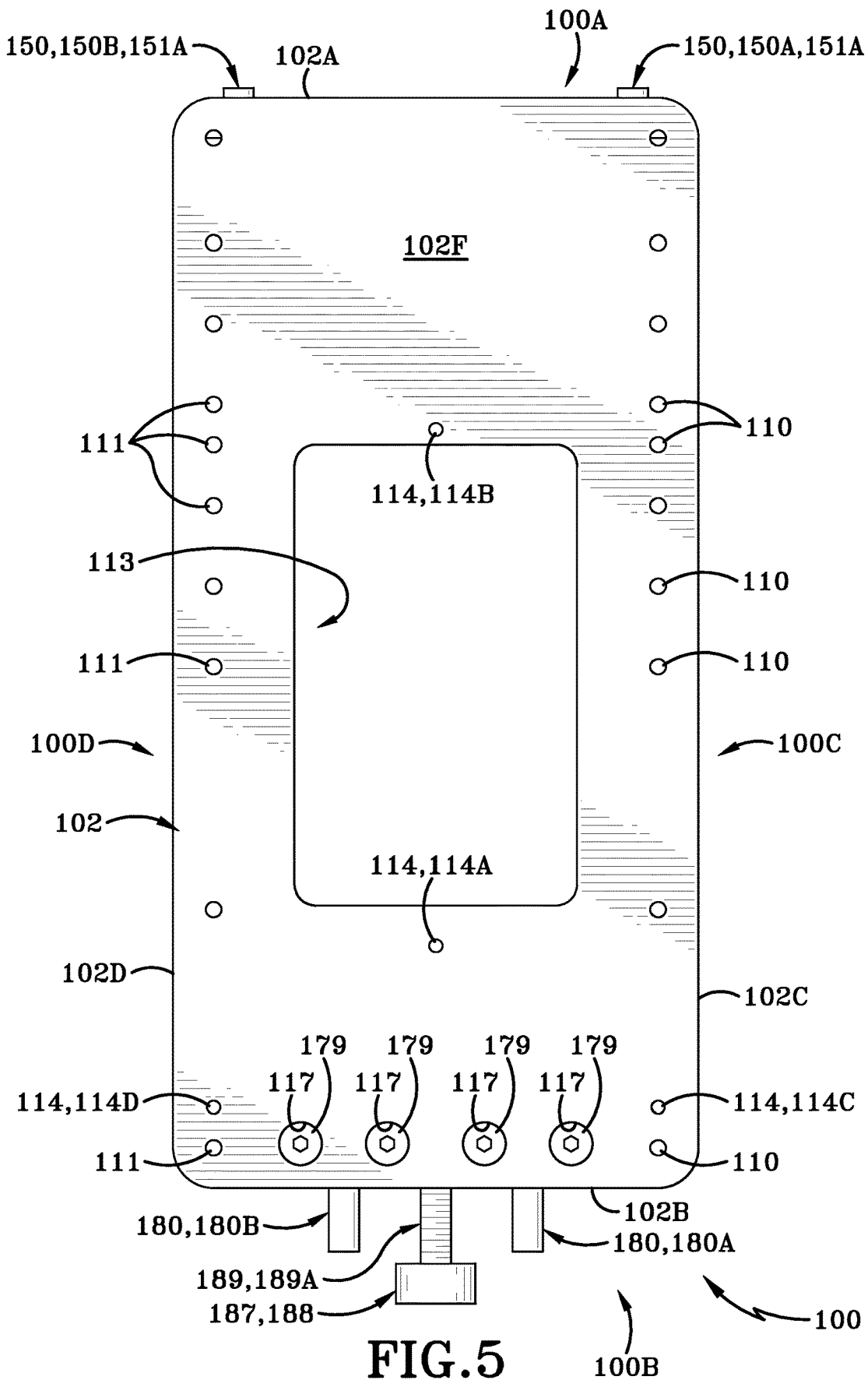
FIG. 5 is a bottom plan view of the router base of FIG. 2.

Referring to FIG. 5, the base plate 102 also defines a row of third openings 117. The row of third openings 117 is disposed proximate the perimeter of the base plate 102 and proximate to the rear end 100B of the router base 100. Each opening of the row of third openings 117 extends entirely through the base plate 102 from the top surface 102E to the bottom surface 102F of the router base 100. The row of third openings 117 is also disposed between the row of first openings 110 and the row of second openings 110, 111. The row of third openings 117 is oriented parallel to the rear end 1026 of the router base 100.

As illustrated in FIG. 2 and as mentioned earlier herein, router base 100 also includes an attachment assembly 103. The purpose of attachment assembly 103 is to enable a woodworker to engage a router 300 (FIG. 15) with router base 100. Attachment assembly 103 includes a track 120, a first attachment rod 150, a second attachment rod 150, and the clamp assembly 104. All of these components will now be described in greater detail.

As illustrated in FIGS. 1 and 2, the track 120 has a top end 120A and a bottom opposing end 120B. The bottom end 120B of the track 120 abuts the top surface 102E of the base plate 102 in such a way that the track 120 is able to be slideably moved along the base plate 102 during operation. As illustrated, track 120 extends across the width of base plate 102, where the width is measured from right side to left side of base plate 102. The track 120 defines an upper channel 121 that extends along the length of the track 120 between the right and left sides of the base plate 102 and extends into the track 120 parallel to the vertical axis "Z". The upper channel 121 is accessible through a first slot 121A in a top surface 120C of the track 120 (seen in FIGS. 1, 2, and 8-10). The track 120 also defines a lower channel 122 that extends along the length of the track 120 between the right and left sides of the base plate 102 and extends into the track 120 parallel to the longitudinal axis "X". The lower channel 122 is accessible through a second slot 122A in a rear surface 120D of the track 120 (seen in FIGS. 1, 2, and 8-10). In the illustrated embodiment, the upper channel 121 opens towards the top end 100E of the router base 100, and the lower channel 122 opens towards the rear end 100B of the router base 100. As illustrated in FIGS. 2 and 8 through 10, the upper channel 121 is disposed above the lower channel 122 on the track 120 such that the lower channel 122 is proximate to the top surface 102E of the base plate 102.

Figure 8:
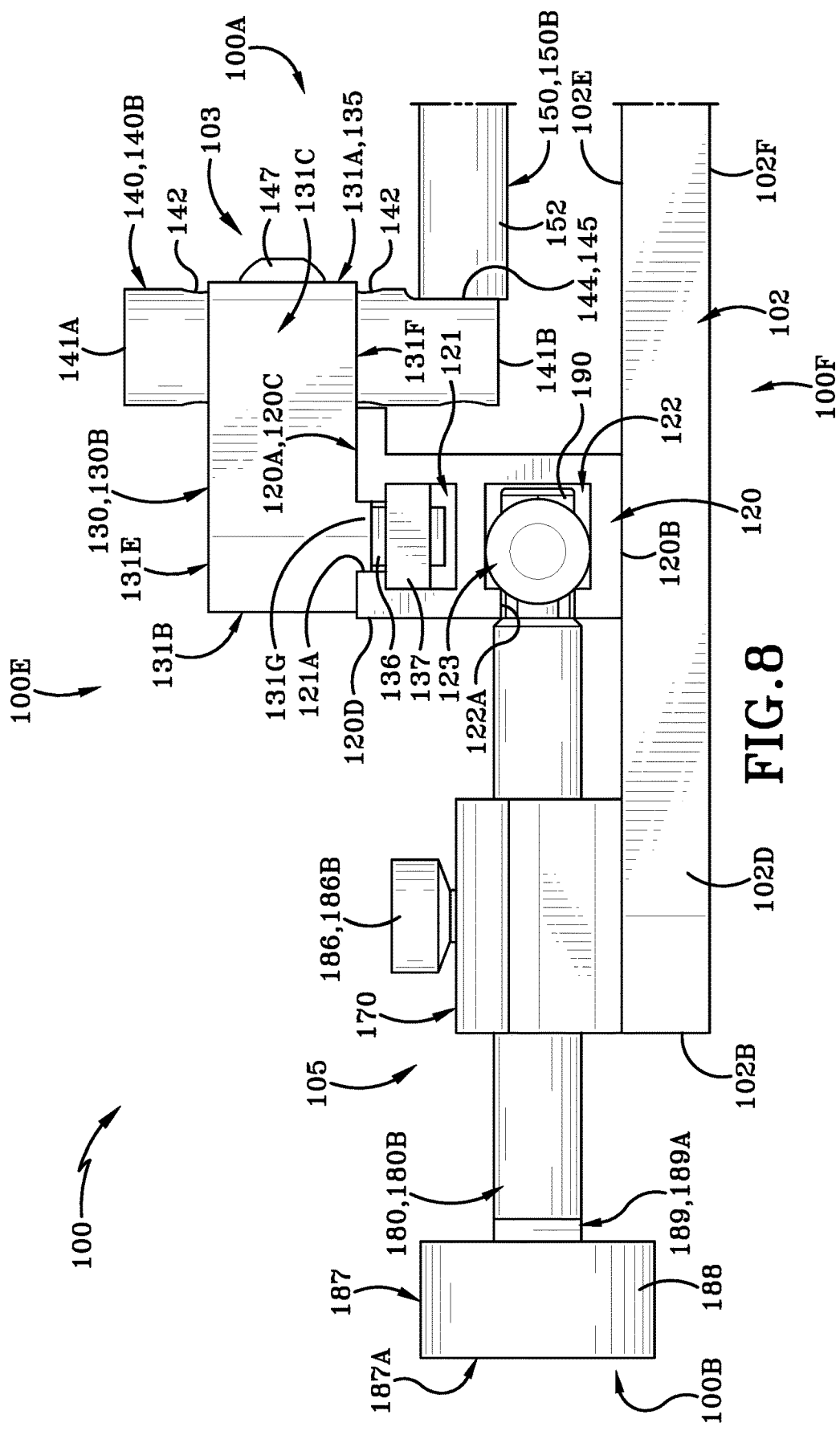
FIG. 8 is a left side elevation view of the attachment assembly and micro-adjuster assembly of the router base taken along line 8-8 of FIG. 4.
Figure 9:
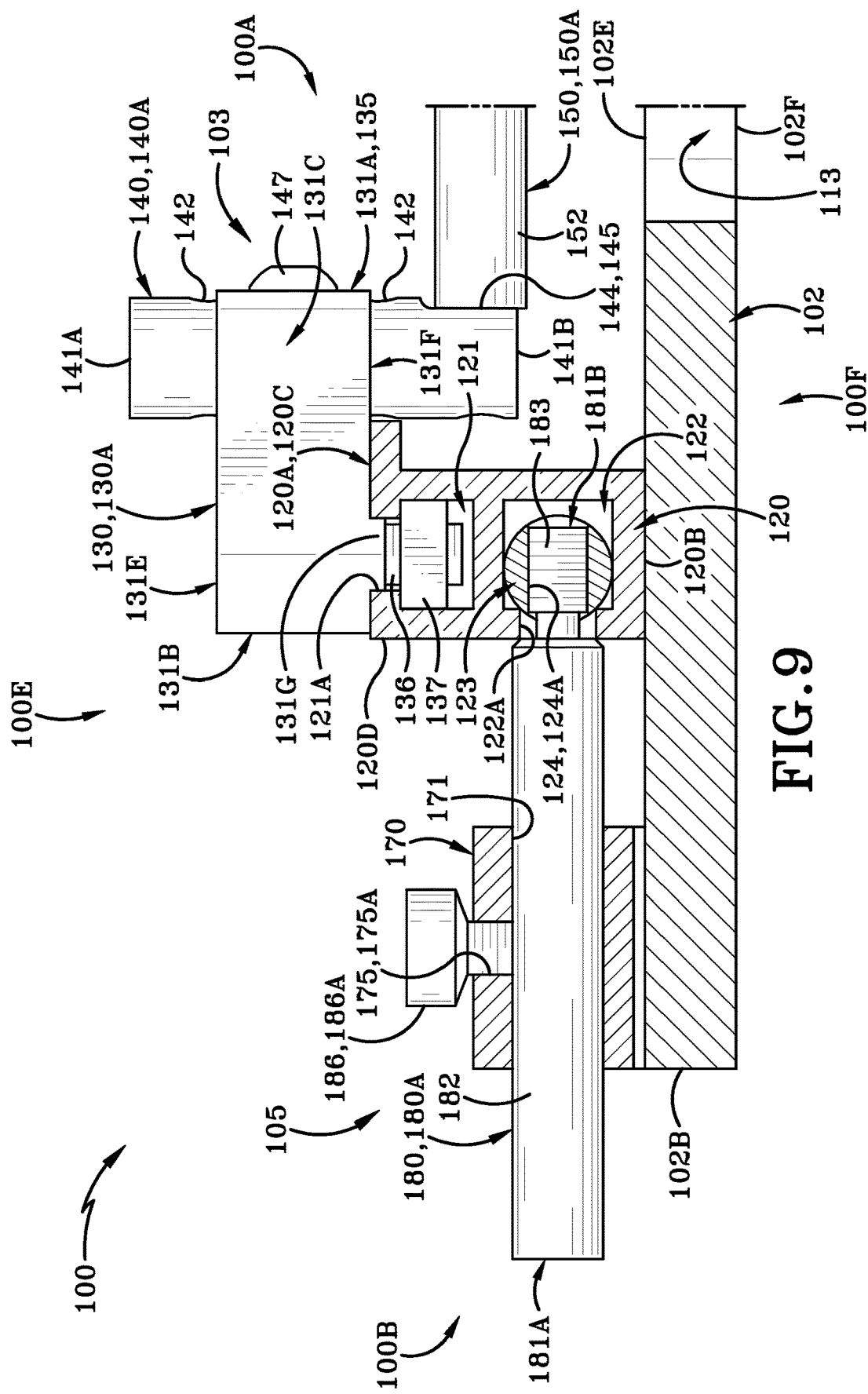
FIG. 9 is a longitudinal cross-section of a first portion of the micro-adjuster assembly of the router base taken along line 9-9 of FIG. 4.
Figure 9A:
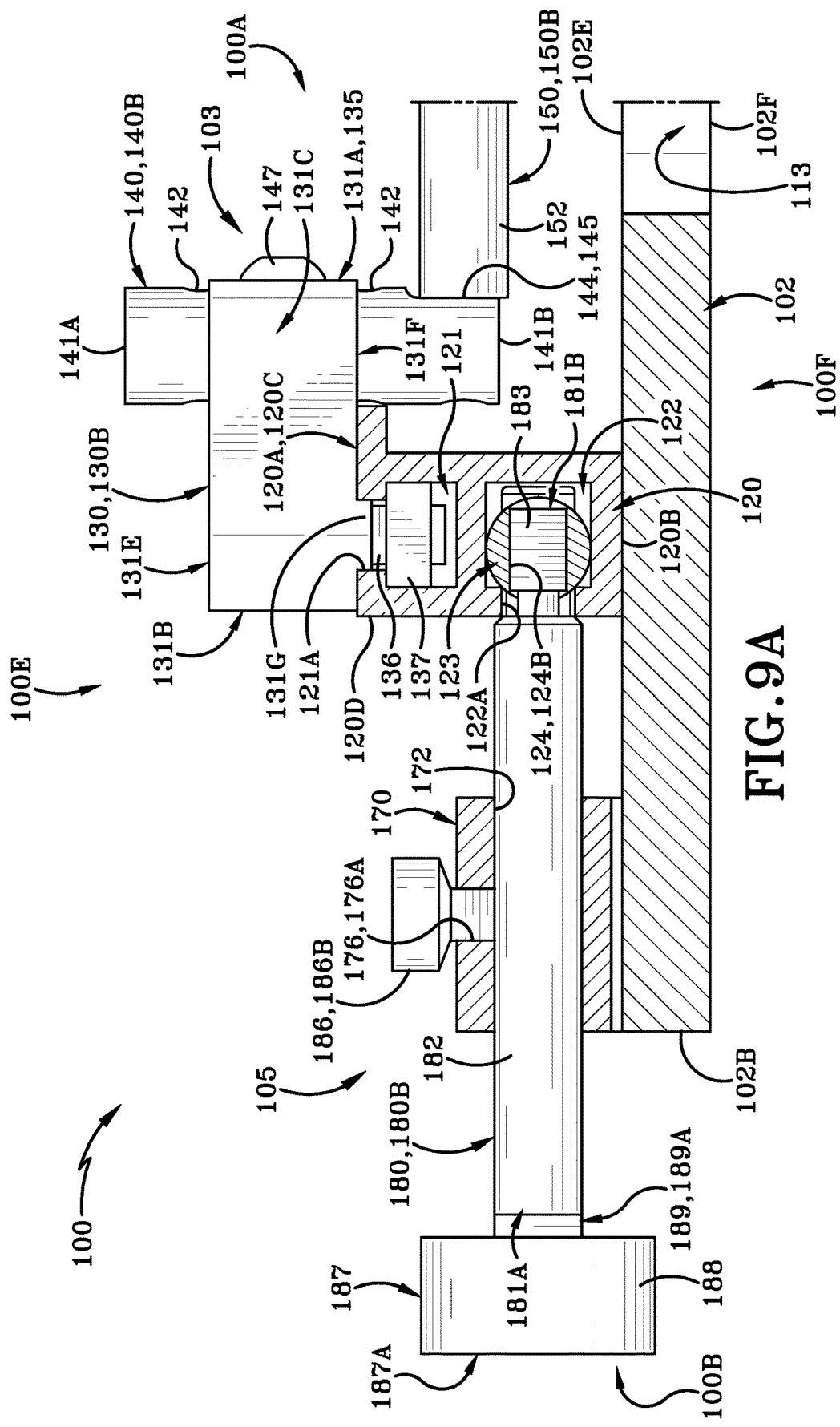
FIG. 9A is a longitudinal cross-section of a second portion of the micro-adjuster assembly of the router base taken along line 9A-9A of FIG. 4.
Figure 10:
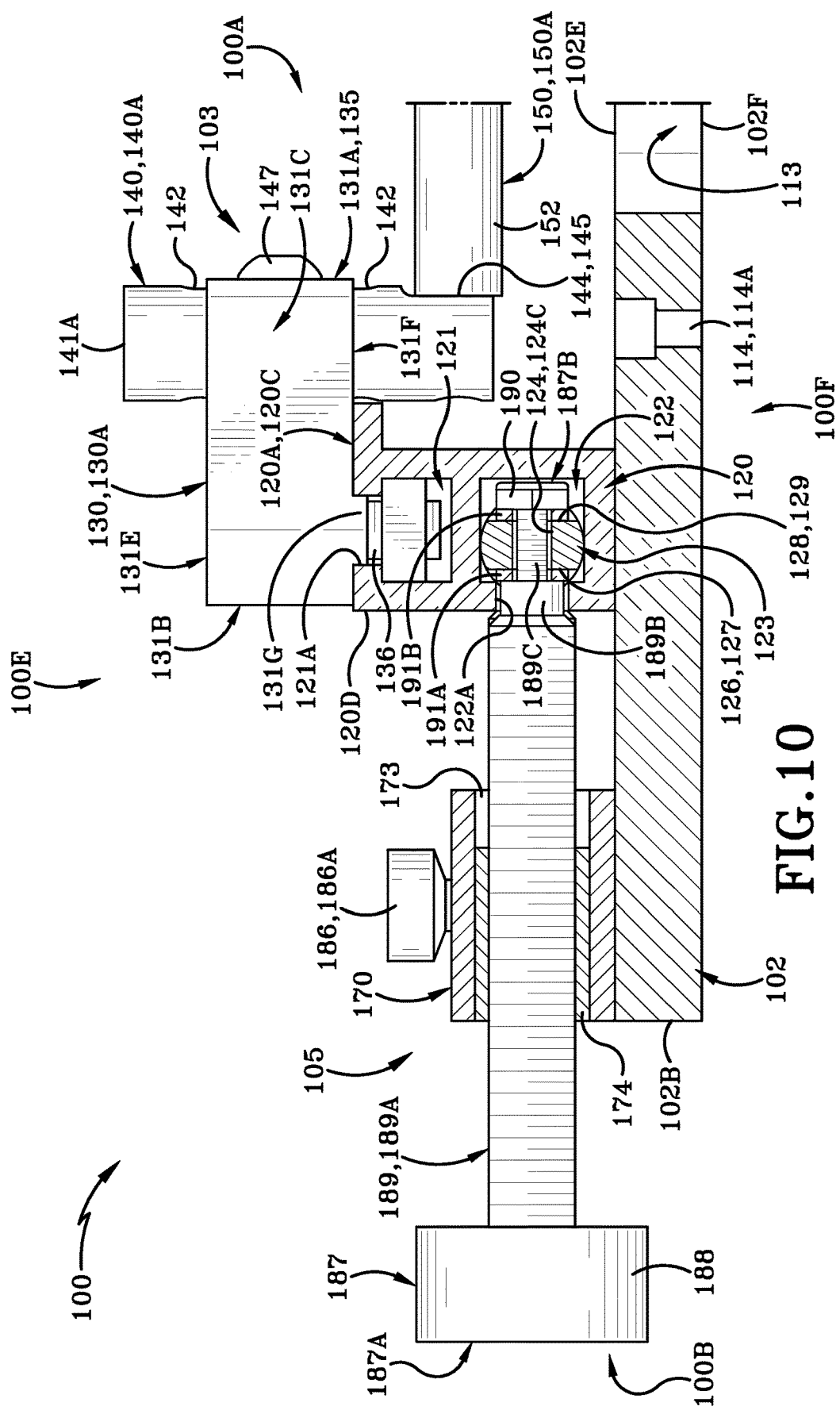
FIG. 10 is a longitudinal cross-section of a third portion of the micro-adjuster assembly of the router base taken along line 10-10 of FIG. 4.
Figure 12:
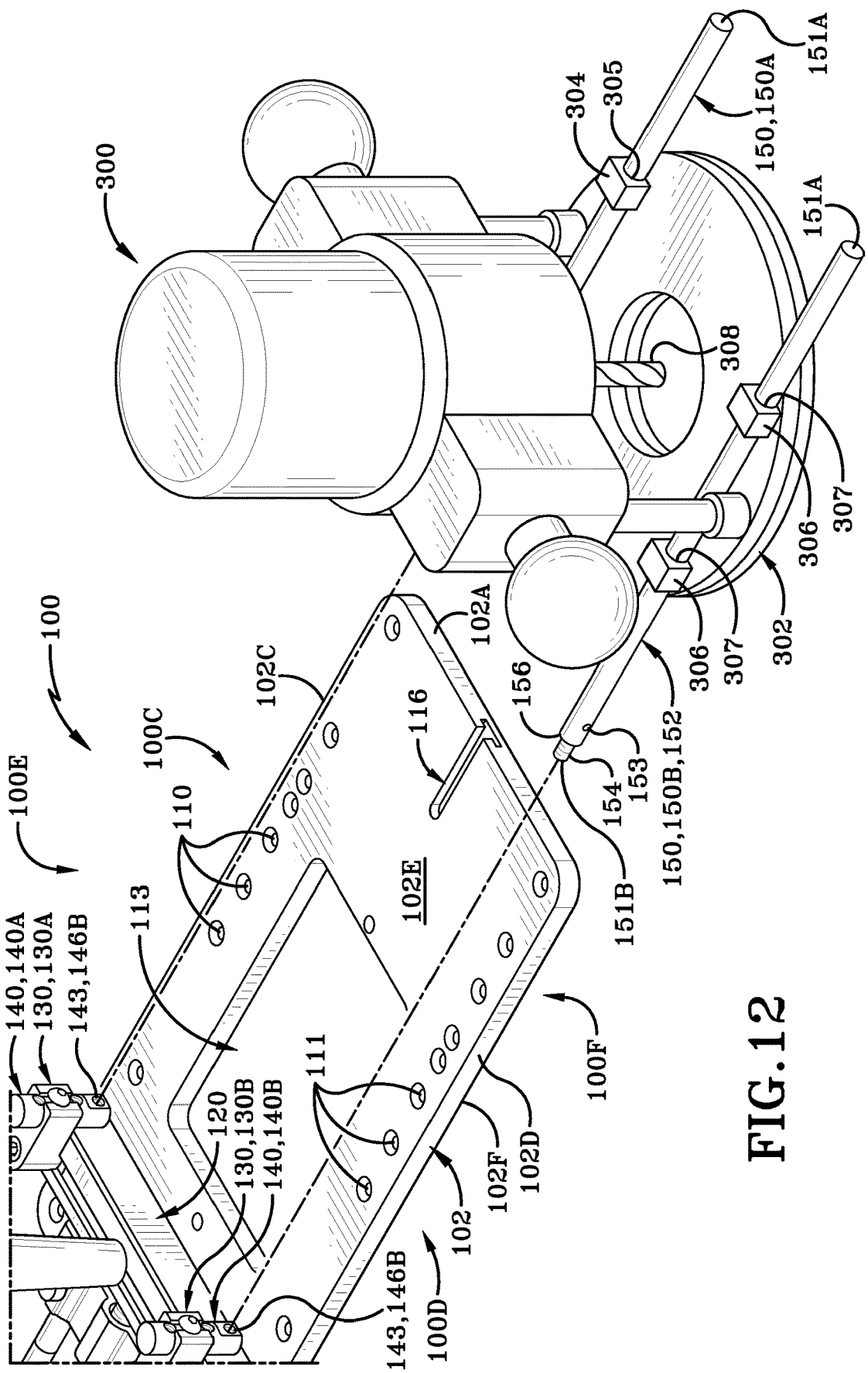
FIG. 12 is a partial top, front, left side isometric perspective view of the router base and a router shown prior to engaging the router with the router base.

Referring to FIGS. 8 through 10, the attachment assembly 103 also includes a dowel 123 that is disposed within the lower channel 122 of the track 120. The dowel 123 is a made of a metal material. The dowel 123 defines a set of through holes 124 that extends entirely through the dowel 123 from a rear surface thereof to a front surface thereof in an orientation generally parallel to longitudinal axis "X". In the illustrated embodiment, the set of through holes 124 includes three through holes. As illustrated in FIG. 9, the dowel 123 defines a first through hole 124A that is disposed proximate to the right side 100C of the router base 100 and is also threaded. In addition, the dowel 123 defines a second through hole 124B that is disposed proximate to the left side 100D of the router base 100 and is also threaded. As illustrated in FIG. 12, the dowel 123 also defines a central through hole 124C that is disposed between the first through hole 124A and second through hole 124B. Referring to FIG. 10, the dowel 123 also defines a first recess 126 that extends longitudinally towards the front end 100A of the router base 100 parallel to the longitudinal axis "X" to a first flat surface 127. The first recess 126 is positioned about the central through hole 124C proximate to the rear end 100B of the router base 100 second recess 126. The dowel 123 also defines a second recess 128 that extends laterally towards the rear end 100B of the router base 100 parallel to the longitudinal axis "X" to a second flat surface 129. The second recess 128 is also positioned about the central through hole 124C directly opposite to the first recess 126.

In the illustrated embodiment, the dowel 123 is press-fitted into the lower channel 122 of the track 120. While the dowel 123 is press-fitted into the lower channel 122 of the track 120, a dowel may operably engage a lower channel of a track in any suitable configuration. Examples of operably engaging a dowel into a lower channel of a track include attaching, adhering, affixing, bonding, connecting, coupling, fastening, joining, linking, mounting, riveting, securing, welding, and other suitable configurations for operably engaging a dowel into a lower channel of a track.

The attachment assembly 103 also includes a pair of attachment blocks 130. Each attachment block 130A, 130B operably engages with the upper channel 121 of the track 120. The attachment blocks 130A, 130B are identical to one another and are engaged with the upper channel 121 of the track 120 facing towards the front end of the base plate 102. Inasmuch as the attachment blocks 130A, 130B are identical, the following description will relate to the attachment block 130A. It should be understood, however, that the description of the attachment block 130A applies equally to the attachment block 130B.

Figure 2A:
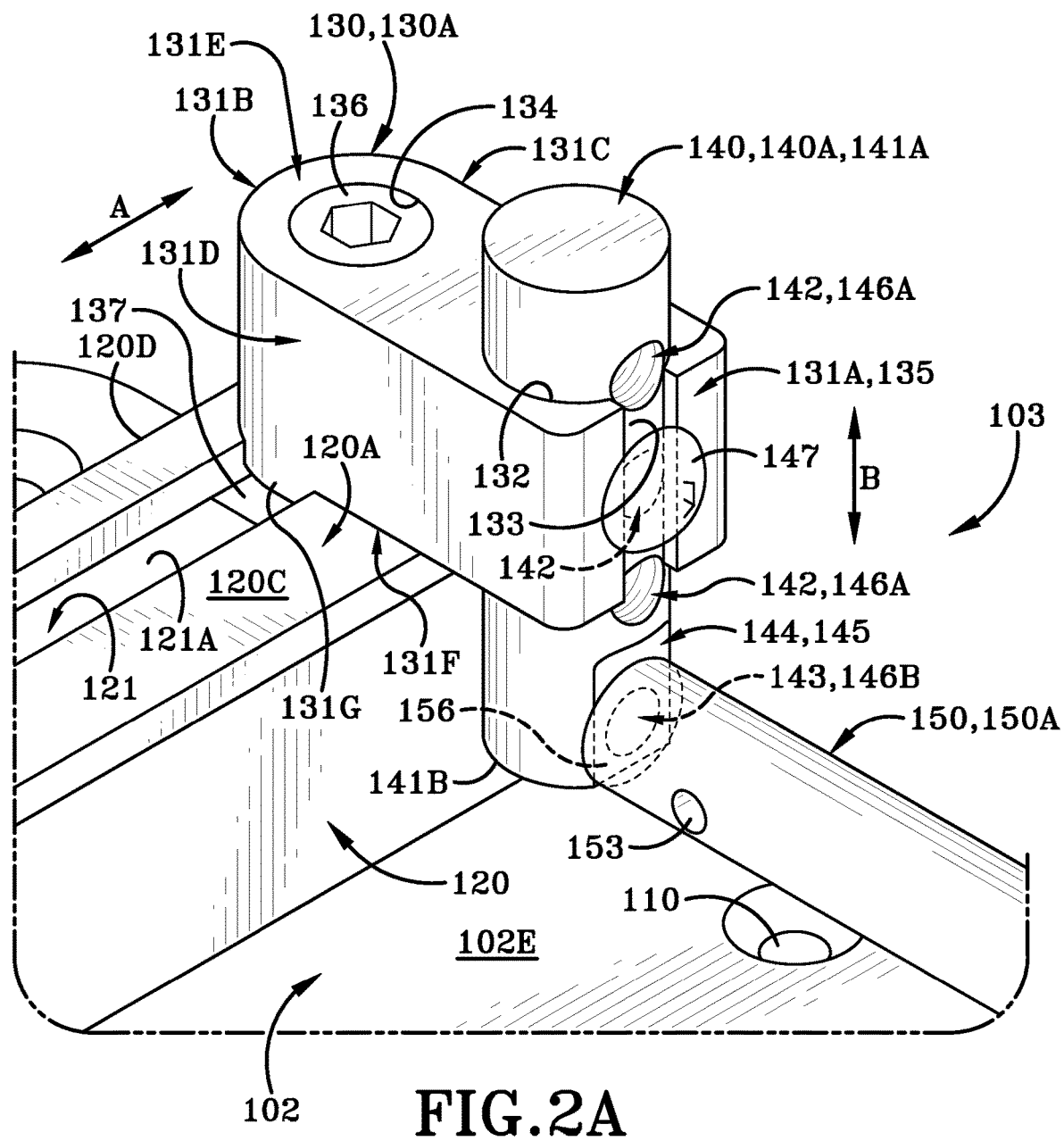
FIG. 2A is an enlargement of the highlighted region of FIG. 2.

Referring to FIG. 2A, the attachment block 130A has a front end 131A, a rear end 131B, a right side 131C, a left side 131D, a top end 131E, and a bottom end 131F. When attachment block 130A is engaged in track 120, the front end 131A faces front end 100A of router base 100 and rear end 131B faces rear end 100B of router base 100. As illustrated in FIG. 2A, the attachment block 130A defines a first passageway 132 extends from the top end 131E to bottom end 131F and is located at a distance rearwardly from front end 131A. The first passageway 132 is oriented vertically, being generally parallel to vertical axis "Z". In addition, the attachment block 130A defines a slit 133 that also extends along the vertical axis "Z" of router base 100. The slit 133 is disposed at the first end 131A of the attachment block 130A. The slit 133 is in fluid communication with vertical passageway 132 and therefore provides access to the first passageway 132. The attachment block 130A also has an extension 131G that extends downwardly from the bottom end 131F and into the upper channel 121. The extension 131G provides lateral support to the attachment block 130A when the attachment blocks 130 operably engage with the track 120 inside of the upper channel 121.

As illustrated in FIG. 2, the attachment block 130A also defines a second passageway 134 that extends from the top end 131E to bottom end 131F and is located at a distance forwardly from rear end 131B. The second passageway 132 is also oriented vertically, being generally parallel to vertical axis "Z". As illustrated in FIG. 2A, the first and second passageways 132, 134 are parallel to one another relative to the vertical axis "Z" of router base 100. The attachment block 130A also has a flat surface 135 that is disposed proximate to the front end 100A of router base 100. The flat surface 135 extends from the top end 131E to the bottom end 131F parallel to the vertical axis "Z" of router base 100. The slit 133 also bifurcates the flat surface 135 into a first portion that is disposed proximate the right side 131C of attachment block 130A and a second portion that is disposed proximate the left side 131D of attachment block 130A.

The attachment block 130A also includes fastener 136 and a nut 137. As illustrated in FIGS. 2A and 8-10, the fastener 136 extends through the second passageway 134 and operably engages the nut 137 which is located inside of the upper channel 121 of the track 120. Upon inserting the fastener 136 in to the nut 137, the nut 137 secures the attachment block 130A to the track 120 to create a locking mechanism (seen in FIGS. 8-10). If the user wishes to change the position of the attachment block 130A relative to the track 120, the user will loosen the fastener 136 by rotating the same about a vertical axis. The attachment block 130A may then be moved to a desired position on track 120 and is then rotated in the opposite direction relative to the nut in order to lock the attachment block 130A in the desired position on the track 120. Such lateral movement of the attachment block 130A along the track 120 is denoted by arrow "A" shown in FIG. 2A.

The attachment assembly 103 also includes a pair of attachment posts 140. Each attachment post 140A, 140B of the pair of attachment posts 140 operably engages with one of the attachment blocks 130A, 130B. Similar to the attachment blocks 130A, 130B, the attachment posts 140A, 140B are identical to one another and are engaged with the attachment blocks 130A, 130B in the same orientation. Inasmuch as the attachment posts 140A, 140B are identical, the following description will relate to the attachment post 140A. It should be understood, however, that the description of the attachment post 140A applies equally to the attachment post 140B.

Figure 6:
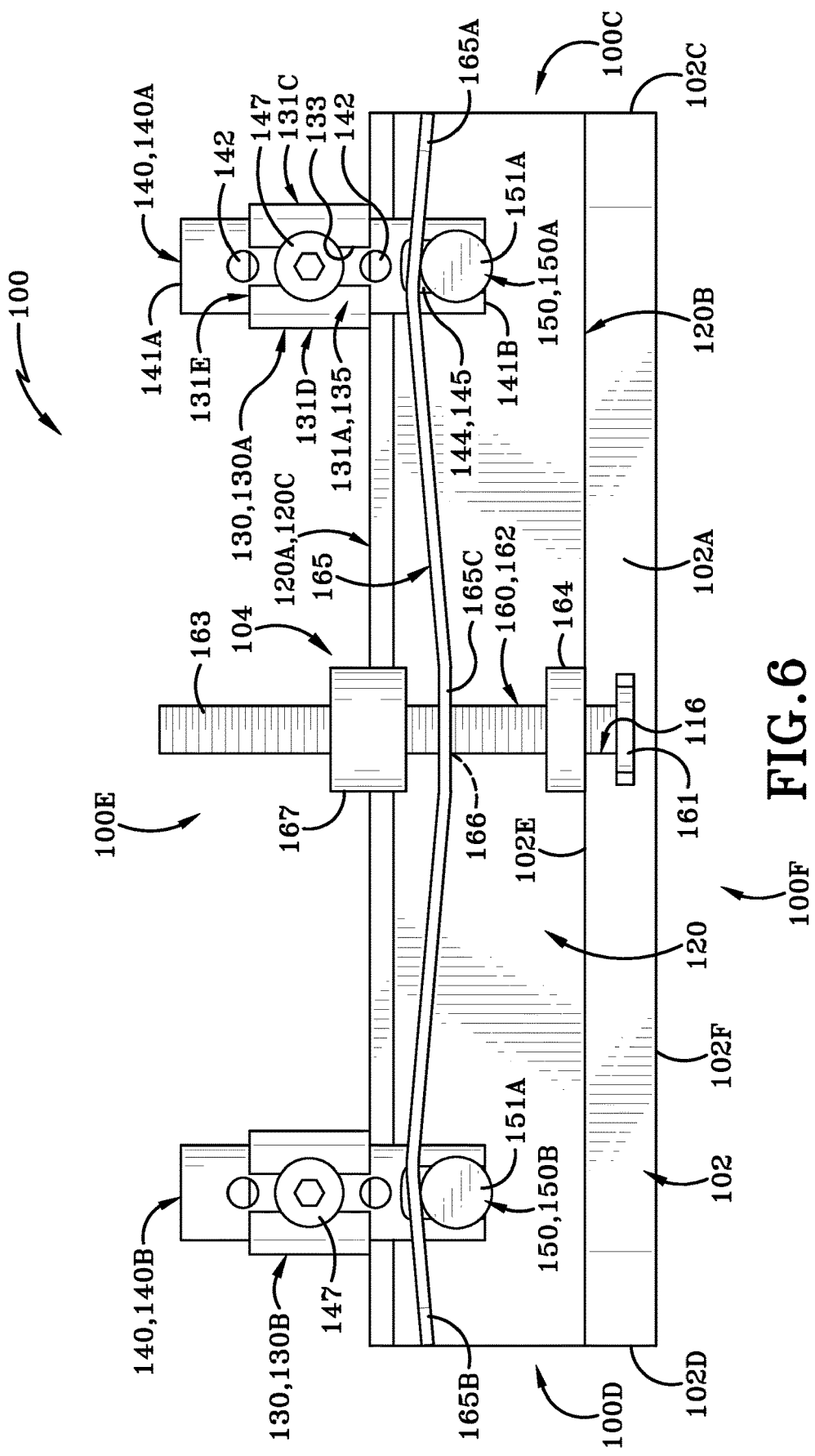
FIG. 6 is a front elevation view of the router base taken along line 6-6 of FIG. 4.

Referring to FIGS. 2A and 6, the attachment post 140A includes a top end 141A proximate to the top end 131E of the attachment block 130A and a bottom end 141B proximate to the bottom end 131F of the attachment block 130A. The attachment post 140A defines a set of height adjusting holes 142 that are positioned along the length of the attachment post 140A from the top end 141A towards the bottom end 141B. Each height adjusting hole of the set of height adjusting holes 142 extends entirely through the attachment posts 140A along the longitudinal axis "X" of router base 100. The attachment post 140A also defines a rod opening 143 that is disposed proximate to the bottom end 141B of the attachment post 140A. The rod opening 143 also extends entirely through the attachment posts 140A parallel to the longitudinal axis "X" of router base 100 and parallel to the set of height adjusting holes 142. In addition, the attachment post 140A also defines a rectangular recess 144 that extends from the exterior surface of the attachment post 140A to a flattened surface 145 and the rod opening 143. The rectangular recess 144 is disposed about the perimeter of the rod opening 143 proximate to the front end 100A of the router base 100. As illustrated in FIG. 2A, the attachment post 140A also includes a first threading 146A inside each height adjusting hole of the set of height adjusting holes 142 and a second threading 146B inside of the rod opening 143. As illustrated in FIG. 6, the attachment post 140A is inserted into the first passageway 132 of the attachment block 130A and is retained therein to a large extent by friction. A portion of the attachment post 140A is disposed inside of the first passageway 132 of the attachment block 130A upon assembly of router base 100. Another portion of attachment post 140A extends upwardly beyond the top end 131E of attachment block 130A and a further portion of attachment post 140A extends downwardly below the bottom end 131F of attachment block 130A. As illustrated in FIG. 6, the set of height adjusting holes 142 defined in attachment post 140A is aligned with the slit 133 defined in the attachment block 130A. The slit 133 makes it possible to access adjusting holes 142.

Referring to FIGS. 2A and 6, the attachment post 140A is secured in the first passageway 132 and thereby to the attachment block 130A by way of a fastener 147 to create a securement mechanism. In order for the fastener 147 to adequately secure the attachment post 140A to the attachment block 130A, at least one height adjusting hole of the set of height adjusting holes 142 is completely aligned inside of the slit 133 (see FIG. 6). The slit 133 in the front 131A of attachment block 130A makes it possible to insert a shaft of the fastener 147 through the slit 133 and into the selected one of the adjusting holes 142 that is aligned with the slit 133. The exteriorly threaded shaft of the fastener 147 is threadedly engaged with the complementary interiorly threaded adjustment hole 142. When the fastener 147 is tightened, the flat interior surface of the fastener's head adequately abuts the flat front surface 135 of the attachment block 130A and thereby clampingly secures the attachment post 140A to the attachment block 130A When it is desired to change the position of attachment post 140 relative to attachment block 130A and thereby to base plate 102, fastener 147 is loosened, and the attachment post 140A is slideably moved inside of the first passageway 132 of the attachment block 130A. As such, the length of the attachment post 140A moves vertically up or down parallel to the vertical axis "Z" of the router base 100. Such possible movement of the attachment post 140A is denoted by arrow "B" shown in FIG. 2A. Once the attachment post 140A is moved to the desired height relative to base plate 102, then fastener 147 is tightened once again to fixedly lock the attachment post 140A in the new position relative to attachment block 130A. Attachment post 140A is therefore able to move linearly up and down relative to base plate 102. The purpose of attachment post 140A and its linear movement will be discussed later herein. The attachment assembly 103 also includes a pair of attachment rods 150. Each attachment rod 150A, 150B of the pair of attachment rods 150 operably engages with the attachment posts 140A, 140B. In particular, attachment rod 150A is operably engaged with attachment post 140A and attachment rod 150B is operably engaged with attachment post 140B. Similar to the attachment blocks 130A, 130B and the attachment posts 140A, 140B, the attachment rods 150A, 150B are identical to one another. Inasmuch as the attachment rods 150A, 150B are identical, the following description will relate to the attachment rod 150A. It should be understood, however, that the description of the attachment rod 150A applies equally to the attachment rod 150B.

Figure 3:
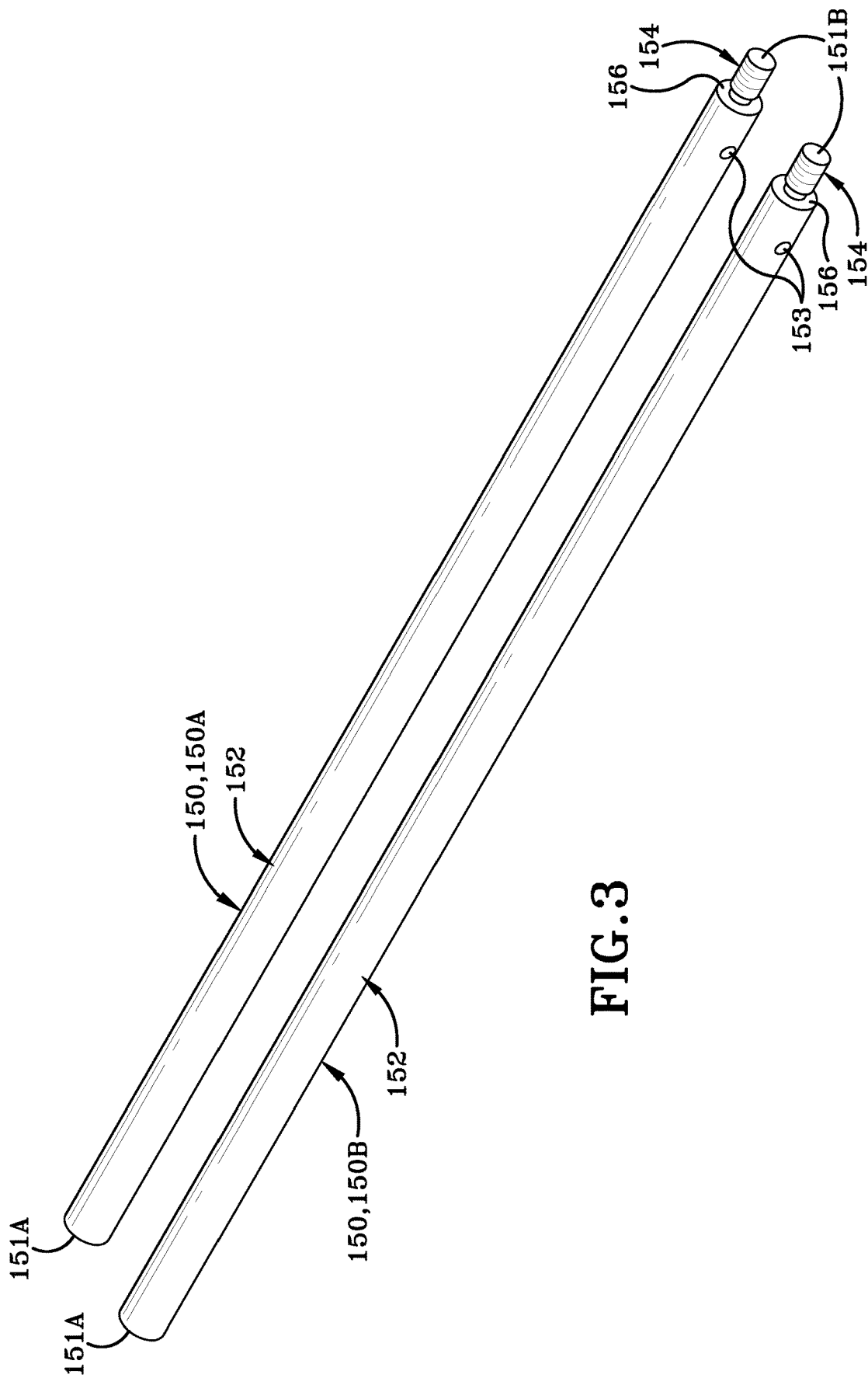
FIG. 3 is a top, rear, left side isometric perspective view of a first attachment rod and a second attachment rod of an attachment assembly of the router base illustrated in FIG. 2.

As illustrated in FIG. 3, the attachment rod 150A includes a first end 151A and an opposing second end 151B. The attachment rod 150A includes a first portion 152 that extends from the first end 151A towards the second end 151B in which the first portion 152 is blanked.

The attachment rod 150A defines a securement through hole 153 on the first portion 152 and the hole 153 extends entirely through the attachment rod along an axis that is orthogonal to a length of the attachment rod 150A. The length of rod 150A is measured between first end 151A and second end 151B. Hole 153 is located a distance inwardly from second end 151B and is sized and configured to receive a tool for further securing the attachment rod 150A into the attachment post 140A. The securing of the attachment rod 150A to attachment post 140A is described in more detail below.

The attachment rod 150A also includes a second portion 154 that extends from the first portion 152 to the second end 151B and is exteriorly threaded. The second portion 154 is complementary in shape and size to be threadingly engaged in any of the holes 142 defined in attachment post 140A. The attachment rod 150A also defines a planar, annular surface 156 on the first portion 152 of the attachment rod 150A where the diameter of the first portion 152 rod transitions to the lesser diameter second portion 154. The surface 156 is located a distance inwardly from the second end 151B of the attachment rod 150A. The planar surface 156 operably engages the flattened surface 145 of the attachment post 140A upon engagement of the attachment rod 150A with the attachment post 140A.

During assembly or prior to operation, the woodworker will choose a desired height for the installation of the attachment rods 150A, 150B. The height will be selected based on the specific router that they intend to install on router base 100. In the attached figures, the attachment rods 150A, 150B have been engaged in a middle hole 142 out of three vertically spaced-apart holes 142 defined in attachment posts 140A, 140B. The woodworker may decide that it will be more appropriate to engage the attachment posts 140A, 140B in the lowermost holes 142 in attachment posts 140A, 140B or in the uppermost holes 142 thereof. To move the attachment rods 150A, 150B, the woodworker will simply unscrew each rod 150A, 150B from its current engagement with attachment post 140A or 140B, and then screw the rod 150A, 150B into the selected uppermost hole 142 or lowermost hole 142. The woodworker will also adjust the lateral distance between the attachment posts 140A, 140B based on the type of router that they intend to engage with router base 100. This will be described further later herein.

Figure 11:
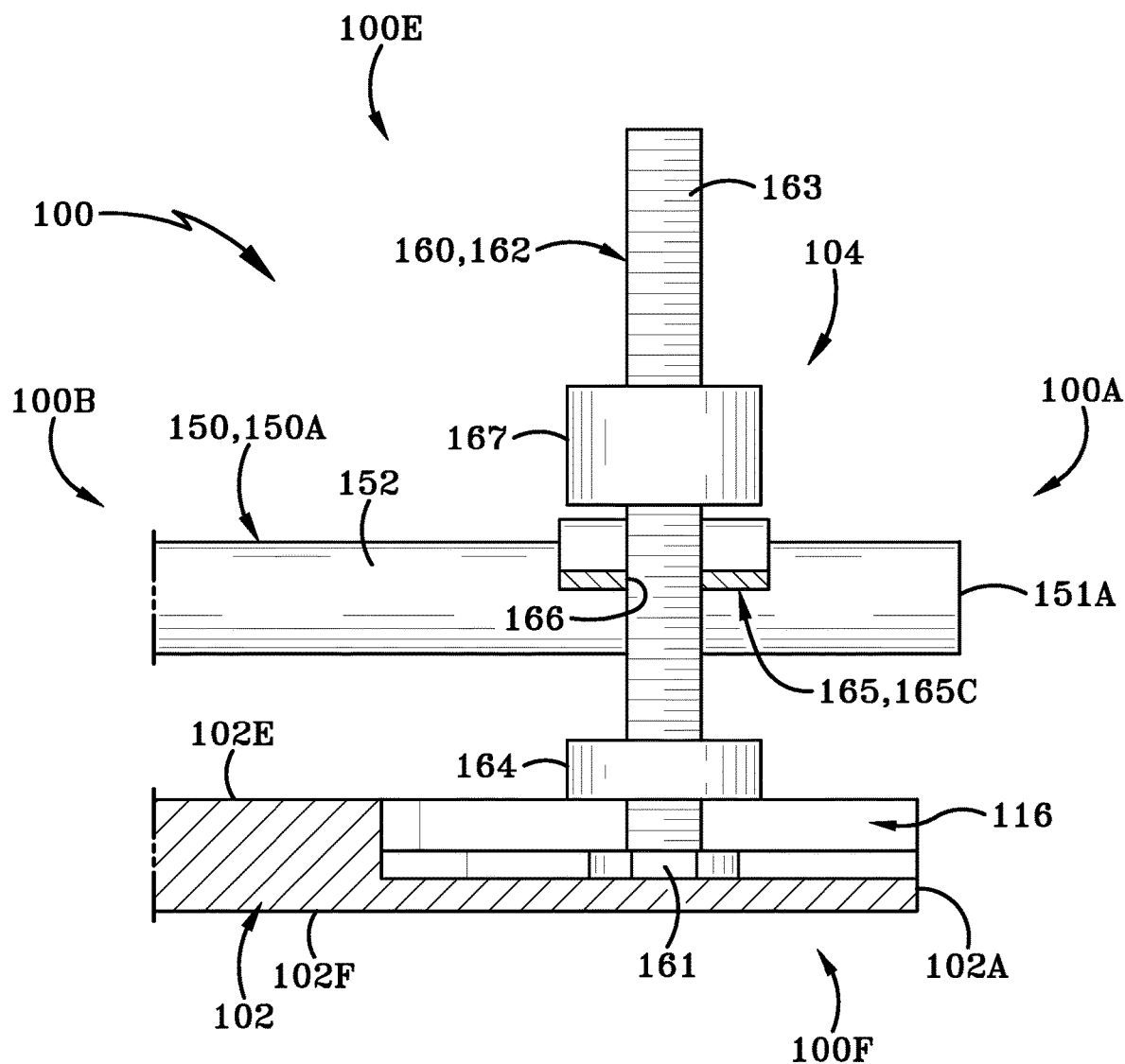
FIG. 11 is a longitudinal cross-section of a first portion of the clamp assembly of the router base taken along line 11-11 of FIG. 4.

As mentioned earlier herein, attachment assembly 103 also includes the clamp assembly 104. Clamp assembly 104 is configured to engaged attachment rods 150A, 150B and retain a router on router base 100. As illustrated in FIGS. 2, 4, 6, and 11, the clamp assembly 104 includes a fastener 160. The fastener 160 includes a head 161 that is sized and configured to be received by the slot 116 of the base plate 102 for operably engaging the clamp assembly 104 to the base plate 102. The fastener 160 also includes a shaft 162 that extends laterally upwardly from head 161 as illustrated in FIGS. 6 and 11. The fastener 160 also includes a threading 163 that extends circumferentially about the shaft 162 and along the length of the shaft 162. In one exemplary embodiment, a portion of the shaft 162 is unthreaded from the head 161 to location between the head 161 and the opposing end of the shaft 162 which is disposed inside of the slot 116. The clamp assembly 104 also includes a first nut 164 that is complementary to the threading 163 of the shaft 162 such that the first nut 164 is releasably fastened to shaft 162 of the fastener 160. Upon assembly of the first nut 164 to the fastener 160, the fastener 160 is secured to the base plate 102 along a location of the slot 116 when the first nut 164 is tightened to the fastener 160 and directly abuts the top surface 102E of the base plate 102 (see FIGS. 6 and 11). In addition, the fastener 160 is slideably moved along the slot 116 of the base plate 102 when the first nut 164 is loosened and disengages the top surface 102E of the base plate 102. Such positioning of the fastener 160 along the slot 116 of the base plate 102 is described in more detail below.

As illustrated in FIG. 6, the clamp assembly 104 includes a clamp 165. The clamp 165 includes a first bent portion 165A that is proximate to the right side 100C of the router base 100, a second bent portion 165B that is proximate to the left side 100D of the router base 100, and a planar portion 165C disposed between the first bent portion 165A and the second bent portion 165B. The clamp 165 defines an aperture 166 on the planar portion 165C that extends entirely through the clamp 165 along the vertical axis "Z" of the router base 100. The aperture 166 is sized and configured to receive and house a portion of the shaft 162 of the fastener 160 upon assembly of the clamp assembly 104.

The clamp assembly 104 also includes a second nut 167 that is complementary to the threading 163 of the shaft 162 such that the second nut 167 is releasably fastened to shaft 162 of the fastener 160. Prior to the second nut 167 engaging the fastener 160, the clamp 165 is provided on the fastener 160 through the aperture 166 defined on the clamp 165. Upon engagement of the second nut 167 to the fastener 160, the clamp 165 directly contacts the first and second attachment rods 150A, 150B along a location on each of the first and second attachment rods 150A, 150B when the second nut 167 is tightened to the fastener 160 and directly abuts the planar portion 165C of the clamp 165 (see FIG. 11). In addition, the clamp 165 is moveable along the shaft 162 of the fastener 160 when the second nut 167 is loosened and disengages the planar portion 165C of the clamp 165. Such contact between the clamp 165 and the attachment rods 150A, 150B is described in more detail later herein.

As illustrated in FIGS. 1, 2, 4, and 7-10, the micro-adjuster assembly 105 includes a first rack 170. The first rack 170 defines a first guide passageway 171 that is proximate to the right side 100C of the router base 100, a second guide passageway 172 that is proximate to the left side 100D of the router base 100, and a central guide passageway 173 that is disposed between the first guide passageway 171 and the second guide passageway 172. Each of the first guide passageway 171, second guide passageway 172, and central guide passageway 173 extends entirely through the first rack 170 along the longitudinal axis "X" of the router base 100 and orthogonal to the length of the first rack 170. As illustrated in FIG. 10, a threaded bushing 174 is disposed inside of the central guide passageway 173 proximate to the rear end 100B of the router base 100. In the illustrated embodiment, the threaded bushing 174 is press-fitted into the first rack 170 inside of the central guide passageway 173. While the threaded bushing 174 is press-fitted into the first rack 170 inside of the central guide passageway 173, a threaded bushing may operably engage a first rack inside of a central guide passageway in any suitable configuration. Examples of operably engaging a threaded bushing into a first rack inside of a central guide passageway include attaching, adhering, affixing, bonding, connecting, coupling, fastening, joining, linking, mounting, riveting, securing, welding, and other suitable configurations for operably engaging a threaded bushing into a first rack inside of a central guide passageway.

Figure 7:
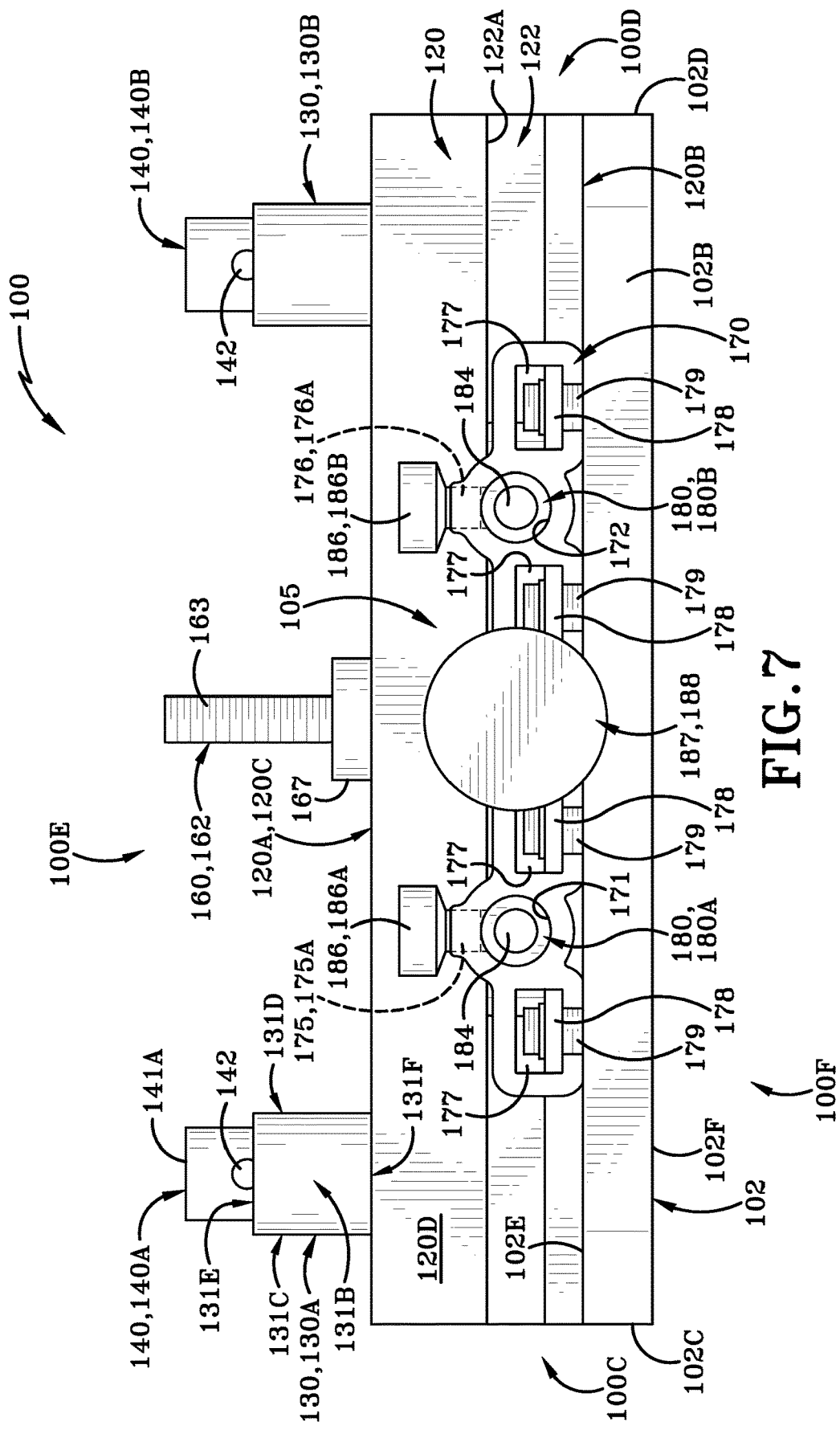
FIG. 7 illustrates a rear elevation view of the router base taken along line 7-7 of FIG. 4.

As illustrated in FIGS. 7 and 9, the first rack 170 defines a first vertical passageway 175 and a second vertical passageway 176. The first vertical passageway 175 is in communication with the first guide passageway 171 in which the first vertical passageway 175 is disposed above and orthogonally to the first guide passageway 171. Similarly, the second vertical passageway 176 is in communication with the second guide passageway 172 in which the second vertical passageway 176 is disposed above and orthogonally to the second guide passageway 172. The first rack 170 also includes a threading 175A, 176A inside each of the first vertical passageway 175 and the second vertical passageway 176.

As illustrated in FIG. 9, the first rack 170 includes a plurality of channels 177. Each channel of the plurality of channels 177 extends orthogonally to the length of the first rack 170 along the longitudinal axis "X" of the router base 100. Each channel of the plurality of channels 177 is sized and configured to receive a nut from a plurality of nuts 178 that operably engages to a fastener from a plurality of fasteners 179 to secure the first rack 170 to the base plate 102. The plurality of fasteners 179 are passed through the third plurality of openings 117 of the base plate 102 to operably engaging with the plurality of nuts 178 for securing the first rack 170 to the base plate 102.

The micro-adjuster assembly 103 also includes a pair of guide rods 180. Each guide rod 180A, 180B of the pair of guide rods 180 operably engages with the dowel 123 via the set of through holes 124. The guide rods 180A, 180B are identical to one another and are engaged with the dowel 123 via the set of through holes 124 as mirror images of one another. Inasmuch as the pair of guide rods 180A, 180B are identical, the following description will relate to the guide rod 180A. It should be understood, however, that the description of the guide rod 180A applies equally to the guide rod 180B.

As illustrated in FIG. 9, the guide rod 180A includes a first end 181A that is disposed proximate to the front end 100A of the router base 100 and a second opposing end 181B that is disposed proximate to the rear end 100B of the router base 100. The guide rod 180A also includes a blanked portion 182 that extends from the first end 181A towards the second end 181B. The diameter of the blanked portion 182 is substantially equal to the diameter of the first guide passageway 171 such that the blanked portion 182 is tightly fitted into the first rack 170 yet still laterally moveable inside of the first guide passageway 171. The guide rod 180A also includes a threaded portion 183 that extends from the blanked portion 182 to the second end 181B. The threaded portion 183 is complementary to the threading 125A of the dowel 123 such that the guide rod 180A is disposed inside the first through hole 124A and secured to the dowel 123. As illustrated in FIG. 9, the guide rod 180A also defines a chamber 184 that extends from the first end 181A towards the second end 181B. The guide rod 180A includes a threading 185 that is disposed inside of the chamber 184.

Referring to FIGS. 2 and 8 through 10, the micro-adjuster assembly 105 includes a pair of thumb screws 186. As illustrated in FIG. 8, a first thumb screw 186A of the pair of thumb screws 186 is complementary to the threading 175A of the first vertical passageway 175 of the first rack 170 such that the first thumb screw 186A is secured to the first rack 170. Similarly, as illustrated in FIGS. 8 and 10, a second thumb screw 186B of the pair of thumb screws 186 is complementary to the threading 176A of the second vertical passageway 176 of the first rack 170 such that the second thumb screw 186B is secured to the first rack 170. Still referring to FIGS. 8 and 10, the pair of thumb screws 186 may operably engage the pair of guide rods 180 to maintain the position of the pair of guide rods 180 inside of the first and second guide passageways 171, 172 relative to the base plate 102. In one exemplary embodiment, the first thumb screw 186A secures the guide rod 180A via the thumb screw 186A being tightened to the first rack 170 by a woodworker. In another exemplary embodiment, the guide rod 180 is freely moveable within the first guide passageway 171 due to the first thumb screw 186A being disengaged from the guide rod 180A.

Still referring to FIGS. 2, 9, 10, and 12, the micro-adjuster assembly 105 includes a micro-adjuster 187. Referring to FIG. 10, the micro-adjuster 187 has a first end 187A disposed proximate to the rear end 100B of the router base 100 and an opposing second end 187B disposed proximate to the front end 100A of the router base 100. The micro-adjuster 187 has a knob 188 that is disposed at the first end 187A and is attached to a shaft 189. The shaft 189 has a first threaded portion 189A that extends from the knob 188 towards the second end 187A of the micro-adjuster 187. The threaded portion 189A of the shaft 189 is complementary to the threaded bushing 174 provided in the first rack 170 in which the micro-adjuster 187 operably threads to the thread bushing 174 for transitioning the micro-adjuster 187 between first and second positions (described in more detail below). The shaft 189 also has a blanked portion 189B that extends from the first threaded portion 189A towards the second end 187B of the micro-adjuster 187. As illustrated in FIG. 10, the blanked portion 189B of the shaft 189 is disposed inside of the lower channel 122, and a portion of the blanked portion 189B is disposed inside of the first recess 126 of the dowel 123.

The shaft 189 also has a second threaded portion 189C that extends from the blanked portion 189B to the second end 187B of the micro-adjuster 187. As illustrated in FIG. 10, the second threaded portion 189C extends through the central through-hole 124C of the dowel 123 and operably engages to a lock nut 190. As such, the second threaded portion 189C is complementary to the lock nut 190 such that the second threaded portion 189C is operably threaded to the lock nut 190. Such engagement between the second threaded portion 189C and the lock nut 190 secures the micro-adjuster 187 to the dowel 123 to allow the micro-adjuster 187 to transition the attachment assembly 103 and a router between first and second positions. Such transitioning by the micro-adjuster 189 is described in more detail below. The diameter of the second threaded portion 189C is substantially equal to the diameter of the central through-hole 124C of the dowel 123 such that the second threaded portion 189C is closely fitted into the dowel 123 yet still rotatably and laterally moveable inside of the central through-hole 124C of the dowel 123 during use of the micro-adjuster 187. Moreover, first and second retaining washers 191A, 191B operably engage and contact the second threaded portion 189C. As illustrated in FIG. 10, the first retaining washer 191A is disposed proximate to the blanked portion 189B of the shaft 189 and the rear end 100B of the router base 100, and the second retaining washer 191B is disposed proximate to the lock nut 190 and the front end 100A of the router base 100. As such, the lock nut 190, the first retaining washer 191A, and the second retaining washer 191B collectively maintain the second threaded portion 189C inside of the dowel 123 to prevent any backing out of or forward moving of the shaft 189 inside of the lower channel 122 of the track 120. In other words, the combination of the lock nut 190, the first retaining washer 191A, and the second retaining washer 191B allows the second threaded portion 189C to rotate freely inside of the dowel 123 while still being maintained inside of and connected to said dowel 123.

Figure 14:
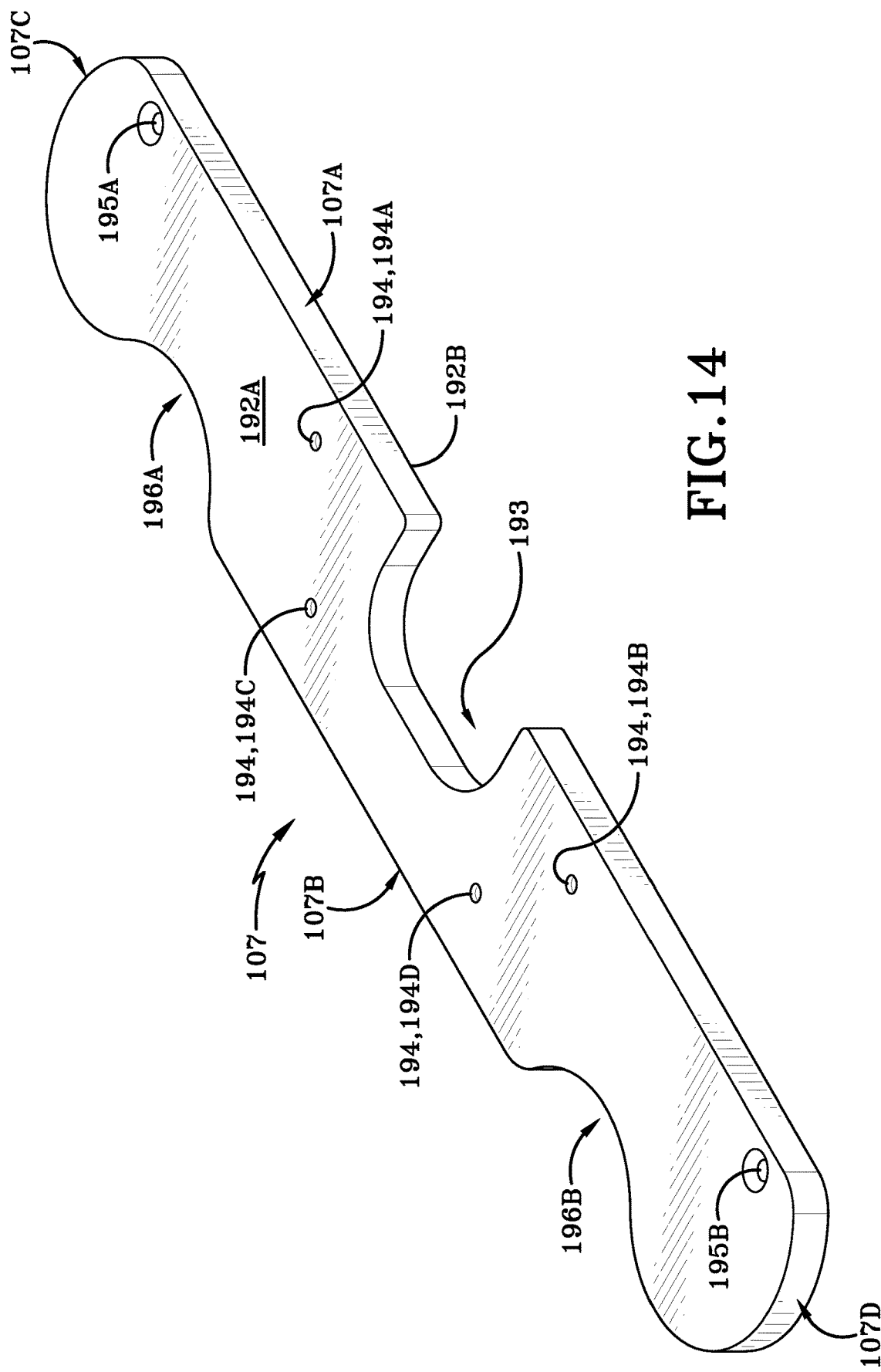
FIG. 14 is a top, front, left side isometric perspective view of a fence of the expansion assembly illustrated in FIG. 1.

As illustrated in FIG. 14, the edge guiding fence 107, which is referred to herein as fence 107, includes a first end 107A, a second end 107B opposite to the first end 107A, a right side 107C, and a left side 107D opposite to the right side 107C. The fence 107 also includes a top surface 192A that faces towards the top end 100E of the router base 100 and a bottom surface 192B that faces towards the bottom end 100F of the router base 100. The fence 107 also includes a rounded-square shaped notch 193 that extends laterally into the fence 107 from the first end 107A towards the second end 1078 along the longitudinal axis "X" of the router base 100. The notch 193 provides additional space and/or clearance between the fence 107 and a router during cutting operation, which is described in more detail below.

The fence 107 also includes a set of apertures 194 that extends entirely through the fence 107 from the top surface 192A to the bottom surface 1928 along the vertical axis "Z" of the router base 100. In the illustrated embodiment, the set of apertures defines four apertures. A first aperture 194A of the set of apertures 194 is disposed between the right side 107C of the fence 107 and the notch 193 and proximate to the first end 107A of the fence 107. A second aperture 1948 of the set of apertures 194 is disposed between the left side 107D of the fence 107 and the notch 193 and proximate to the first end 107A of the fence 107. A third aperture 194C of the set of apertures 194 is disposed between the right side 107C of the fence 107 and the notch 193 and proximate to the second end 107B of the fence 107. A fourth aperture 194D of the set of apertures 194 is disposed between the left side 107D of the fence 107 and the notch 193 and proximate to the second end 107B of the fence 107. As illustrated in FIG. 14, the first aperture 194A and the second aperture 194B of the set of apertures 194 are aligned with one another along an axis relative to the transverse axis "Y" of the router base 100. Similarly, the third aperture 194C and the fourth aperture 194D of the set of apertures 194 are aligned with one another along an axis relative to the transverse axis "Y" of the router base 100. In addition, the fence 107 includes a threading (not illustrated) inside each of the first, second, third, and fourth apertures 194A, 194B, 194C, 194D.

The fence 107 also defines a first through hole 195A and a second through hole 195B that extend entirely through the fence 107 from the top surface 192A to the bottom surface 192B along the vertical axis "Z" of the router base 100. The first through hole 195A is disposed at the first end 107A and proximate to the right side 107C of the fence 107. The second through hole 195B is disposed at the front end 107A and proximate to the left side 107D of the fence 107. As illustrated in FIG. 14, the first through hole 195A and the second through hole 195B are aligned with one another along an axis relative to the transverse axis "Y" of the router base 100 Each of the first and second through holes 195A, 195B are also recessed at the top surface 192A of the fence 107 similar to the first and second rows of openings 110, 111 defined on the base plate 102.

The fence 107 also includes first and second grips 196A, 196B along the second end 107B of the fence 107. The first and second grips 196A, 196B allows a user to ergonomically handle and/or hold the fence 107 while performing a cutting process with the router base 100.

Figure 13:
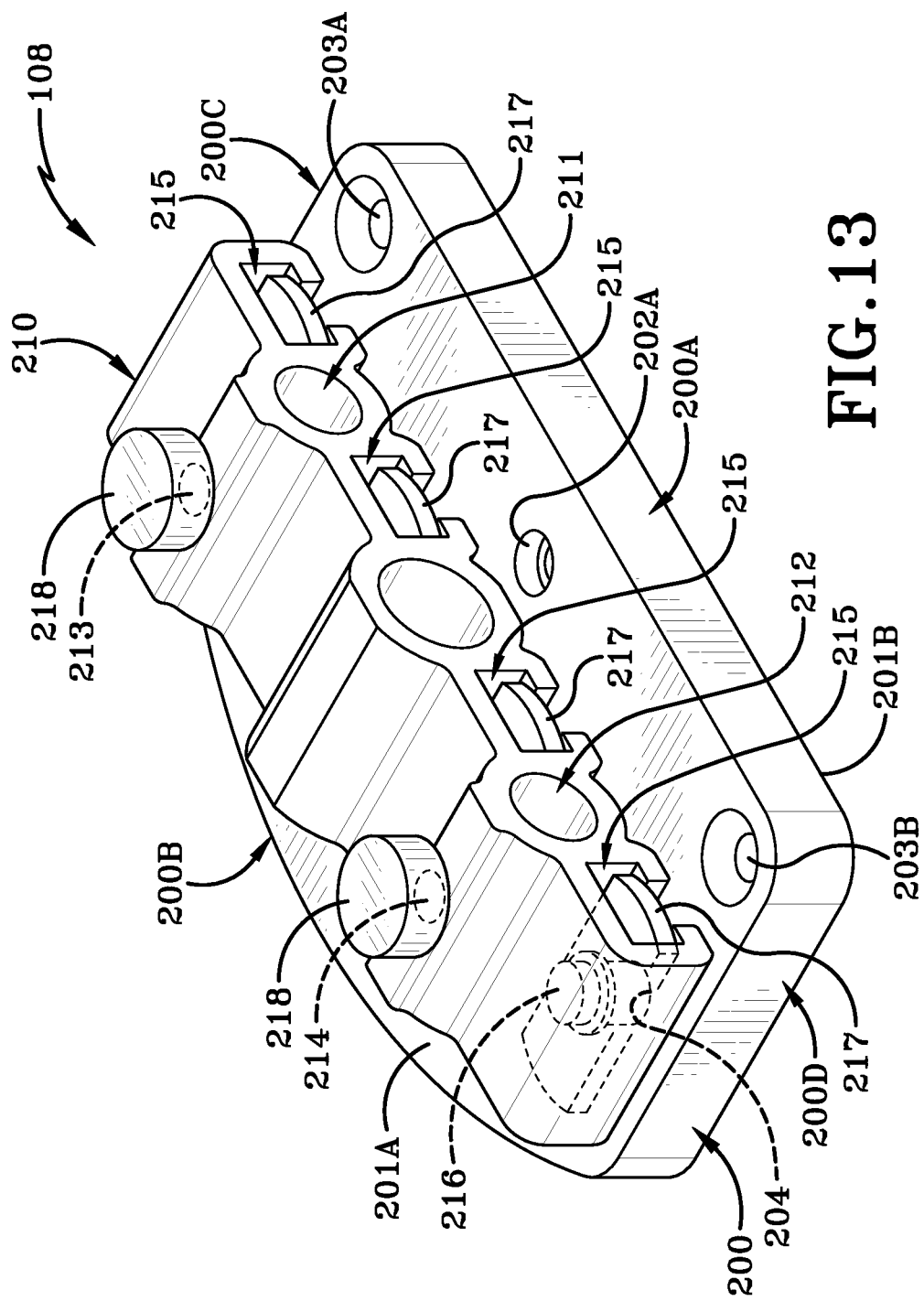
FIG. 13 is a top, front, left side isometric perspective view of a plate and a second rack of the expansion assembly illustrated in FIG. 1.

As illustrated in FIG. 13, the expansion assembly 108 includes a plate 200. The plate 200 includes a front or first end 200A, a rear or second end 200B that is opposite to the first end 200A, a right side 200C, and a left side 200D that is opposite to the right side 200C. The plate 200 includes a top surface 201A that faces towards to the top end 100E of the router base 100 and a bottom surface 201B that faces towards to the bottom end 100F of the router base 100.

Figure 22:
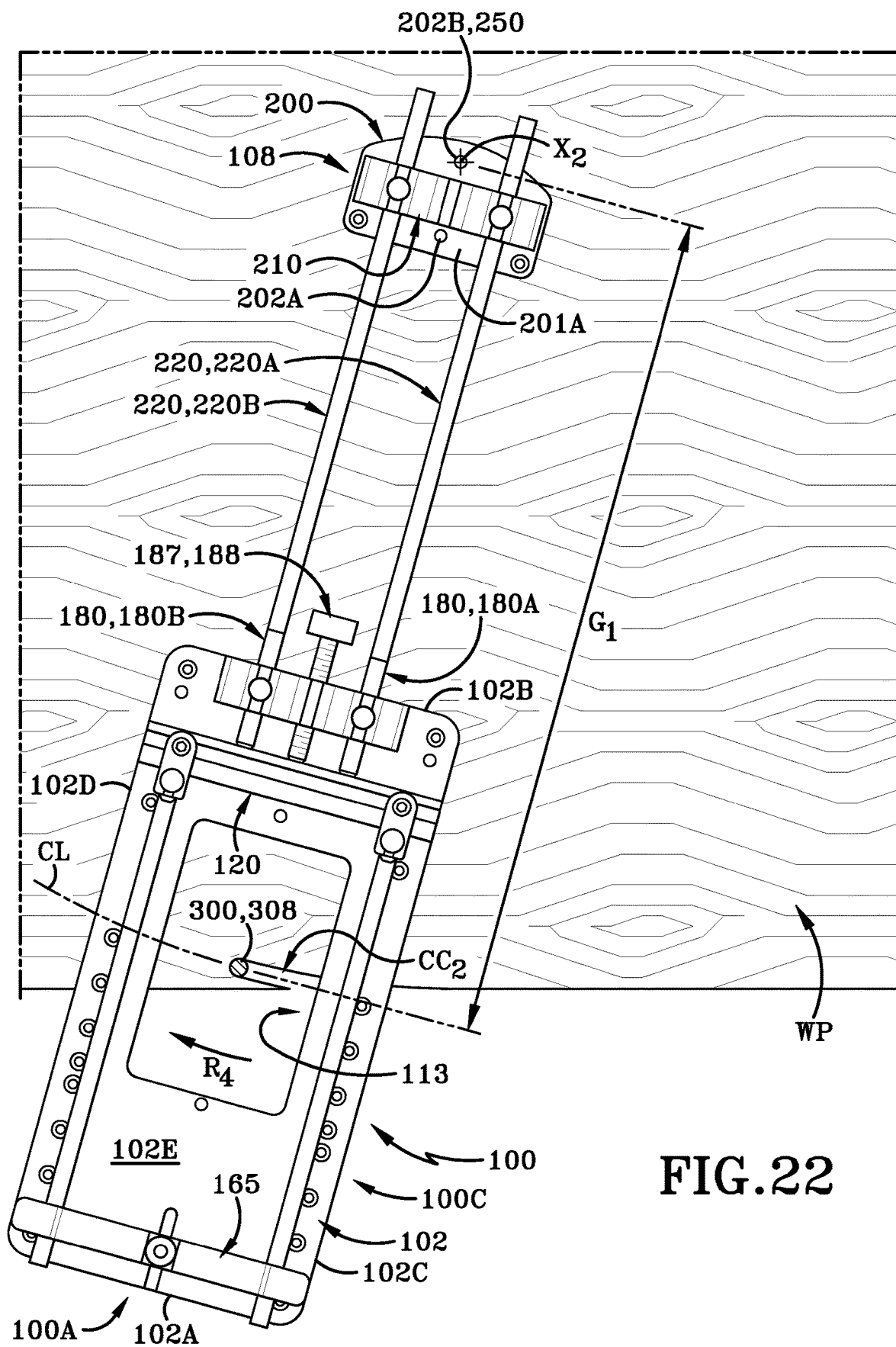
FIG. 22 is a top plan view elevation of the router base operatively engaged with an alternative embodiment of the expansion assembly, wherein the trammel pin is engaged with a plate of the expansion assembly, wherein the expansion assembly is engaged with the workpiece via the trammel pin, and the router base is pivoted about the trammel pin in order to enable the router cutting bit to cut an arc into the workpiece.

Referring to FIGS. 13 and 22, the plate 200 defines first and second trammel apertures 202A, 202B that extend entirely through the plate 200 from the top surface 201A to the bottom surface 201B along the vertical axis "Z" of the router base 100. The first trammel aperture 202A is disposed between the first and left sides 200C, 200D of the plate 200 and is proximate to the first end 200A of the plate 200. The second trammel aperture 202B is disposed between the first and left sides 200C, 200D of the plate 200 and is proximate to the second end 200B of the plate 200. The first and second trammel apertures 202A, 202B are aligned with one another along the longitudinal axis "X" of the router base 100.

Referring to FIG. 13, the plate 200 also defines a first through hole 203A and a second through hole 203B that extend entirely through the plate 200 from the top surface 201A to the bottom surface 201B along the vertical axis "Z" of the router base 100. The first through hole 203A is disposed at the first end 200A and proximate to the right side 200C of the plate 200. The second through hole 203B is disposed at the front end 200A and proximate to the left side 200D of the plate 200. As illustrated in FIG. 13, the first through hole 203A and the second through hole 203B are aligned with one another along an axis relative to the transverse axis "Y" of the router base 100 Each of the first and second through holes 203A, 203B are also recessed at the top surface 201A of the plate 200 similar to the first and second rows of openings 110, 111 defined by the base plate 102.

Still referring to FIG. 13, The plate 200 also defines a plurality of openings 204 that are disposed between the first and left sides 200C, 200D of the plate 200. The plurality of openings 204 extends entirely through the plate 200 from the top surface 201A to the bottom surface 201B along the vertical axis "Z" of the router base 100. Each opening of the plurality of openings 204 is also recessed at the bottom surface 201B of the plate 200.

Still referring to FIG. 13, the expansion assembly 108 also includes a second rack 210 that is substantially similar to the first rack 170 of the micro-adjuster assembly 105. As such, first and second guide passageways 211, 212 of the second rack 210 are substantially similar to the first and second guide passageways 171, 172 of the first rack 170. In addition, first and second vertical passageways 213, 214 with threading (not illustrated) included inside of the first and second vertical passageways 213, 214 of the second rack 210 are substantially similar to the first and second vertical passageways 175, 176 with threading 175A, 176A included inside of the first and second vertical passageways 175, 176 of the first rack 170. The second rack 210 also includes a plurality of channels 215 similar to the plurality of channels 177 provided on the first rack 170. In addition, the second rack 210 includes a plurality of fasteners 216 operably threaded to a plurality of nuts 217 for securing the second rack 210 to the plate 200, which is substantially similar to the first rack 170 that includes the plurality of fasteners 179 operably threaded to the plurality of nuts 178 for securing the first rack 170 to the base plate 102. Moreover, a pair of thumb screws 218 are operably threaded to the first and second vertical passageways 213, 214 of the second rack 210 similar to the pair of thumb screws 186 operably threaded to the first and second vertical passageways 175, 176 of the first rack 170. However, the second rack 210 omits the threaded bushing 174 included in the first rack 170 since a micro-adjuster is not included in the second rack 210.

Figure 15:
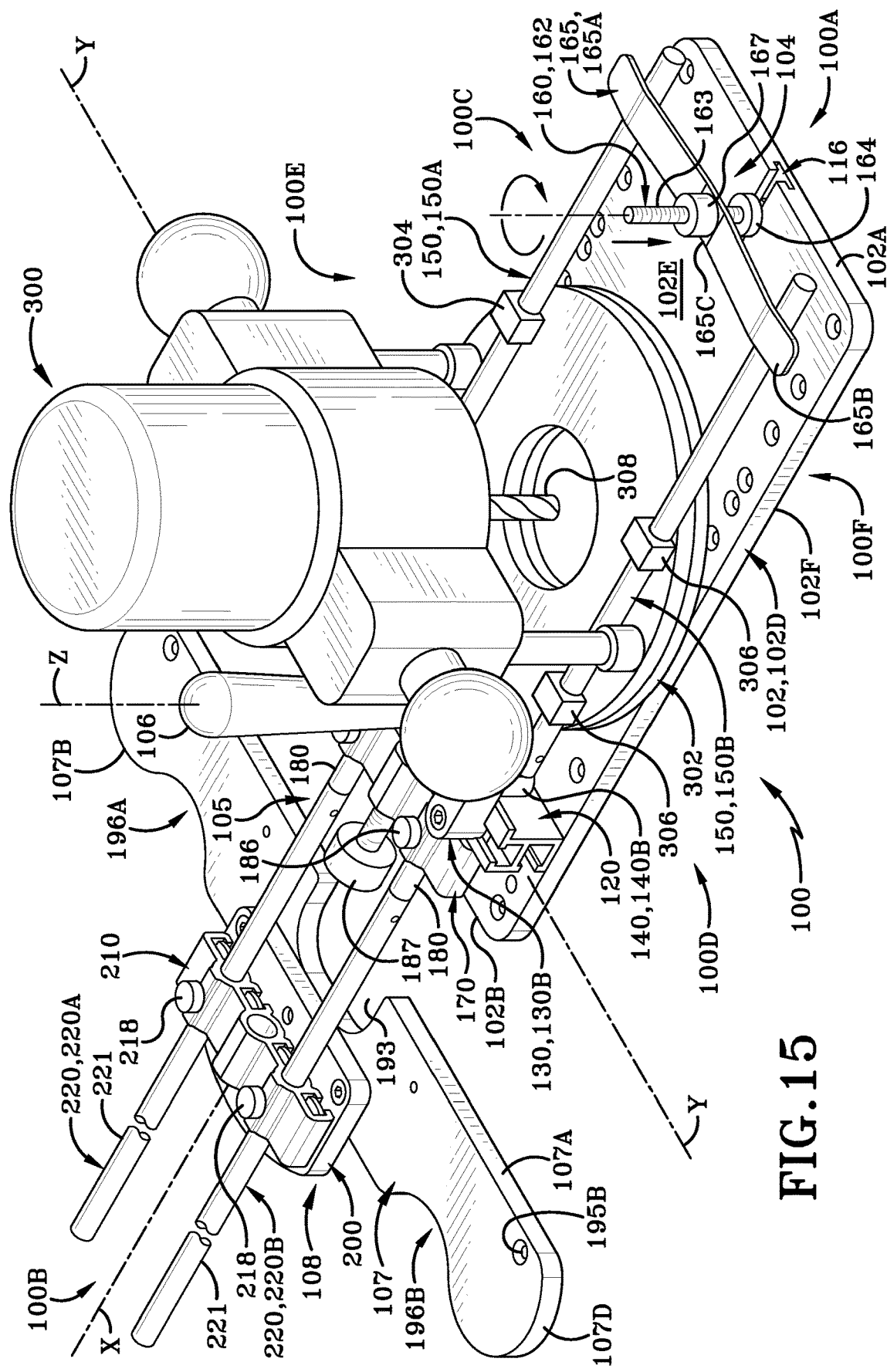
FIG. 15 is a top, front, left side isometric perspective view of the router base similar to FIG. 14 but showing the router engaged with the router base.

As illustrated in FIGS. 1, 15, and 22, the expansion assembly 108 also includes at least one extension rod 220. In the illustrated embodiment, the expansion assembly 108 includes a pair extension rods 220 that are substantially similar to the guide rods 180 of the micro-adjuster assembly 105. However, the extension rods 220A, 220B of the pair of extension rods 220 are greater in length than the guide rods 180 due to the extension rods 220 providing greater overall length to the router base 100 during cutting processes. Such use of the extension rods 220 during cutting processes are described in more detail below. In addition, a portion of each extension rod 220 is slidably disposed inside of the first and second guide passageways 211, 212 of the second rack 210. The diameters of the extension rods 220 are substantially equal to the diameters of the first and second guide passageways 211, 212 such that blanked portions 221 of the extension rods 220 are closely fitted into the second rack yet still laterally moveable between first and second positions inside of the first and second guide passageways 211, 212. Moreover, the extension rods 220 may be maintained in a desired position via the thumb screws 218 be tightened onto the extension rods 220 to prevent lateral movement of the extension rods 220 during a cutting process. Threaded portions (not illustrated) of the extension rods 220 may also be operably threaded to the threadings 185 inside of the chambers 184 of the guide rods 180 for securing the expansion assembly 108 to the micro-adjuster assembly 103.

While the illustrated embodiment illustrates a pair of extensions rods 220 used in the expansion assembly 108, the woodworker of the router base 100 may attach addition pairs of extensions rods onto the expansion assembly 108 to extend the overall length of the router base 100 for desired cutting processes. As such, any suitable number of pairs of extension rods may be provided to extend the overall length of a router base. Example numbers of pairs of extensions rods provided in the expansion assembly include zero, one, at least one, two, plurality, three, or any suitable number of pairs of extensions rods provided in the expansion assembly to extend the overall length of a router base.

Having described the structure of the router base 100 and the various components and connections thereof within router base 100, methods of use thereof will now be described.

Prior to using the router base 100 on a workpiece, a router must be provided on the router base 100. As illustrated in FIG. 12, a router 300 is provided to be used with the router base 100. The router 300 includes a bottom plate 302, a first pair of mounting blocks 304 that defines through holes 305 provided on the bottom plate 302, a second pair of mounting blocks 306 that defines through holes 307 provided on the bottom plate 302, and a cutting bit 308 operably engaged to the router for cutting into a workpiece. Once the router 300 is provided, the attachment rods 150A, 150B are inserted into the router 300 via the first and second pairs of mounting blocks 304, 306. In other words, the attachment rod 150A is inserted into the through holes 305 of the first pair of mounting blocks 306, and the attachment rod 150B is inserted into the through holes 307 of the second pair of mounting blocks 306. Once the attachment rods 150A, 150B are disposed in the first and second pairs of mounting blocks 304, 306, the attachment rods 150A, 150B may operably engage the attachment posts 140A, 140B to secure the attachment rods 150A, 150B and the router 300 to the router base 100. As illustrated in FIG. 15, the attachment rod 150A operably engages the attachment post 140A by the threading 155 of the second portion 154 operably threading to the second threading provided inside of the rod opening 143. The attachment rod 150B and the attachment posts 140B are operably threaded to one another substantially similar to the attachment rod 150A and the attachment post 140A operably threaded to one another. In addition, the first attachment rod 150A and the second attachment rod 150B may be transversely linearly moveable relative to one another along a transverse axis defined by the base plate 102 that is parallel to the transverse axis "Y" of the router base 100. Furthermore, the first attachment rod 150A and the second attachment rod 150B may also be vertically linearly moveable relative to the base plate 102 along a vertical axis defined between the top and bottom surfaces 102E, 102F of the base plate 102 that is parallel to the vertical axis "Z" of the router base 100.

Prior to the attachment rods 150A, 150B operably threading into the attachment posts 140A, 140B, the attachment blocks 130A, 130B and the attachment posts 140A, 140B may be adjusted depending on the size, shape, and/or configuration of the router 300. In one exemplary embodiment, the attachment blocks 130A, 130B may be transversely laterally moved along the upper channel 121 of the track 120 between the right and left sides 100C, 100D of the router base 100 to align with the attachment rods 150A, 150B due to the width of the first and second pairs of mounting blocks 304, 306 on the bottom plate 302. In this exemplary embodiment, the fastener 136 provided in each of the attachment blocks 130A, 130B would be loosened and the associated nut 137 would disengaged from the track 120 to allow lateral movement along the upper channel 121 for each of the attachment blocks 130A, 130B. In another exemplary embodiment, the attachment posts 140A, 140B may be vertically laterally moved along the first passageway 132 between the top and bottom ends 100E, 100F of the base plate 102 to align with the attachment rods 150A, 150B with the height of the first and second pairs of mounting blocks 304, 306 on the bottom plate 302. In this exemplary embodiment, the fasteners 147 may be provided in any one of the alignment holes 142 that is defined along the attachment posts 140A, 140B due to the height at which the attachment rods 150A, 150B are positioned based on the height of the first and second pairs of mounting blocks 304, 306. In addition, the fastener 147 provided in each of the attachment posts 140A, 140B would be loosened to allow vertical movement for each of the attachment posts 140A, 140B along each first passageway 132 of the attachment blocks 130A, 130B.

Once the attachment blocks 130A, 130B and the attachment posts 140A, 140B are adjusted, the woodworker may then secure each attachment rod 150A, 150B into the respective rod opening 143 of each attachment post 140A, 140B. As illustrated in FIGS. 14 and 15, the threading 155 provided on the second portion 154 of each attachment rod 150A, 150B operably threads with the second threading 146B provided inside each respective rod opening 143 of each attachment post 140A, 140B. Optionally, the woodworker may use a hand tool (e.g., pick, screwdriver, etc.) to further tighten and secure the attachment rods 150A, 150B to the attachment posts 140A, 140B by inserting the hand tool through the through hole 153 defined by each attachment rod 150A, 150B.

The woodworker may then center the router 300 inside of the central opening 113 defined by the base plate 102 between the front and rear ends 100A, 1006 of the router base 100. As such, the woodworker may laterally move the router 300 along the first portions 152 of the attachment rods 150A, 150A until the bottom plate 302 is centered to the woodworker's desire. The woodworker may also center the router 300 inside of the central opening 113 defined by the base plate 102 between the front and rear ends 100A, 1006 of the router base 100. As such, the woodworker may collectively move the attachment blocks 130, attachment posts 140, attachment rods 150, and router 300 between the right and left sides 100C, 100D until the bottom plate 302 is centered to the woodworker's desire. To help center the bottom plate 302, the woodworker may use the first trammel opening 114A and/or the second trammel opening 1146 defined by the base plate 102. Once the bottom plate 302 is centered to the woodworker's liking, the woodworker may then tighten the fastener 136 provided in each of the attachment blocks 130A, 130B to the associated nut 137 to directly engage and contact the track 120 inside of the upper channel 121 to prevent lateral movement of the attachment blocks 130A, 130B along the upper channel 121. Additionally, the woodworker may then tighten the fastener 147 into any one of the of alignment holes 142 defined in each of the attachment posts 140A, 140B to prevent vertical movement of each of the attachment posts 140A, 140B along each first passageway 132 of the attachment blocks 130A, 130B.

Once the router 300 is centered inside of the central opening 113 defined by the base plate 102, the woodworker may then operably engage the clamp assembly 104 to the base plate 102 and to the attachment rods 150A, 150B. As such, the head 161 of the fastener 160 is inserted into the inverted T-shaped slot 116 towards the central opening 113 of the base plate 102. The woodworker then operably threads the first nut 164 onto threading 163 of the shaft 162. The woodworker may operably thread the first nut 164 along the threading 163 of the shaft 162 towards the top surface 102E of the base plate 102 in which the first nut 164 is disengaged with the top surface 102E. The woodworker then introduces the clamp 165 to the shaft 162 such that the shaft 162 is inserted through the aperture 166 of the clamp 165. The woodworker then operably threads the second nut 167 onto threading 163 of the shaft 162. The woodworker may operably thread the second nut 167 along the threading 163 of the shaft 162 towards the clamp 165 in which the second nut 167 is disengaged with the clamp 165. The woodworker may then collectively move the fastener 160, the first nut 164, the clamp 165, and the second nut 167 laterally along the slot 116 until the first and second bent portions 165A, 1656 are contacting the attachment roads 150A, 150B proximate to the first ends 151A of the attachment rods 150A, 150B. Once a suitable location has been determined by the woodworker, the woodworker tightens the first nut 164 to the top surface 102E of the base plate 102 to maintain the position of the clamp assembly 104 along the slot 116. In addition, the woodworker then tightens the second nut 167 to the planar portion 165C on the clamp 165 to maintain the position of the clamp 165 on the attachment rods 150A, 150B.

Optionally, the extension rods 220A, 220B of the expansion assembly 108 may be secured to the guide rods 180A, 180B prior to or after the router 300 is secured to the router base 100. As illustrated in FIG. 15, the woodworker may operably thread a threaded portion of each extension rod 220A, 220B into the threading 185 inside the chamber 184 of each guide rod 180A, 180B. Optionally, the woodworker may use a hand tool (e.g., pick, screwdriver, etc.) to further tighten and secure the extension rods 220A, 220B to the guide rods 180A, 180B by inserting the hand tool through a through hole 223 defined by each extension rod 220A, 220B. The woodworker may also introduce the plate 200 and the second rack 210 to operably engage with the extension rods 220A, 220B. As such, a portion of each extension rod 220A, 220B is disposed inside of the second rack 210 such that the first extension rod 220A is disposed inside of the first guide passageway 211 and the second extension rod 220B is disposed inside of the second guide passageway 212. In addition, the thumb screws 218 provided in the first and second vertical passageways 213, 214 are loosened such that the thumb screws 218 are not contacting the extension rods 220A, 220B. As such, the expansions rods 220A, 220B are freely moveable inside of the second rack 210. Such adjustment and positioning of the expansions rods 220A, 220B during cutting processes are described in more detail below.

Optionally, the plate 200 of the expansion assembly 108 may be secured to the fence 107 via at least one fastener 230. As illustrated in FIGS. 1 and 15, the plate 200 is secured to the fence 107 via fasteners 230 passing through the first and second through holes 203A, 203B and securing into threading disposed inside of the first and second apertures 194A, 1946 of the fence 107.

As described below and illustrated in FIGS. 16A-22, the router base 100 provides multiple configurations to allow the woodworker to cut into a workpiece for different types of uses with or without the expansion assembly 108.

Figure 16A:
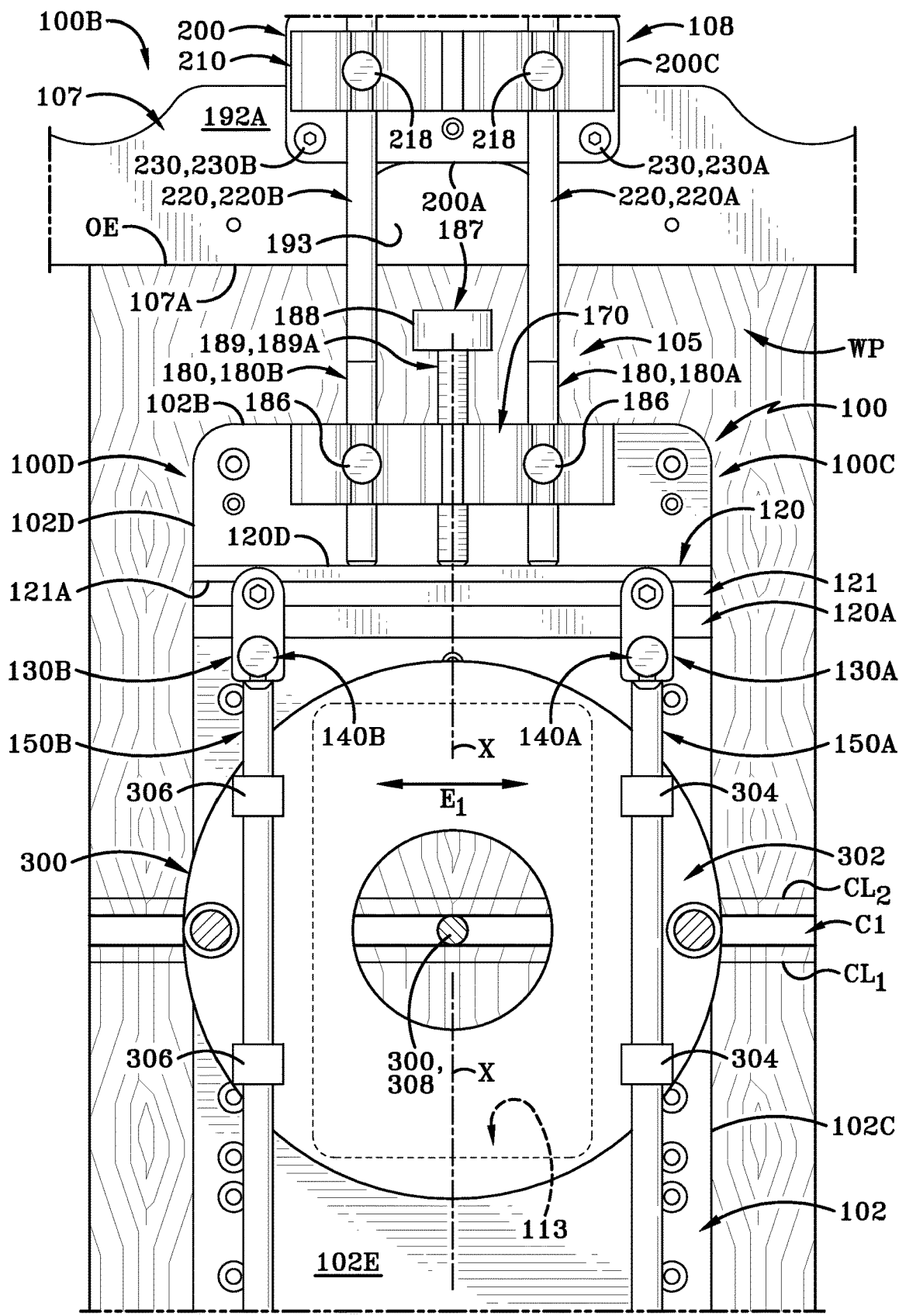
FIG. 16A is a partial top plan view of the router base similar to FIG. 15 but only showing a bottom of the router operably engaged to the router base and showing the fence positioned for the router to cut a straight line spaced a distance away from an edge of a workpiece.

As illustrated in FIGS. 16A-16E, the expansion assembly 108 is included in this cutting process. Prior to introducing the assembled router base 100 to a workpiece "WP", the woodworker scribes a first predetermined cut line "$CL_1$" and a second predetermined cut line "$CL_2$" along the width of the workpiece "WP". Once the first and second predetermined cut lines "$CL_1$", "$CL_2$" are scribed on the workpiece "WP", the woodworker will roughly align the cutting bit 308 between the first and second predetermined cut lines "$CL_1$", "$CL_2$" prior to cutting. To do this, the woodworker aligns the fence 107 with an outermost edge "OE" of the workpiece "WP" that is parallel to the first and second predetermined cut lines "$CL_1$", "$CL_2$" to which the front end 107A of the fence 107 directly abuts the outermost edge "OE" of the workpiece "WP". Once the fence 107 abuts the workpiece "WP", the woodworker will then laterally move the base plate 102 (including all associated assemblies attached to the base plate 102) and the router 300 along the longitudinal axis "X" of the router base 100 via the extension rods 220A, 220B. Once the cutting bit 308 is roughly aligned between the first and second predetermined cut lines "$CL_1$", "$CL_2$", the woodworker tightens the pairs of thumb screws 186, 218 to the first and second vertical passageways 175, 176, 213, 214 to secure the guide rods 180A, 180B and the extension rods 220A, 220B to the first and second racks 170, 210. Such securement prevents lateral movement of the guide rods 180A, 180B and the extensions rods 220A, 220B during the cutting process. Once secured, the woodworker may perform a first cut "C1" into the workpiece "WP" parallel to the first and second predetermined cut lines "$CL_1$", "$CL_2$" (as seen in FIG. 16A). Such cutting movement is denoted as arrow "$E_1$".

Once the first cut "C1" is complete, the woodworker will then precisely align the cutting bit 308 to the first predetermined cut line "$CL_1$" such that the leading cutting edge of the cutting bit 308 is directly aligned with the first predetermined cut line "$CL_1$". Prior to alignment, the woodworker will loosen the pairs of thumb screws 186, 218 from the first and second vertical passageways 175, 176, 213, 214 to allow movement of the guide rods 180A, 1806 and the extension rods 220A, 220B inside of the first and second racks 170, 210. Once loosened, the woodworker will apply a first rotational force onto the knob 188 of the micro-adjuster 187 about an axis of rotation to collectively move the base plate 102 (and all associated assemblies and parts provided on the base plate 102) and the router 300 towards the front end 100A of the router base 100 so the cutting bit 308 is directly aligned with the first predetermined cut line "$CL_1$". The first rotational force is denoted by arrow "$R_1$", and the axis of rotation defined along the shaft 189 of the micro-adjuster 187 is denoted by "$X_1$". The guide rods 180A, 180B and the extensions rods 220A, 220B also collectively transition towards the front end 100A of the router base 100 through the first and second racks 170, 210 due to the linearly movement caused by the micro-adjuster 187 (denoted by arrows "$LM_1$").

Figure 16B:
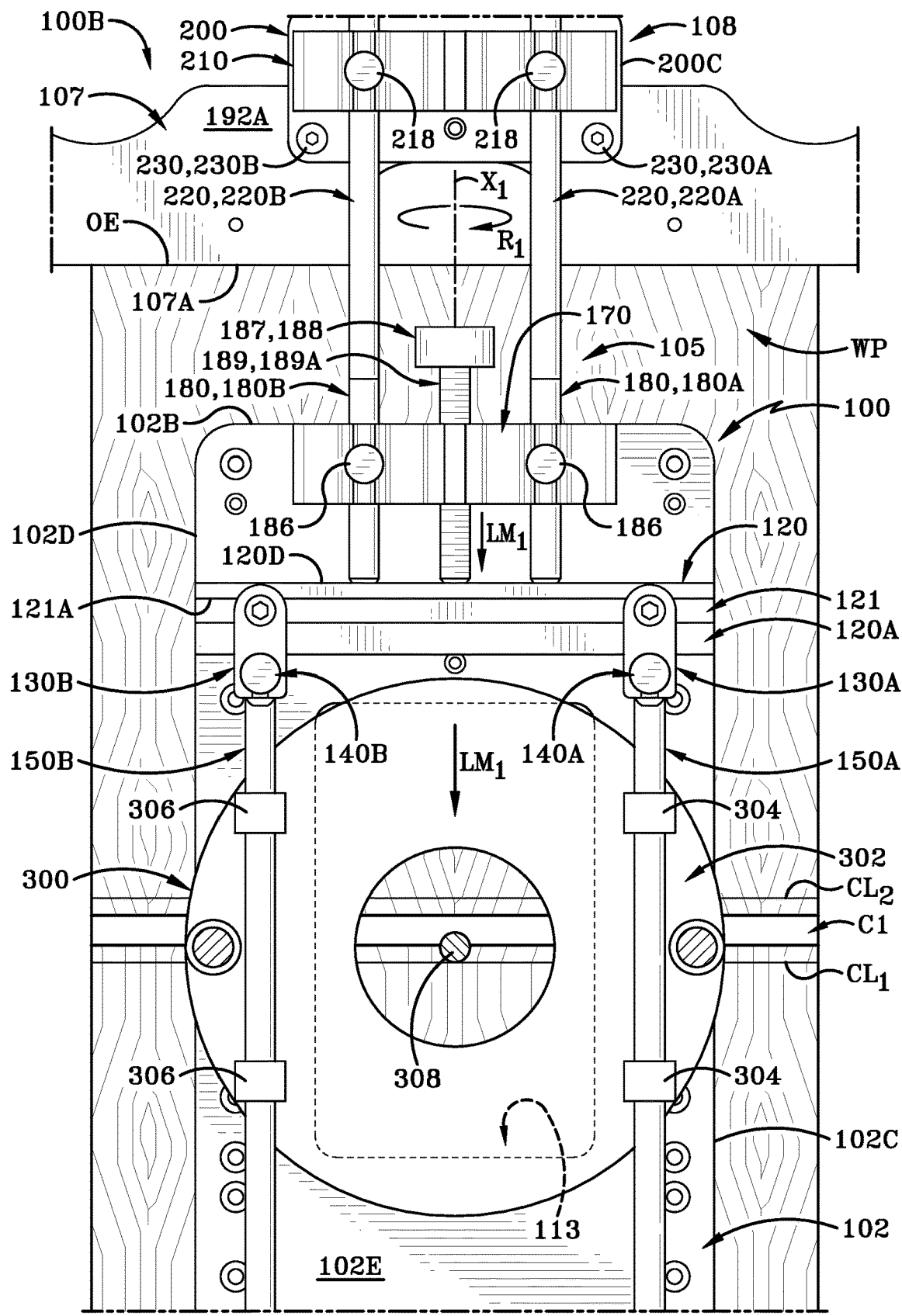
FIG. 16B is a top plan view of the router base similar to FIG. 16A showing the micro-adjuster assembly in operation moving a cutting bit of the router further away from the fence and closer to a first predetermined cut line on the workpiece.
Figure 16C:
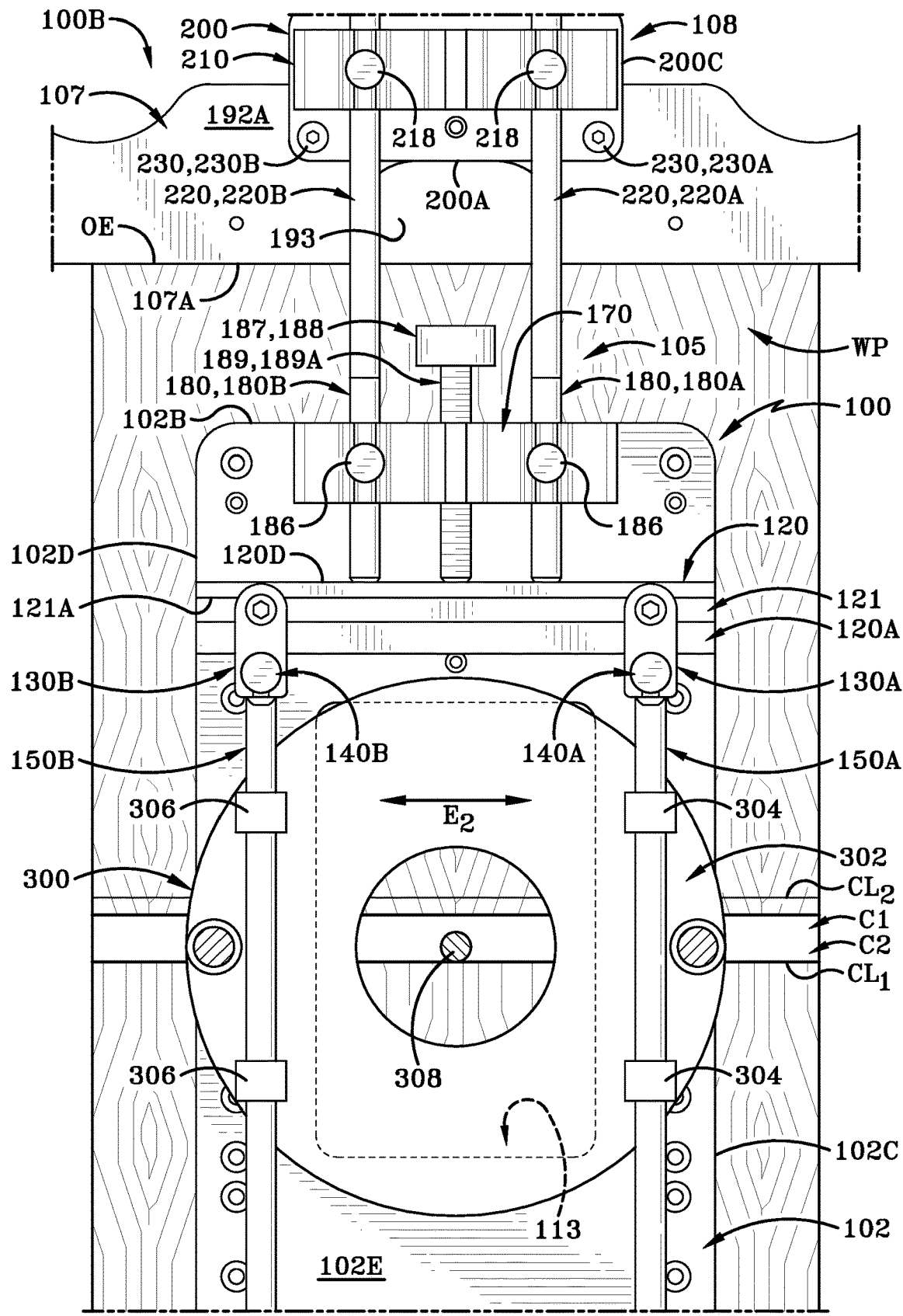
FIG. 16C is a top plan view of the router base similar to FIG. 16B showing the cutting bit of the router being used to cut a straight line along the first predetermined cut line.

Once the woodworker determines that the cutting bit 308 is directly aligned with the first predetermined cut line "$CL_1$", the woodworker ceases rotational force on the micro-adjuster 187 (see FIG. 16B). In addition, the woodworker again tightens the pairs of thumb screws 186, 218 to the first and second vertical passageways 175, 176, 213, 214 to secure the guide rods 180A, 180B and the extension rods 220A, 220B to the first and second racks 170, 210. Once secured, the woodworker may perform a second cut "C2" into the workpiece "WP" parallel to and along the first predetermined cut line "$CL_1$" (as seen in FIG. 16C). As such, the woodworker collectively moves the router base 100 and the router 300 along the first predetermined cut line "$CL_1$" in which the movement is denoted by arrow "$E_2$".

Once the second cut line "C2" is complete, the woodworker will perform the same techniques and alignment to the second predetermined cut line "$CL_2$" but in the reverse order. Prior to alignment, the woodworker will loosen the pairs of thumb screws 186, 218 from the first and second vertical passageways 175, 176, 213, 214 to allow movement of the guide rods 180A, 180B and the extension rods 220A, 220B inside of the first and second racks 170, 210. Once loosened, the woodworker will apply a second opposing rotational force onto the knob 188 of the micro-adjuster 187 to collectively move the attachment assembly 103 and the router 300 towards the rear end 100B of the router base 100 so the cutting bit 308 is directly aligned with the first predetermined cut line "$CL_1$". The second rotational force is denoted by arrow "$R_2$", and the axis of rotation defined along the shaft 189 of the micro-adjuster 187 is denoted by "$X_1$". The guide rods 180A, 180B and the extensions rods 220A, 220B also collectively transition away from the front end 100A of the router base 100 through the first and second racks 170, 210 due to the linearly movement caused by the micro-adjuster 187 (denoted by arrows "$LM_2$").

Figure 16D:
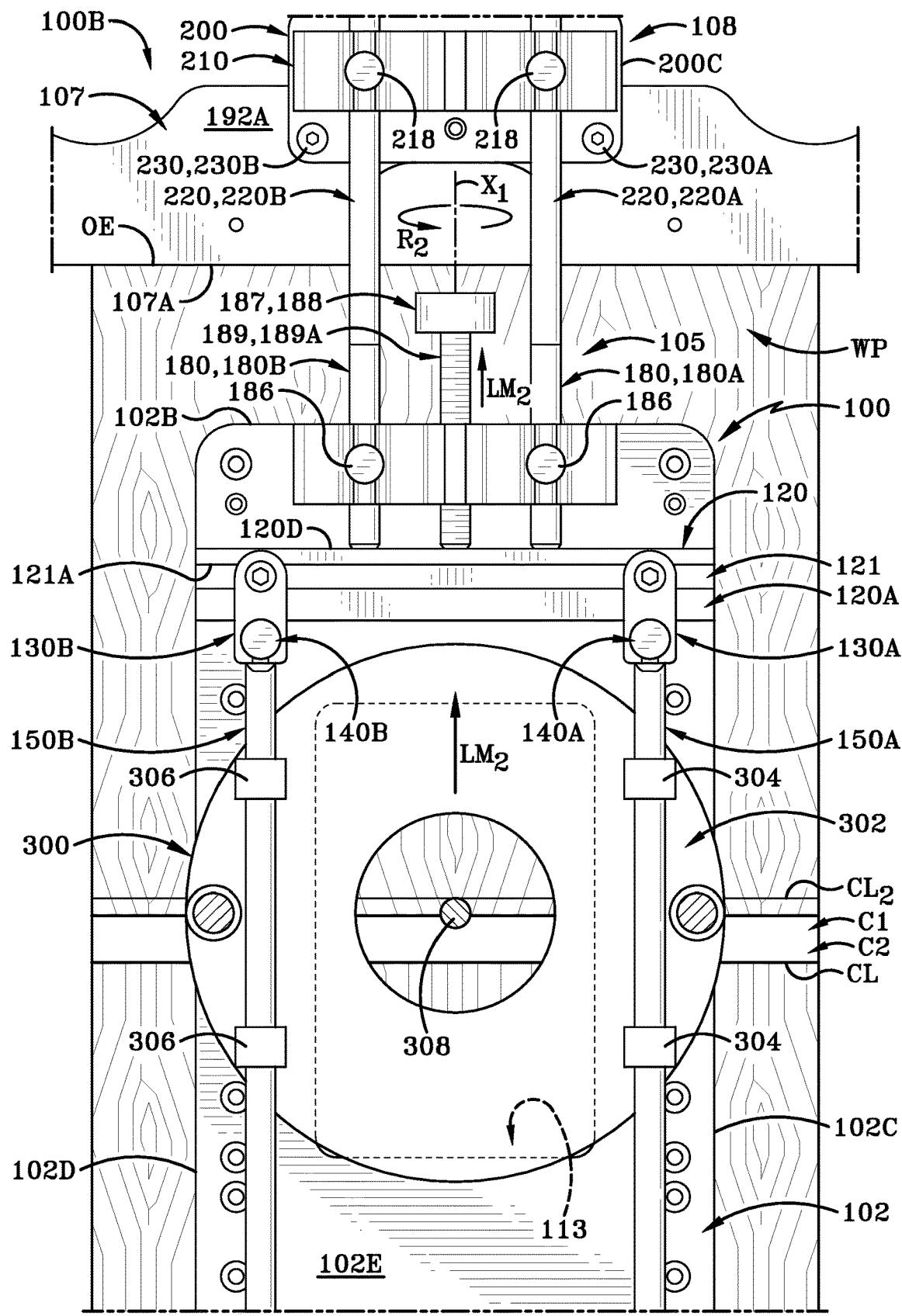
FIG. 16D is a top plan view of the router base similar to FIG. 16C showing the micro-adjuster assembly in operation moving the cutting bit of the router closer to the fence and closer to a second predetermined cut line on the workpiece.
Figure 16E:
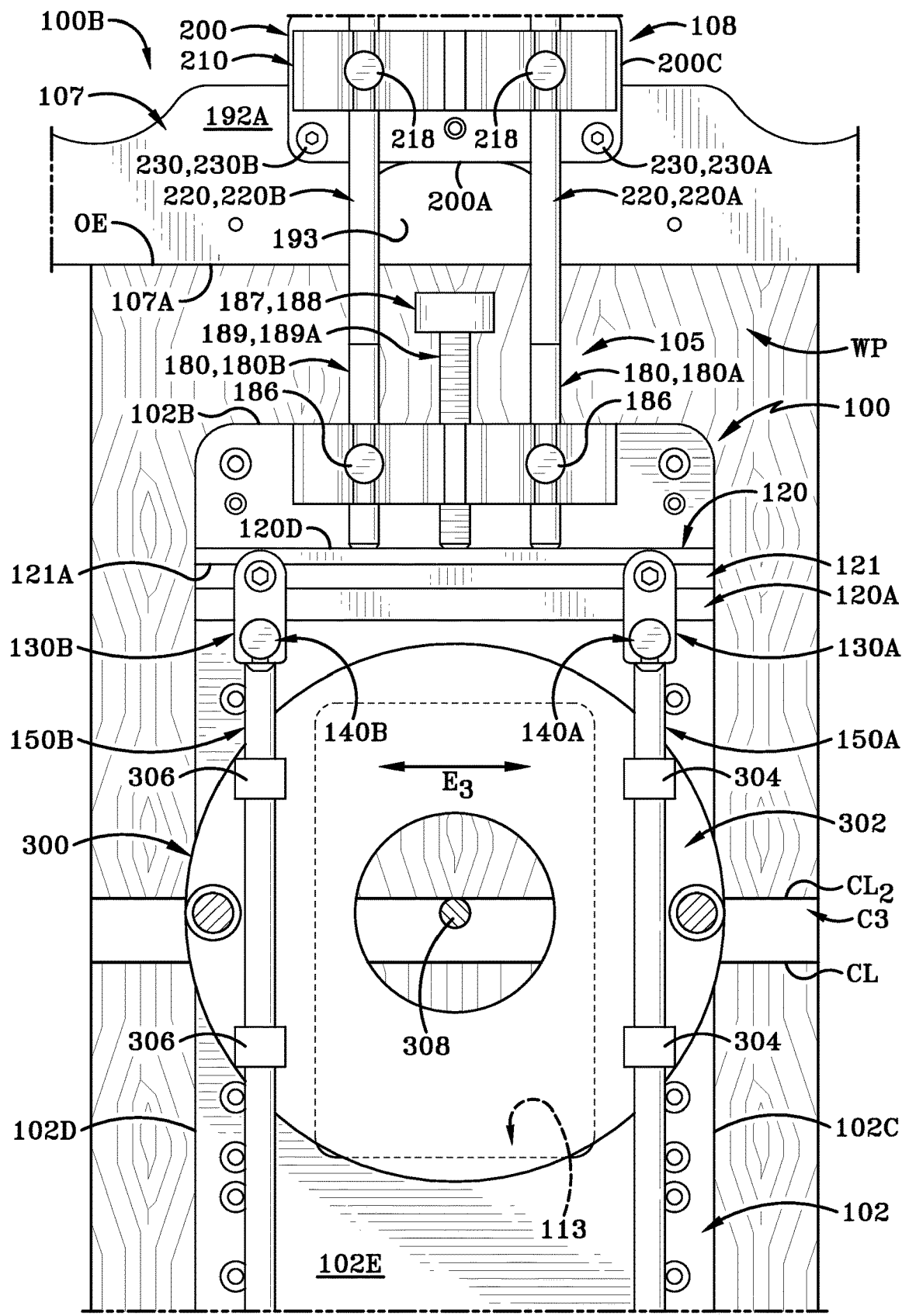
FIG. 16E is a top plan view of the router base similar to FIG. 16D showing the cutting bit of the router being used to cut a straight line along the second predetermined cut line.

Once the woodworker determines that the cutting bit 308 is directly aligned with the second predetermined cut line "$CL_2$", the woodworker ceases rotational force on the micro-adjuster 187 (See FIG. 16D). In addition, the woodworker again tightens the pairs of thumb screws 186, 218 to the first and second vertical passageways 175, 176, 213, 214 to secure the guide rods 180A, 180B and the extension rods 220A, 220B to the first and second racks 170, 210. Once secured, the woodworker may perform a third cut "C3" into the workpiece "WP" parallel to and along the second predetermined cut line "$CL_2$" (as seen in FIG. 16E). As such, the woodworker collectively moves the router base 100 and the router 300 along the second predetermined cut line "$CL_2$" in which the movement is denoted by arrow "$E_3$".

While a first cut "C1" was made in the workpiece "WP", the first cut "C1" may be omitted simply by roughly aligned the cutting bit 308 with the first predetermined cut line "$CL_1$" and then precisely aligning the cutting bit 308 with the first predetermined cut line "$CL_1$".

While the front end 107A of the fence 107 in FIGS. 16A-16E has been described and illustrated as facing the front end 100A of the router jig 100, the fence 107 may be provided in a different orientation as desired by a woodworker using the router base 100. In one exemplary embodiment, woodworker may operably engage the fence 107 to the plate 200 of the expansion assembly 108 in a different orientation where the front end 107A of the fence 107 faces the rear end 1006 of the router base 100. A woodworker may desire this different orientation based on a particular application of the router base 100 during a cutting operation, such as positioning the fence 107 in a different orientation to make greater length cuts into a workpiece.

Figure 17B:
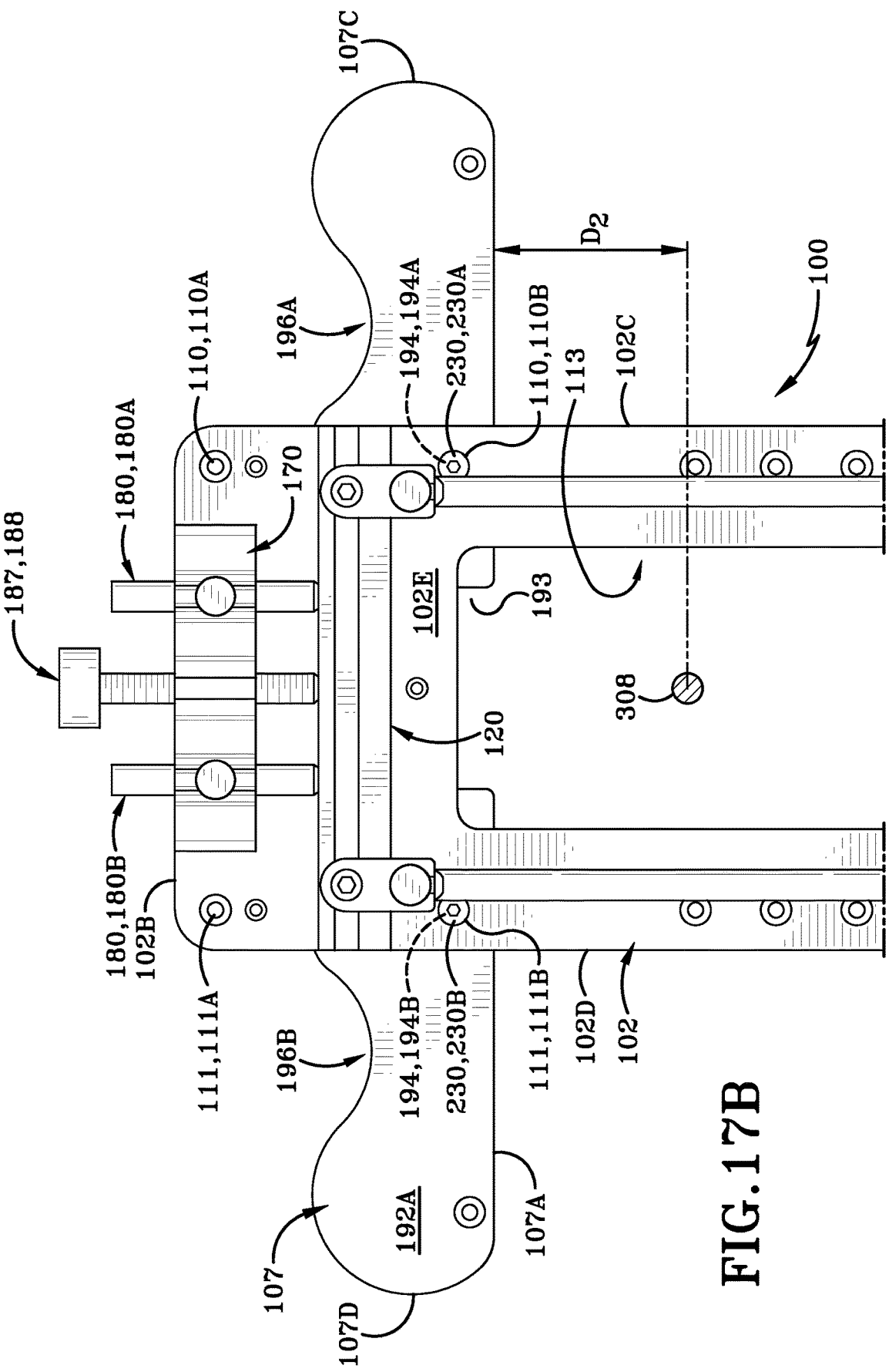
FIG. 17B is a partial top plan view of the router base similar to FIG. 17A showing the fence operably engaged with the base in a second position such that the cutting bit of the router is disposed at a second distance from the front end of the fence.

As illustrated in FIGS. 17A-17C, the fence 107 is secured to the base plate 102, particularly along the bottom surface 102F of the base, via the fasteners 230. The fence 107 may be operably engageable with the base plate 102 between a first position beneath the base plate 102 (proximate the bottom end 100F of the router jig 100) and a second position away from the base plate 102 while the fence 107 is adapted to travel along an edge of the workpiece during operation of the router. As illustrated in FIGS. 6 and 7, each of the first plurality of openings 110 and the second plurality of openings 111 has a total of ten openings. As such, the fence 107 may be secured to the base plate 102 in ten different locations along the base plate 102 for performing certain types of cuts with a router, such as router 300, with the router base 100. During assembly of the fence 107 to the base plate 102, the first aperture 194A is coaxial with an opening from the first plurality of openings 110, and the second aperture 194B is coaxial with an opening from the second plurality of openings 111. Based on the selected location, the front end 107A of the fence 107 will be disposed at a certain distance from the cutting bit 308 of the router 300.

In one exemplary position (as seen in FIG. 17A), the fence 107 may be positioned at the rear end 100B of the router base 100. In this exemplary position, a first fastener 230A secures the fence 107 to the base plate 102 by passing through a first opening 110A of the first plurality of openings 110 and being operably threaded into the fence 107 inside of the first aperture 194A. In addition, a second fastener 230B secures the fence 107 to the base plate 102 by passing through a first opening 111A of the second plurality of openings 111 and being operably threaded into the fence 107 inside of the second aperture 194B. Once the fence 107 is secured to the base plate 102, the fence 107 is disposed at a first distance "$D_1$" that is measured from the front end 107A of the fence 107 to the cutting bit 308 of the router 300. In the illustrated embodiment, the notch 193 of the fence 107 is partially covered by the base plate 102. During use, the woodworker collectively moves the router base 100, the fence 107, and the router 300 on a workpiece "WP" in which the front end 107A of the fence 107 travels along an outermost edge "OE" of the workpiece "WP" for collectively guiding the router base 100 and the router 300 during a cutting operation at the first distance "$D_1$".

In another exemplary position (as seen in FIG. 17B), the fence 107 may be disposed directly below the track 120 and a portion of the notch 193 is disposed inside of the central opening 113. In this exemplary position, the first fastener 230A secures the fence 107 to the base plate 102 by passing through a second opening 110B of the first plurality of openings 110 and being operably threaded into the fence 107 inside of the first aperture 194A. In addition, the second fastener 230B secures the fence 107 to the base plate 102 by passing through a second opening 111B of the second plurality of openings 111 and being operably threaded into the fence 107 inside of the second aperture 194B. Once the fence 107 is secured to the base plate 102, the fence 107 is disposed at a second distance "$D_2$" that is measured from the front end 107A of the fence 107 to the cutting bit 308 of the router 300. The second distance "$D_2$" in this exemplary position is less than the first distance "$D_1$" described herein and illustrated in FIG. 17A. In the illustrated embodiment, the notch 193 of the fence 107 is partially aligned with the central opening 113 of the base plate 102. During use, the woodworker collectively moves the router base 100, the fence 107, and the router 300 on a workpiece "WP" in which the front end 107A of the fence 107 travels along an outermost edge "OE" of the workpiece "WP" for collectively guiding the router base 100 and the router 300 during a cutting operation at the second distance "$D_2$."

In yet another exemplary position (as seen in FIG. 17C), the fence 107 may be directly below the central opening 113 of the base and the notch 193 is disposed entirely inside of the central opening 113. In this exemplary position, the first fastener 230A secures the fence 107 to the base plate 102 by passing through a third opening 110C of the first plurality of openings 110 and being operably threaded into the fence 107 inside of the first aperture 194A. In addition, the second fastener 230B secures the fence 107 to the base plate 102 by passing through a third opening 111C of the second plurality of openings 111 and being operably threaded into the fence 107 inside of the second aperture 194B. Once the fence 107 is secured to the base plate 102, the fence 107 is disposed at a third distance "$D_3$" that is measured from the front end 107A of the fence 107 to the cutting bit 308 of the router 300. The third distance "$D_3$" in this exemplary position is less than the first distance "$D_1$" described herein and illustrated in FIG. 17A and less than the second distance "$D_2$" described herein and illustrated in FIG. 17B. In the illustrated embodiment, the notch 193 of the fence 107 is aligned with the central opening 113 of the base plate 102. During use, the woodworker collectively moves the router base 100, the fence 107, and the router 300 on a workpiece "WP" in which the front end 107A of the fence 107 travels along an outermost edge "OE" of the workpiece "WP" for collectively guiding the router base 100 and the router 300 during a cutting operation at the third distance "$D_3$."

In the exemplary position provided in FIG. 17C, the router base 100 may allow the router 300 to cut exactly on the edge of the workpiece "WP" during a cutting operation. In one example, a router base may allow a router to cut into a workpiece at a depth of about 0.375 inches since a fence provide on the router base also has a thickness of about 0.375 inches. In another example, a router base may allow a router cut into a workpiece at a depth from about 0.375 inches to about 0.6 inches if mortise pins are operably engaged to the fence to extend the width of the fence to about 0.6 inches.

Based on these exemplary embodiments, the front end 107A of the fence 107 may be disposed at a certain distance away from the cutting bit 308 of the router 300 for making certain cuts into a workpiece. In one exemplary embodiment, the distance between the front end of a fence to a cutting bit of a router may be a range from about three-quarters of an inch to about eight inches.

While the front end 107A of the fence 107 in FIGS. 17A-17C has been described and illustrated as facing the front end 100A of the router jig 100, the fence 107 may be provided in a different orientation as desired by a woodworker using the router base 100. In one exemplary embodiment, the fence 107 may operably engage the router base 100 in a different orientation where the front end 107A of the fence 107 faces the rear end 1008 of the router base 100. A woodworker may desire this different orientation based on a particular application of the router base 100 during a cutting operation, such as cutting near or proximate to the corners of a workpiece were additional support for a router is needed.

Figure 19:
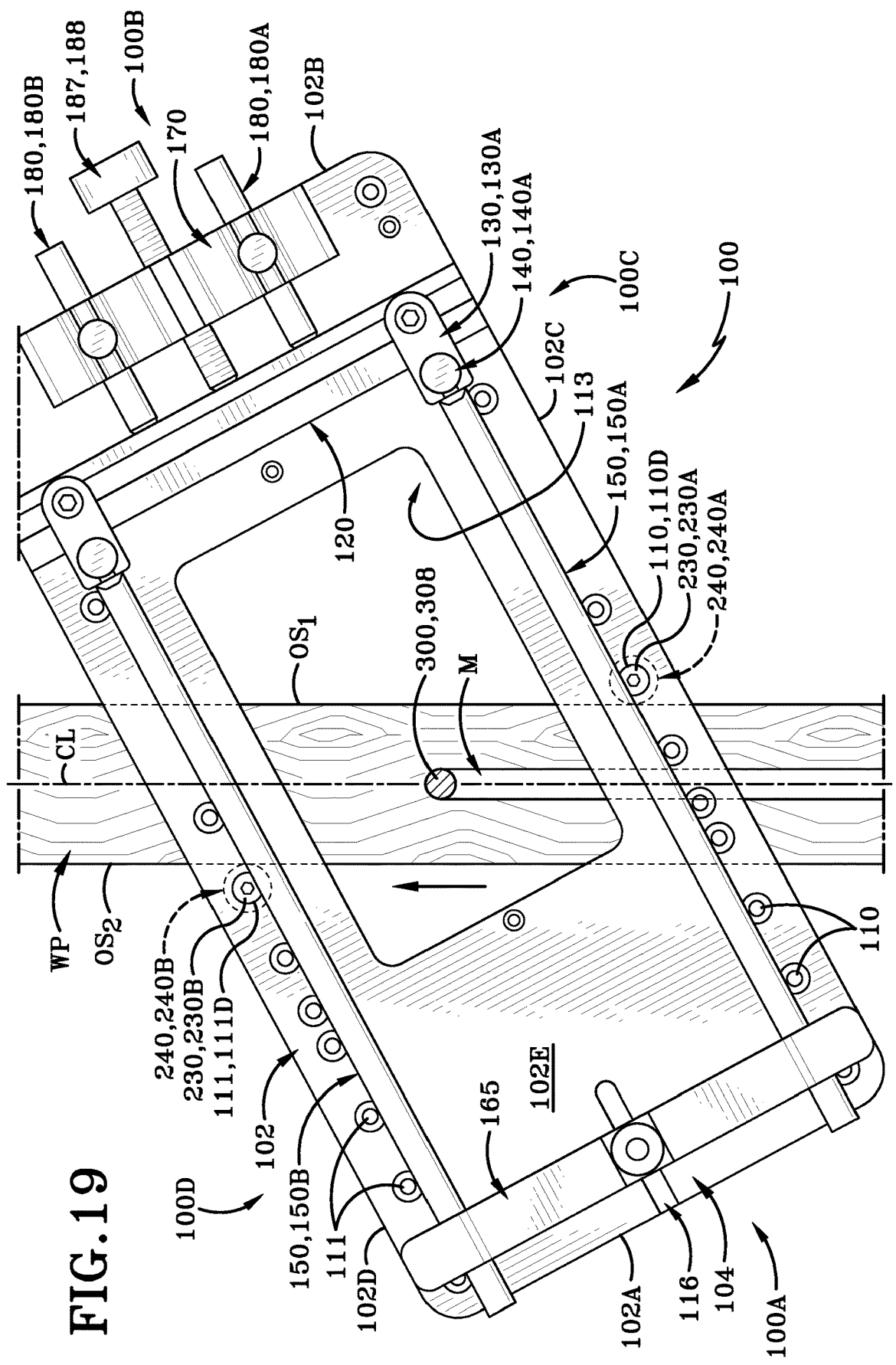
FIG. 19 is a top plan view of the router base oriented at an angle relative to a workpiece using the mortising pins illustrated in FIG. 18, and showing the cutting bit of the router cutting a mortise in the workpiece.

As illustrated in FIGS. 18 and 19, the router base 100 includes a pair of mortising pins 240 to provide guidance to router base 100 along a workpiece for cutting a mortise into said workpiece. As illustrated in FIG. 18, the pair of mortising pins 240 operably engages the bottom surface 102F of the base plate 102 upon assembly. As illustrated in FIG. 19, a first mortising pin 240A is secured to the base plate 102 via the first fastener 230A passing through a fourth opening 110D of the first plurality of openings 110 on the base plate 102 and being operably threaded into the first mortising pin 240A. In addition, a second mortising pin 240B is secured to the base plate 102 via the second fastener 230B passing through a fourth opening 111D of the second plurality of openings 111 on the base plate 102 and being operably threaded into the second mortising pin 240B. As illustrated in FIG. 18, the pair of mortising pins 240 are parallel to one another relative to the transverse axis "Y" of the router base 100. In addition, the pair of mortising pins 240 may be secured to base plate 102 at any opening of the first and second rows of openings 110, 111 based on the overall width of workpiece the woodworker selected for cutting a mortise into said workpiece. For example, the positioning of the pair of mortising pins 240 at two aligned openings from the first and second rows of openings 110, 111 provide a suitable width that allows for the cutting of a mortise into a piece of 2"×4" wood board (as illustrated in FIG. 19).

As illustrated in FIG. 19, the woodworker may align the pair of mortising pins 240 along first and second outermost sides "$OS_1$", "$OS_2$" of a workpiece "WP". Prior to precisely aligning the cutting bit 308 of the router with a predetermined cut line "CL", the first mortising pin 240A is positioned along a first outermost side "$OS_1$" of the workpiece "WP" such that the first mortising pin 240A abuts the first outermost side "$OS_1$" of the workpiece "WP". In addition, the second mortising pin 240B is positioned along a second opposing outermost side "$OS_2$" of the workpiece "WP" such that the second mortising pin 240B abuts the second outermost side "$OS_2$" of the workpiece "WP". Once the pair of mortising pins 240 are abutting the first and second outermost sides "$OS_1$", "$OS_2$" of the workpiece "WP", the cutting bit 308 of the router 300 may be plunged into the workpiece "WP" and used to cut along the predetermined cut line "CL" to perform a mortise "M". Prior to plunging the cutting bit 308 into the workpiece "WP" a cutting a mortise into the workpiece "WP", a user may have used the micro-adjuster 187 to precisely align the cutting bit 308 with the predetermined cut line "CL".

In addition, a woodworker may desire to use the micro-adjuster assembly 105 while the mortising pins 240 are operably engaged to the router base 100. In one example, the woodworker may utilize the micro-adjuster assembly 105 to allow the router 300 to cut at least one off-centered mortises into a workpiece by actuating the micro-adjuster assembly 105 away from the first mortise to cut addition mortises into the workpiece. In another example, the woodworker may utilize the micro-adjuster assembly 105 to allow the router 300 to cut a mortise that is larger in diameter than the cutting bit 308 operably engaged to the router 300 by actuating the micro-adjuster assembly 105 back-and-forth inside of the mortise.

Figure 20:
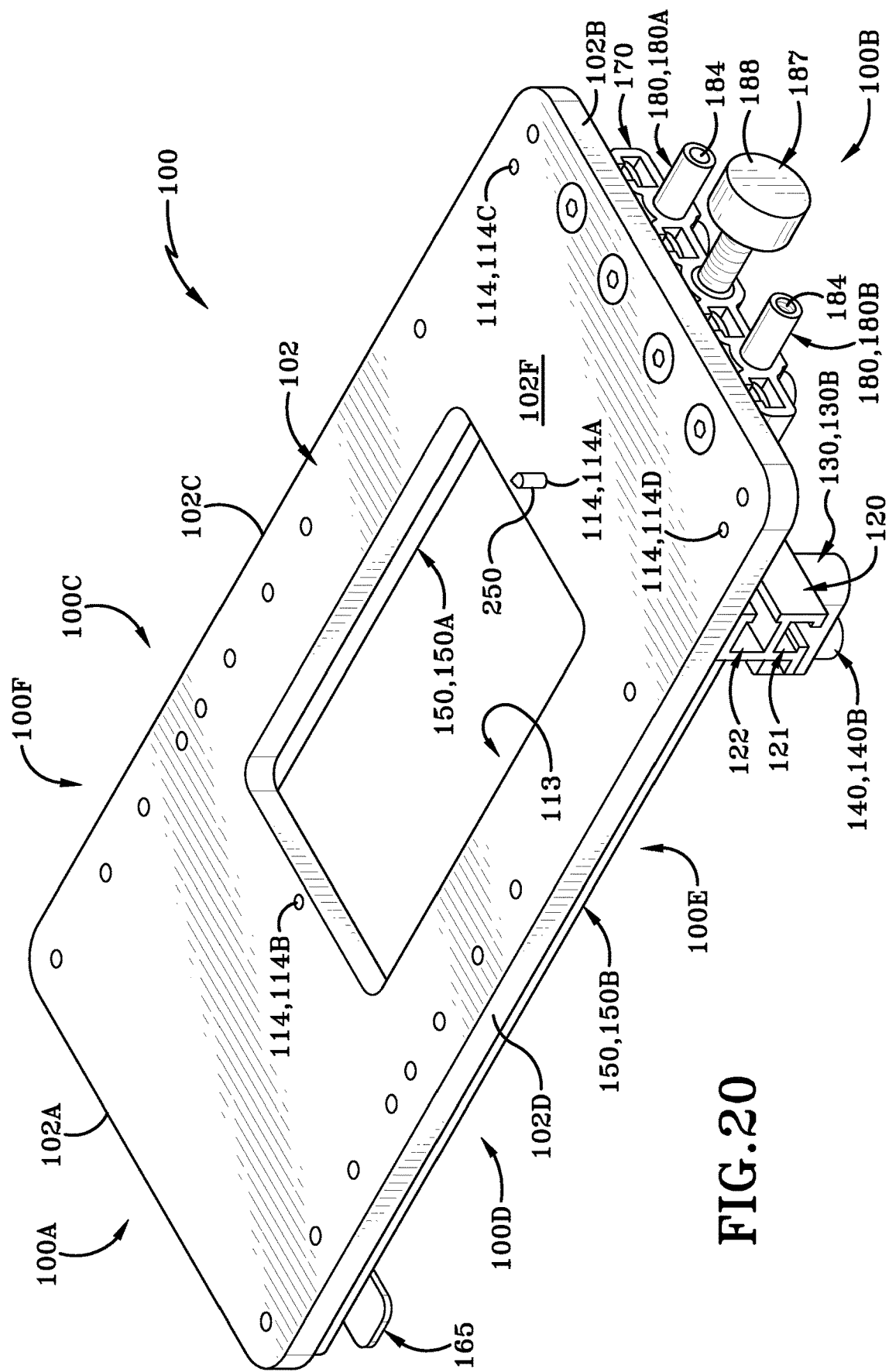
FIG. 20 is a bottom, rear, right side isometric perspective view of the router base showing a trammel pin engaged with the base plate of the router base.
Figure 21:
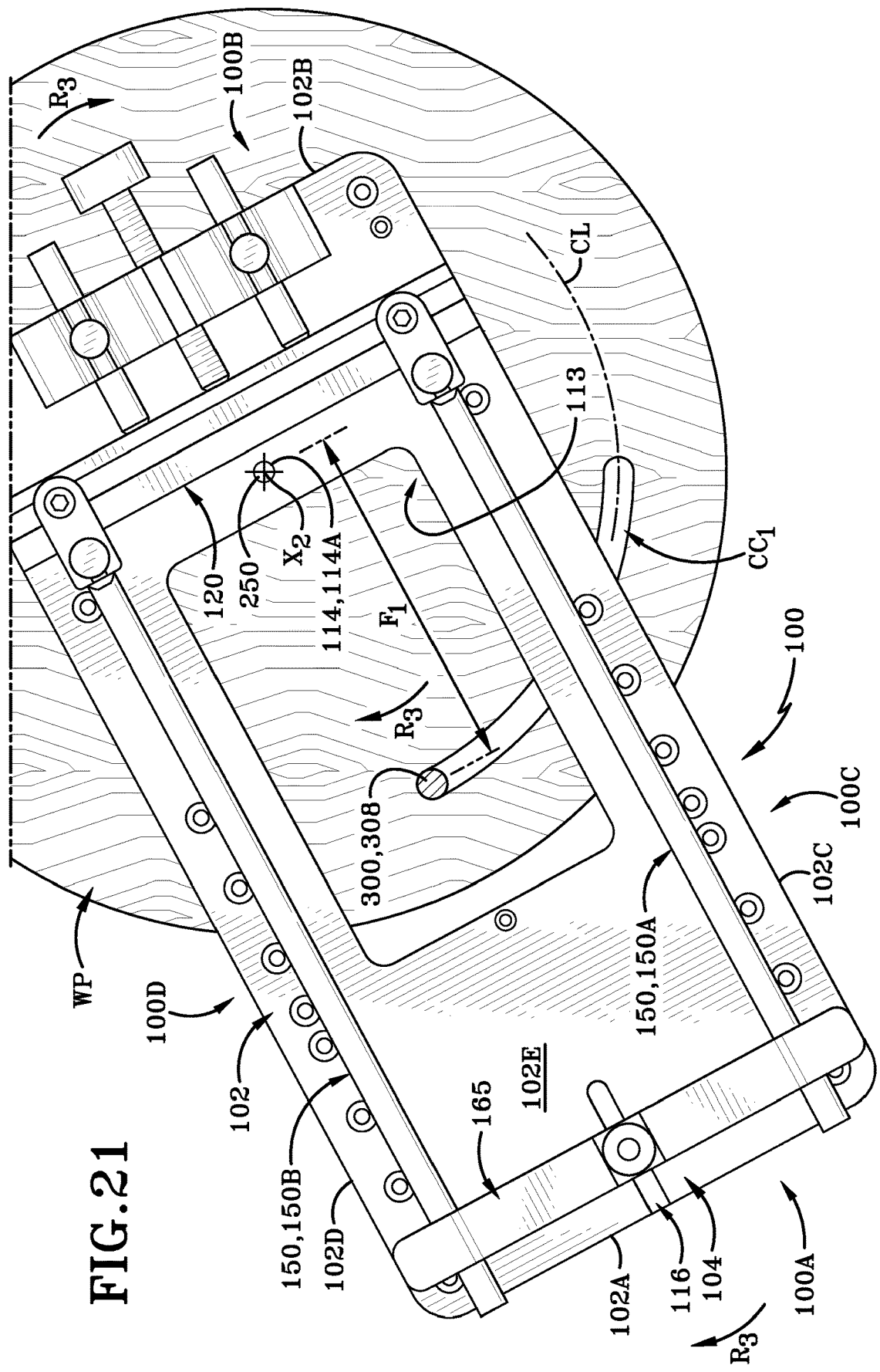
FIG. 21 is a top plan view of the router base engaged with a workpiece via the trammel pin and the router base being pivoted about the trammel pin in order to enable the router cutting bit to cut an arc into the workpiece.

As illustrated in FIGS. 20-22, the router base 100 may include a trammel pin 250 that engages the base plate 102 (illustrated in FIGS. 20 and 21) or the plate 200 of the expansion assembly 108 (illustrated in FIG. 22).

As illustrated in FIG. 20, the trammel pin 250 may operably engage any one of the trammel apertures in the set of trammel openings 114. In one exemplary embodiment (seen in FIGS. 20 and 21), the trammel pin 250 may operably engage the base plate 102 at the first trammel opening 114A in the set of trammel openings 114. As such, the trammel pin 250 extends downwardly away from the bottom surface 102F of the base plate 102 towards the bottom end 100F of the router base 100. In other exemplary embodiments, the trammel pin 250 may operably engage the base plate 102 at the second, third, or fourth trammel openings 114B, 114C, 114D in the set of the trammel openings 114 based upon the size, shape, and configuration of the type of workpiece the woodworker is cutting into while using the router base 100 with a router, such as router 300.

The use of the trammel pin 250 to operably engage the base plate 102 via any one of trammel apertures in the set of trammel openings 114 allows the woodworker to perform curvilinear and/or rounded cuts into a workpiece. As illustrated in FIG. 21, the trammel pin 250 is secured to the base plate 102 at the first trammel opening 114A in the set of trammel openings 114 and secured to a workpiece "WP". Prior to the cutting process, the woodworker of the router base 100 may align the cutting bit 308 of the router 300 with a predetermined cut line "CL" to perform a curvilinear cut "$CC_1$" into the workpiece "WP" (via the attachment assembly 103 and the micro-adjuster assembly 105 as described above). Once the cutting bit 308 is aligned with the predetermined cut line "CL", the woodworker applies a rotational force onto the router base 100 about an axis of rotation "$X_2$" that is defined along the length of the trammel pin 250 (rotational force denoted by "$R_3$"). As such, the trammel pin 250 provides a pivoting axis point that allows the router base 100 to rotate and/or pivot about the axis of rotation "$X_2$" to cut a uniform curvilinear cut "$CC_1$" into the workpiece "WP". In addition, the cutting bit 308 may be disposed at a distance "$F_1$" from the trammel pin 250 when the trammel pin 250 is provided at the first trammel opening 114A in the set of trammel openings 114. The distance "$F_1$" may be varied depending upon the radius of the curvilinear cut "CC" that is cut into the workpiece "WP". As such, the distance "$F_1$" may be a range of about three-quarters of an inch to about six inches.

As illustrated in FIG. 22, the trammel pin 250 may operably engage the first or second trammel apertures 202A, 202B on the plate 200 when the expansion assembly 108 is being used for a cutting process. In one exemplary embodiment, the trammel pin 250 may operably engage the plate 200 at the first trammel aperture 202A. In another exemplary embodiment (seen in FIG. 22), the trammel pin 250 may operably engage the plate 200 at the second trammel aperture 202B. As such, the trammel pin 250 extends downwardly away from the top surface 201A of the plate 200 towards the bottom end 100F of the router base 100. The first or second trammel apertures 202A, 202B may be used based upon the size, shape, and configuration of the type of workpiece the woodworker is cutting into while using the router base 100 with a router, such as router 300.

The use of the trammel pin 250 to operably engage the plate 200 via any one of trammel apertures 202A, 202B allows the woodworker to perform larger curvilinear and/or rounded cuts into a workpiece as compared to the trammel pin 250 being provided in the set of trammel openings 114 defined by the base plate 102 shown in FIGS. 20 and 21. As illustrated in FIG. 22, the trammel pin 250 is secured to the plate 200 at the second trammel aperture 202B and secured to a workpiece "WP". Prior to the cutting process, the woodworker of the router base 100 may align the cutting bit 308 of the router 300 with a predetermined cut line "CL" to perform a curvilinear cut "$CC_2$" into the workpiece "WP" (via the attachment assembly 103, the micro-adjuster assembly 105, and the expansion assembly 108 as described above). Once the cutting bit 308 is aligned with the predetermined cut line "CL", the woodworker applies a rotational force onto the router base 100 about an axis of rotation "$X_3$" that is defined along the length of the trammel pin 250 (rotational force denoted by "$R_4$"). As such, the trammel pin 250 provides a pivoting axis point that allows the router base 100 to rotate and/or pivot about the axis of rotation "$X_1$" to cut a uniform curvilinear cut "CC" into the workpiece "WP". In addition, the cutting bit 308 may be disposed at a distance "$G_1$" from the trammel pin 250 when the trammel pin 250 is provided at the first trammel aperture 202A. The distance "$G_1$" is greater than the distance "$F_1$" illustrated in FIG. 21. The distance "$G_1$" may be varied depending upon the radius of the curvilinear cut "CC₂" that is cut into the workpiece "WP". As such, the distance "G₁" may be a range of about seven and three-quarter inches to about twenty-two inches with a single pair of extensions rods.

In addition, a woodworker may desire to use the micro-adjuster assembly 105 while the trammel pin 250 is operably engaged to the router base 100. In one example, the woodworker may utilize the micro-adjuster assembly 105 to allow the router 300 to cut at least one curvilinear into a workpiece by actuating the micro-adjuster assembly 105 away from the first curvilinear cut to cut more curvilinear cuts into the workpiece. In another example, the woodworker may utilize the micro-adjuster assembly 105 to allow the router 300 to cut a curvilinear cut that is larger in diameter than the cutting bit 308 operably engaged to the router 300 by actuating the micro-adjuster assembly 105 back-and-forth inside of the curvilinear cut.

While the router base 100 may include the fence 107, the expansion assembly 108, the mortising pins 240, and/or the trammel pin 250 during a cutting operation, a woodworker may desire to omit or remove the use of the fence 107, the expansion assembly 108, the mortising pins 240, and/or the trammel pin 250 from the router base 100 during a cutting operation. Generally, a woodworker may desire to omit or remove these associated parts and assemblies from the router base 100 to provide the woodworker with more stability and control of a router, such as router 300, during a free hand cutting operation. For example, a woodworker may desire to omit or remove the associated parts and assemblies from the router base 100 to create an offset base for the router 300 when the woodworker is cutting round-overs or chamfers into corners or edges of a workpiece. In this example, the offset base created by the router base 100 provides additional stability for the router 300 by creating additional surface area to the base of the router 300 when the router 300 is positioned near or at the edge of a workpiece. As such, the creation of the offset base by the router base 100 allows a woodworker to cut more accurate and precise round-overs or chamfers into a workpiece without the router 300 becoming unstable and/or falling off the workpiece during a cutting operation.

While the fence 107 has been described and illustrated with the router base 100 for providing a straight edge guide during cutting operations, a woodworker may use additional woodworking tools or stock to provide a straight edge guide during a cutting operation. In one example, a woodworker may use a track saw or similar woodworking tools with the router base 100 to provide a straight edge guide while a woodworker is performing a straight, linear cut into a workpiece with the router base 100. In another example, a woodworker may use a wood stud (e.g., a 2"×4" wood stud) with the router base 100 to provide a straight edge guide while a woodworker is performing a straight, linear cut into a workpiece with the router base 100. These woodworking tools and pieces of stock may operably engage to a workpiece or additional woodworking tools to maintain the position of the woodworking tool or stock while the woodworker is performing a cut into a workpiece with the router base 100 (e.g. clamping, fastening, mounting, etc.). While additional woodworking tools and pieces of stock may be used as a straight edge guide, the woodworker is still able to use the assemblies provided on the router base 100 to precisely and accurately adjust the router 300 on the router base 100 during a cutting operation (e.g., the attachment assembly 103 and the micro-adjuster assembly 105).

Figure 23:
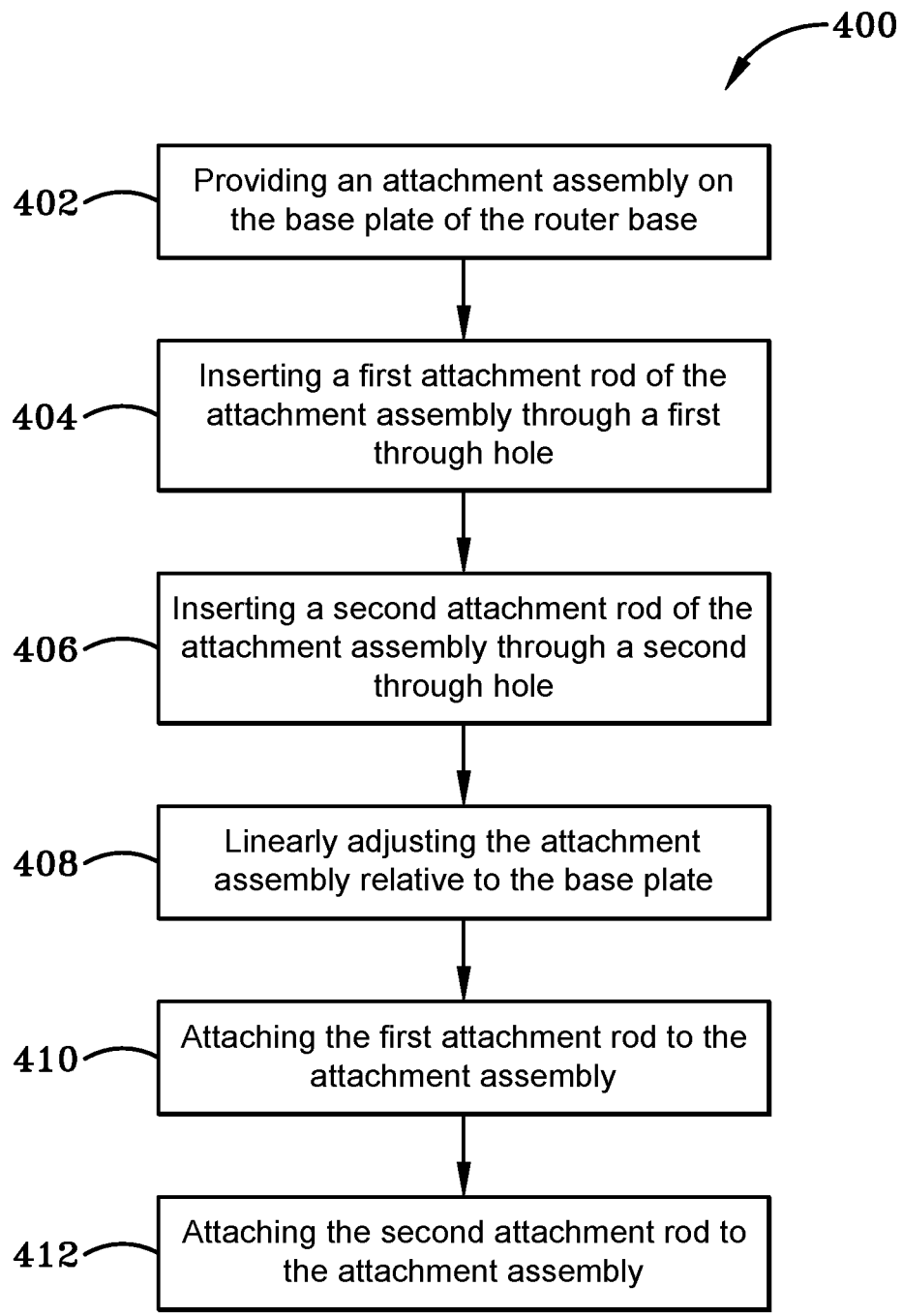
FIG. 23 illustrates an exemplary method flow chart for using a router with a router base.

FIG. 23 illustrates a method 400 of using a router 300 with a router base 100. The initial step 402 of method 400 comprises providing an attachment assembly on a base plate of the router base. Another step 404 comprises inserting a first attachment rod of the attachment assembly through a first through-hole defined in a bottom plate of the router. Another step 406 comprises inserting a second attachment rod of the attachment assembly through a second through-hole defined in the bottom plate of the router, wherein the first through-hole and second through-hole are spaced a lateral distance away from one another. Another step 408 comprises linearly adjusting one or both of the first attachment rod and the second attachment rod relative to the base plate. Another step 410 comprises operatively engaging each of the first attachment rod and the second attachment rod to the attachment assembly.

In an exemplary embodiment, method 400 may include additional steps of using a router 300 with a router base 100. An optional step may include the step of linearly adjusting the one or both of the first attachment rod and the second attachment rod relative to the base plate includes linearly moving the first attachment rod and the second attachment rod generally parallel to a transverse axis of the base plate and relative to one another, wherein the transverse axis extends between a first side and an opposed second side of the base plate. An optional step may include the step of linearly adjusting the one or both of the first attachment rod and the second attachment rod relative to the base plate further comprises: engaging the first attachment rod with a first attachment block; engaging the second attachment rod with a second attachment block; and moving one or both of the first attachment block and the second attachment block along a track operably engaged with the base plate. An optional step may include the step of linearly adjusting further comprises: locking, with a locking mechanism, one or both of the first attachment block and the second attachment block in a desired fixed location on the track. An optional step may include the step of linearly adjusting the one or both of the first attachment rod and the second attachment rod relative to the base plate further comprises linearly moving the first attachment rod and the second attachment rod generally parallel to a vertical axis of the base plate, where the vertical axis extends between a top surface and an opposed bottom surface of the base plate. An optional step may include the step of linearly adjusting the one or both of the first attachment rod and the second attachment rod further comprises: engaging the first attachment rod with a first attachment post oriented generally parallel to the vertical axis; engaging the second attachment rod with a second attachment post oriented generally parallel to the vertical axis; and linearly moving one or both of the first attachment post and the second attachment post one of towards and away from the top surface of the base plate. An optional step may include the step of securing, with a securement mechanism, the one or both of the first attachment post and the second attachment post at a fixed position relative to the top surface of the base plate. Optional steps may include operably engaging an edge guiding fence with the base plate; placing the edge guiding fence adjacent an edge of a workpiece; guiding the base plate along the edge of the workpiece with the edge guiding fence; and making a cut in the workpiece with the router. Optional steps may include adjusting, with a micro-adjuster assembly, a position of the attachment assembly relative to the base plate; adjusting, with the attachment assembly, a position of a cutting bit of the router relative to a workpiece; and making a cut in the workpiece with the cutting bit. Optional steps may include operatively engaging a trammel pin with the base plate; engaging the trammel pin in an aperture defined in an upper surface of a workpiece; guiding the base plate in an arc across the workpiece using the trammel pin as a point of rotation of the base plate; and cutting an arc in the workpiece with the router. Optional steps may include operatively engaging the trammel pin with the base plate includes: engaging an expansion assembly with the base plate; engaging the trammel pin with the expansion assembly; and positioning the base plate and thereby the router a distance away from the trammel pin.

Figure 24:
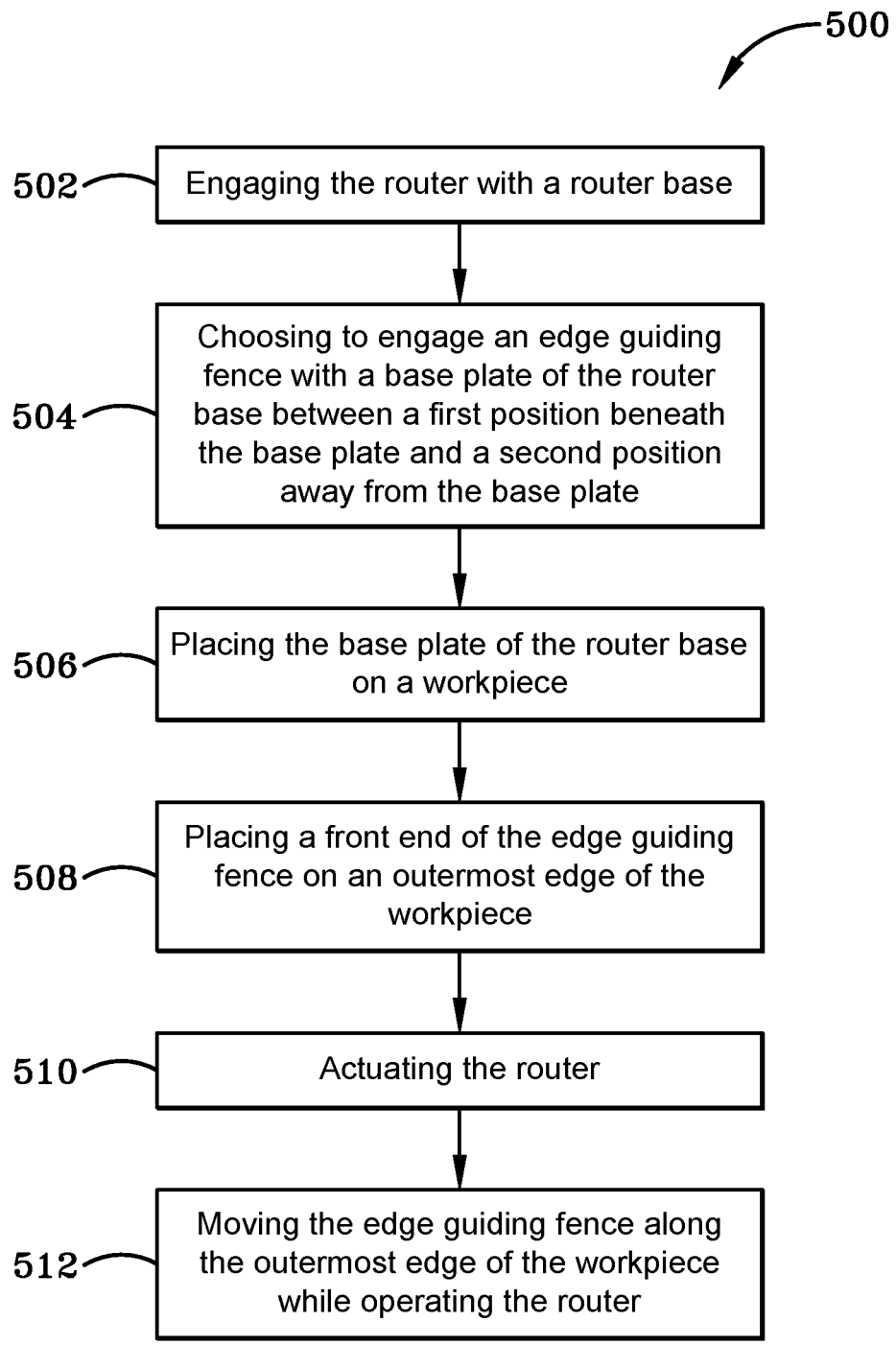
FIG. 24 illustrates an exemplary method flow chart for guiding a router.

FIG. 24 illustrates a method 500 of guiding a router 300. The initial step 502 of method 500 comprises engaging a router with a router base. Another step 504 comprises choosing to engage an edge guiding fence with a base plate of the router base between a first position beneath the base plate and a second position away from the base plate. Another step 506 comprises placing the base plate of the router base on a workpiece. Another step 508 comprises placing a front end of the edge guiding fence on an outermost edge of the workpiece. Another step 510 comprises actuating the router. Another step 512 comprises moving the edge guiding fence along the outermost edge of the workpiece while operating the router.

In an exemplary embodiment, method 500 may include additional steps of guiding a router. An optional step may include the step of moving the base plate and router in unison with the edge guiding fence. Optional steps may include the steps of defining a notch in a front end of the edge guiding fence; placing a top surface of the edge guiding fence in contact with a bottom surface of the base plate; and partially covering the notch with the base plate. Optional steps may include the steps of defining a notch in a front end of the edge guiding fence; defining an opening in the base plate; placing a top surface of the edge guiding fence in contact with a bottom surface of the base plate; and partially aligning the notch with the opening. Optional steps may include the steps of defining a notch in a front end of the edge guiding fence; defining an opening in the base plate; placing a top surface of the edge guiding fence in contact with a bottom surface of the base plate; and aligning the notch with the opening. An optional step may include the step of selectively securing the edge guiding fence with the base plate, via at least one fastener. Optional steps may include the steps of operably engaging an expansion plate with the edge guiding fence; operably engaging at least one extension rod with the expansion plate to the base plate; and maintaining the base plate a distance away from the edge guiding fence with the at least one extension rod.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A router base comprising:
    a base plate adapted to rest upon a surface of a workpiece and to carry a router, the base plate comprises:
        a front end, a rear end opposite to the front end, and a longitudinal axis defined between the front end and the rear end; and
        a first side positioned between the front end and the rear end, a second side positioned between the front end and the rear end and opposite to the first side, and a transverse axis defined between the first side and the second side;
    an attachment assembly operably engaged with the base plate;
    a first attachment rod and a second attachment rod provided on the attachment assembly, wherein the first attachment rod and the second attachment rod are capable of being laterally moveable along the transverse axis of the base plate and are adapted to engage the router in conjunction with the base plate;
    a clamping assembly removably engaged with the base plate at a first position and removably engaged with the first attachment rod and the second attachment rod at a second position vertically above the first position, wherein the clamping assembly is configured to retain the router between the base plate, the first attachment rod, and the second attachment rod;
    an edge guiding fence operably engageable with the base plate between a first position beneath the base plate and a second position spaced apart and remote from the base plate, wherein the edge guiding fence is adapted to travel along an edge of the workpiece during operation of the router;
    first ends of the first attachment rod and the second attachment operably engage with a track of the attachment assembly; and
    second ends of the first attachment rod and the second attachment operably engage with the clamping assembly.

2. The router base of claim 1, wherein the edge guiding fence is selectively operably engageable with the base plate at different positions relative to the longitudinal axis.

3. The router base of claim 1, wherein the base plate further comprises a top surface and an opposed bottom surface which extend between the front end and the rear end, and wherein an opening is defined in the base plate, said opening extending between the top surface and the bottom surface and adapted to receive a cutting bit of the router therethrough.

4. The router base of claim 3, wherein the edge guiding fence further comprises a front end, an opposing rear end, and a top surface that extends between the front end and the rear end, wherein the edge guiding fence operably engages the base plate such that the top surface of edge guiding fence is adjacent the bottom surface of the base plate.

5. The router base of claim 3, further comprising a notch defined in the front end of the edge guiding fence, wherein the notch extends inwardly from the front end of the edge guiding fence towards the rear end of the edge guiding fence.

6. The router base of claim 5, wherein the notch is partially covered by the base plate.

7. The router base of claim 5, wherein the notch is partially aligned with the opening defined in the base plate.

8. The router base of claim 5, wherein the notch is aligned with the opening defined in the base plate.

9. The router base of claim 1, further comprising:
a plurality of openings defined in the base plate;
at least one aperture defined in the edge guiding fence; and
at least one fastener selectively engageable in an opening of the plurality of openings defined in the base plate and selectively engageable in the at least one aperture defined in the edge guiding fence; said at least one fastener selectively securing the edge guiding fence to the base plate.

10. The router base of claim 9, wherein the plurality of openings comprises a first row of openings adjacent the first side and a second row of openings adjacent the second side;
wherein the at least one aperture comprises a first aperture and a second aperture and the first aperture is selectively alignable with a first opening of the first row of openings, and the second aperture is selectively alignable with a second opening of the second row of openings, and wherein the at least one fastener comprises a first fastener received through the aligned first aperture and first opening, and a second fastener received through the aligned second aperture and second opening.

11. The router base of claim 2, wherein the edge guiding fence includes a front end and a rear end, and wherein the front end of the edge guiding fence is selectively disposable at a distance from three-quarters of an inch up to eight inches from a cutting bit of the router.

12. The router base of claim 1, further comprising:
an expansion assembly, wherein the expansion assembly includes:
an expansion plate operably engaged with the edge guiding fence; and
at least one extension rod that operably engages the expansion plate to the base plate.

13. The router base of claim 12, wherein the expansion assembly maintains the edge guiding fence a distance away from the base plate.

14. A method of guiding a router, comprising:
engaging the router with a first attachment rod and a second attachment rod of a router base;
laterally adjusting one or both of the first attachment rod and the second attachment rod along a transverse axis defined between a first side of a base plate of the router base and a second side of a base plate opposite to the first side;
engaging first ends of the first attachment rod and the second attachment rod with a track provided on the base plate;
engaging second ends of the first attachment rod and the second attachment rod with a clamping assembly;
retaining the router, via the clamping assembly, between the base plate and the first attachment rod and the second attachment rod;
choosing to engage an edge guiding fence with the base plate of the router base between a first position beneath the base plate and a second position spaced apart and remote from the base plate;
carrying the router on the base plate;
placing the base plate of the router base on a workpiece;
placing a front end of the edge guiding fence on an outermost edge of the workpiece;
actuating the router; and
moving the edge guiding fence along the outermost edge of the workpiece while operating the router.

15. The method of claim 14, further comprising:
moving the base plate and the router in unison with the edge guiding fence.

16. The method of claim 14, further comprising:
defining a notch in a front end of the edge guiding fence;
placing a top surface of the edge guiding fence in contact with a bottom surface of the base plate; and
partially covering the notch with the base plate.

17. The method of claim 14, further comprising:
defining a notch in a front end of the edge guiding fence;
defining an opening in the base plate;
placing a top surface of the edge guiding fence in contact with a bottom surface of the base plate; and
partially aligning the notch with the opening.

18. The method of claim 14, further comprising:
defining a notch in a front end of the edge guiding fence;
defining an opening in the base plate;
placing a top surface of the edge guiding fence in contact with a bottom surface of the base plate; and
aligning the notch with the opening.

19. The method of claim 14, further comprising:
selectively securing the edge guiding fence with the base plate via at least one fastener.

20. The method of claim 14, further comprising:
operably engaging an expansion plate with the edge guiding fence;
operably engaging at least one extension rod with the expansion plate to the base plate; and
maintaining the base plate a distance away from the edge guiding fence with the at least one extension rod.

* * * * *